(12) United States Patent
Kikuchi et al.

(10) Patent No.: US 8,807,438 B2
(45) Date of Patent: Aug. 19, 2014

(54) RFID TAG SUBSTRATE FOR METAL COMPONENT

(75) Inventors: Takayuki Kikuchi, Yokohama (JP); Ken Sotobayashi, Yokohama (JP); Masayuki Mori, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1181 days.

(21) Appl. No.: 12/087,780

(22) PCT Filed: Feb. 22, 2007

(86) PCT No.: PCT/JP2007/053245
§ 371 (c)(1),
(2), (4) Date: May 13, 2010

(87) PCT Pub. No.: WO2007/097385
PCT Pub. Date: Aug. 30, 2007

(65) Prior Publication Data
US 2010/0219252 A1    Sep. 2, 2010

(30) Foreign Application Priority Data

| Feb. 22, 2006 | (JP) | ................................ | 2006-045024 |
| Mar. 9, 2006 | (JP) | ................................ | 2006-063651 |
| Mar. 9, 2006 | (JP) | ................................ | 2006-063652 |
| Dec. 26, 2006 | (JP) | ................................ | 2006-349856 |

(51) Int. Cl.
| G06K 19/06 | (2006.01) |
| H01Q 15/00 | (2006.01) |
| H01Q 1/22 | (2006.01) |
| G06K 19/077 | (2006.01) |
| H01Q 1/38 | (2006.01) |
| G06K 19/07 | (2006.01) |
| H01Q 15/14 | (2006.01) |

(52) U.S. Cl.
CPC ............ *G06K 19/0723* (2013.01); *H01Q 15/00* (2013.01); *H01Q 1/2225* (2013.01); *G06K 19/07749* (2013.01); *G06K 19/07771* (2013.01); *H01Q 1/38* (2013.01); *H01Q 15/14* (2013.01)
USPC .......................... 235/492; 235/375; 340/572.1

(58) Field of Classification Search
USPC ............... 235/488, 375, 492, 385; 340/572.8, 340/572.7
See application file for complete search history.

(56) References Cited

U.S. PATENT DOCUMENTS 6,329,915 B1 * 12/2001 Brady et al. ................ 340/572.1
6,486,783 B1   11/2002 Hausladen et al.
(Continued)

FOREIGN PATENT DOCUMENTS

| CN | 1315027 A | 9/2001 |
| CN | 1392998 A | 1/2003 |

(Continued)

OTHER PUBLICATIONS

EPO, "Supplementary European Search Report" for EP 08171223.3, Nov. 14, 2012.

(Continued)

*Primary Examiner* — Sonji Johnson
(74) *Attorney, Agent, or Firm* — Manabu Kanesaka

(57) ABSTRACT

The present invention provides an RFID tag substrate in which communication characteristics of an RFID tag do not vary by an influence of contents in a container, the communication characteristics of the RFID tag are not deteriorated even if a metal container is used, the communication characteristics of the RFID tag can be excellently maintained irrespective of a material or contents of a container, and the tag can be reduced in thickness/size, and which can use a general-purpose RFID tag as it is and is suitable for a microwave type RFID tag that uses a UHF band or a frequency band of, e.g., 2.45 GHz in particular.
There is provided an RFID tag substrate 10 on which an RFID tag 20 that performs wireless communication with a reader/writer is disposed, comprising: a substrate layer 11; and a functional layer 12 formed of a high-dielectric-constant layer 12a and a high-permeable layer 12b having different characteristics, wherein the functional layer having predetermined relative dielectric constant and relative permeability is provided, and a product of the relative dielectric constant and the relative permeability is not smaller than 250.

14 Claims, 33 Drawing Sheets

(56) References Cited

U.S. PATENT DOCUMENTS

| | | | |
|---|---|---|---|
| 7,289,853 B1 * | 10/2007 | Campbell et al. | 607/32 |
| 2002/0177408 A1 | 11/2002 | Foster et al. | |
| 2003/0058180 A1 | 3/2003 | Forster et al. | |
| 2004/0052034 A1 | 3/2004 | Senba et al. | |
| 2004/0064362 A1 | 4/2004 | Rosenfeld | |
| 2004/0074974 A1 | 4/2004 | Senba et al. | |
| 2004/0183645 A1 * | 9/2004 | Takaya et al. | 336/234 |
| 2005/0083203 A1 | 4/2005 | Surkau | |
| 2005/0197074 A1 | 9/2005 | Cullen et al. | |
| 2005/0278020 A1 * | 12/2005 | Wang et al. | 623/1.44 |
| 2006/0255945 A1 | 11/2006 | Egbert | |
| 2007/0171081 A1 * | 7/2007 | Dixon et al. | 340/572.8 |
| 2008/0191028 A1 * | 8/2008 | Kagaya et al. | 235/492 |

FOREIGN PATENT DOCUMENTS

| | | | |
|---|---|---|---|
| CN | 1637778 A | 7/2005 | |
| CN | 2725198 Y | 9/2005 | |
| JP | H05-68831 | 9/1993 | |
| JP | 2560682 | 10/1997 | |
| JP | 2001-512592 | 8/2001 | |
| JP | 2002-207980 | 7/2002 | |
| JP | 2002-519771 | 7/2002 | |
| JP | 2002-222398 | 8/2002 | |
| JP | 2003-006599 | 1/2003 | |
| JP | 2003-016415 | 1/2003 | |
| JP | 2003-046627 | 2/2003 | |
| JP | 2003-141466 | 5/2003 | |
| JP | 2003-317058 | 11/2003 | |
| JP | 2004-018003 | 1/2004 | |
| JP | 2004-054337 | 2/2004 | |
| JP | 2004-127057 | 4/2004 | |
| JP | 2004-164055 | 6/2004 | |
| JP | 3105286 | 8/2004 | |
| JP | 2005-097074 | 4/2005 | |
| JP | 2005-115845 | 4/2005 | |
| JP | 2005-514965 | 5/2005 | |
| JP | 2005-170389 A | 6/2005 | |
| JP | 3703724 | 7/2005 | |
| JP | 2005-228226 A | 8/2005 | |
| JP | 2005-309811 | 11/2005 | |
| JP | 2005-327939 | 11/2005 | |
| JP | 2005-354106 | 12/2005 | |
| JP | 2007-079814 | 3/2007 | |
| WO | WO 01/73675 A2 | 10/2001 | |
| WO | WO 03/067512 A1 | 8/2003 | |
| WO | WO 2005/081182 A2 | 9/2005 | |
| WO | WO 2006067989 A1 * | 6/2006 | G06K 19/077 |

OTHER PUBLICATIONS

EPO, "Supplementary European Search Report" for EP 07714743.7, Oct. 1, 2012.

Korean Patent Office, "Office Action for KR 10-2013-7006038", Jun. 12, 2013.

Europe Patent Office, "Extended European Search Report for 13182396.5", Jan. 7, 2014.

China Patent Office, "Office action for CN 201110322723.X," Jan. 3, 2014.

* cited by examiner (a)

(b)

(a)

(b)

RFID TAG SUBSTRATE FOR METAL COMPONENT

BACKGROUND OF THE INVENTION

1. Field of the Invention

The present invention relates to an RFID tag substrate that is disposed to a container of drinks or foods to perform wireless communication between a reader/writer, and more particularly to an RFID tag substrate for a metal component that can maintain good communication characteristics of an RFID tag irrespective of a material or presence/absence of contents of a container and is suitable for an RFID tag adopting an electric wave mode, and to an RFID tag including this tag substrate.

Further, the present invention relates to a metal lid provided to a metal container, e.g., an aluminum can or a steel can, and more particularly to a metal lid with an RFID tag to which the RFID tag that effects wireless communication with a reader/writer is attached, and to a metal container including this metal lid.

Furthermore, the present invention relates to a metal article formed of a metal container or the like, e.g., an aluminum can or a steel can, and more particularly to a metal article with an RFID tag that functions as an antenna and is thereby integrated with an RFID tag IC chip to constitute the RFID tag when the IC chip that effects wireless communication with a reader/writer is mounted thereon/attached thereto.

2. Description of the Related Art

In general, a resin container formed of, e.g., a PET resin or a metal container, e.g., an aluminum can or a steel can is extensively used as a container for a drink, e.g., a carbonated drink like beer, cola, or soda, a fruit juice, or various kinds of teas, a container of a canned food, or a container of each of various kinds of liquid products.

Moreover, a pouch container formed of a packaging material obtained by laminating a metal layer, e.g., an Al foil on a soft wrapping material, e.g., a resin film has a light weight, is superior in durability and gas barrier properties, and others, can be readily processed, and manufactured at a low cost. Therefore, this container is widely used as a container of not only a food or a drink but also a container of mainly a liquid product, e.g., a detergent or a cosmetic.

Additionally, predetermined commodity information, e.g., a commodity name, components of contents, a producer, a location of manufacture, an expiration date is shown in the form of characters or a barcode on various kinds of containers formed of a resin or a metal. As to indication of this type of commodity information, usually, the information is printed on a container or a packaging body that packages the container, or printed on a label or the like and attached to a container.

However, commodity information or the like is usually indicated in a small size to avoid spoiling, e.g., a design of a container. As a result, an indication area, a size of a character, or the number of characters is limited, and a problem that sufficient information cannot be given arises.

Further, in case of indication using a barcode, the barcode itself must be flatly provided on a container surface to enable reading by a reader. When the barcode has a scratch or a stain, it cannot be read. Furthermore, since an amount of information that can be encoded in the form of a barcode is limited, there is a fixed limit as means for indicating and recognizing commodity information like the example of indication using characters.

As means for solving disadvantages or inconveniences in conventional indication of commodity information and simply and accurately indicating necessary sufficient commodity information, an RFID tag is recently utilized.

The RFID (Radio Frequency Identification) tag is also called an RF tag, a non-contact IC tag, or an IC tag. This tag recognizes or indicates information recorded in an IC chip when a very small communication terminal formed into a tag shape by encapsulating the IC chip and a wireless antenna by using a resin or glass records predetermined information in the IC chip, the tag is disposed to an object, and a reader (a reader/writer) side picks up the recorded information through wireless communication.

In the RFID tag, data of several-hundred bits to several-kilo bits can be recorded in a memory of the IC chip. Since sufficient information or the like can be recorded and the tag does not contact with the reader side, there is no concern about wear, scratches, or damages of a contact point. Moreover, the tag itself does not have a power supply, and hence it can be processed or reduced in size/thickness in accordance with an object.

When such an RFID tag is used, various kinds of information concerning a commodity, e.g., a name of a commodity, a weight, an amount of contents, a name of a producer/seller, a location of manufacture, a date of manufacture, or a beyond-use data/expiration data can be recorded. A wide variety of commodity indication that cannot be given in the form of conventional commodity information using characters or a barcode can be utilized by just disposing the tag reduced in size/thickness to a commodity.

It is to be noted that, as the RFID tag, there are an active type that has a built-in power supply and a passive type that does not have a built-in power supply. Additionally, the tags can be classified into an electromagnetic induction type that uses a frequency band of 135 kHz or 13.56 MHz or a microwave type that uses a UHF band or a frequency band of, e.g., 2.45 GHz depending on a communication frequency to be utilized.

Meanwhile, when such an RFID tag is disposed to a resin container like a PET bottle, it is readily affected by contents, e.g., water in the container. Further, when the RFID tag is disposed to a metal container, e.g., an aluminum can, a steel can, or a pouch container, it is affected by electroconductive properties of the metal container, and hence the RFID tag has a problem that a communication distance varies or accurate wireless communication is disabled.

Specifically, when a metal is present immediately behind the RFID tag, a signal transmitted from a reader/writer cannot recognize an antenna of the RFID tag, performance of the antenna is considerably deteriorated, and an energy of electric waves cannot be received by the antenna of the RFID tag.

Furthermore, electric waves have properties of intensively giving an energy to an absorbent material or substance if such a material is present nearby. Therefore, when water that is a material having a high electric wave absorbency is present immediately behind the RFID tag, water absorbs almost all energy of electric waves.

Therefore, when the RFID tag is disposed to a metal container or it is attached to a PET bottle having, e.g., drinking water filled therein, performance of the RFID tag is deteriorated, thus disabling accurate wireless communication in some cases.

In a microwave type RFID tag that uses a UHF band or a high-frequency band of, e.g., 2.45 GHz in particular, a communication distance is prolonged, whereas communication characteristics are considerably deteriorated due to absorption by water or an influence of a metal as compared with an electromagnetic induction type RFID tag that uses a band of 135 kHz or 13.56 MHz.

Moreover, communication characteristics of the RFID tag are determined by a gain based on an antenna size. Therefore, when acquiring a long communication distance is tried, an antenna size is increased. As a result, a size of the entire tag is increased, thereby making it difficult to reduce a size of the tag.

Here, as a method of avoiding an influence of water or a metal on such an RFID tag, interposing, e.g., a spacer between the RFID tag and a container to separate the RFID tag from water or a metal by a fixed distance can be considered.

For example, in case of a microwave type RFID tag, a nature that electric waves are reflected on a metal container is utilized to separate the IC chip from a container outer surface by a distance corresponding to a ¼ wavelength of a communication frequency, thus decreasing deterioration in antenna performance caused by a metal. Specifically, when the RFID tag that uses a frequency band of 2.45 GHz is approximately 30 mm separated from the container outer surface, deterioration in antenna performance caused by the metal container can be avoided. Therefore, in this case, when a tag substrate on which the IC chip and the antenna are mounted is formed with a thickness of 30 mm, the RFID tag that enables communication without being affected by the metal can be constituted.

Moreover, as the RFID tag that is disposed to a metal container, e.g., an aluminum can or a steel can, an RFID tag dedicated to a metal has been so far proposed (see Patent Documents 1-3). This tag has a configuration dedicated to a metal container including an electric wave shield, thus avoiding an influence of the metal container.

When the RFID tag is disposed to a container, a magnetic flux produced by the RFID tag is generated in a direction piercing the container. Therefore, when the tag is to be disposed to a metal container, for example, a thermal loss that an electromagnetic wave produced by an antenna portion is absorbed into the metal container side occurs, thus deteriorating communication characteristics of the tag.

For example, when an RFID tag 1000 is disposed to a metal container 1001 as shown in FIG. 32(*a*), each eddy current is induced on a surface of the metal container 1001 due to a magnetic flux generated by the RFID tag as depicted in FIG. 32(*b*), and this eddy current cancels out the magnetic flux of the RFID tag 1000, and hence a thermal loss occurs.

Thus, as shown in FIG. 33, in a conventionally proposed RFID tag dedicated to a metal container, a magnetic body (a high-permeability body) 2000 or a dielectric material formed into, e.g., a sheet-like shape is arranged on a side of the RFID tag 1000 facing the metal container 1001. As a result, a magnetic flux generated by the RFID tag 100 is transmitted through the magnetic body 2000, thereby avoiding production of each eddy current on the metal container 1001 side.

Additionally, as an electric wave absorber for a built-in antenna in a wireless LAN or a non-contact IC card is also proposed. According to this electric wave absorber, an electroconductive ultra-micronized powder covered with an insulative film is added/mixed in a resin material forming an electric wave absorber to increase a relative dielectric constant of the electric wave absorber, thereby achieving a reduction in thickness of the electric wave absorber (see Patent Document 4).

According to this proposal, when a coating material formed of an electroconductive ultra-micronized powder covered with an insulative film is added/mixed in a resin binder, a dielectric constant of a resin material can be increased while maintaining formability/processability of the resin material. As a result, an influence of a high-frequency noise can be reduced, and the electric wave absorber for a built-in antenna in a wireless LAN or a non-contact IC card can be reduced in size/thickness.

Patent Document 1: Japanese Patent Application Laid-open No. 2002-207980 (pp. 2 to 4, FIG. 1)

Patent Document 2: Japanese Patent Application Laid-open No. 2004-127057 (pp. 3 to 4, FIG. 1)

Patent Document 3: Japanese Patent Application Laid-open No. 2004-164055 (pp. 4 to 5, FIG. 1)

Patent Document 4: Japanese Patent Application Laid-open No. 2005-097074 (pp. 3 to 6)

However, a conventionally proposed configuration of the RFID tag that avoids an influence of moisture or a metal has various kinds of problems.

First, the method of using, e.g., a spacer to separate the RFID tag from a container by a predetermined distance can reduce an influence of moisture or a metal. However, a thickness of a substrate on which the tag is mounted is increased (e.g., approximately 30 mm in case of an RFID tag using 2.45 GHz). When the tag is disposed to a container, it greatly protrudes from the container, and adoption as an actual tag configuration is difficult.

On the other hand, the RFID tag dedicated to a metal container proposed by each of Patent Documents 1 to 3 suppresses occurrence of an eddy current by a magnetic body to enable a reduction in an influence of a metal on an electromagnetic induction type RFID tag. However, this tag cannot cope with an influence of contents (water) in a resin material or an influence of, e.g., reflection of electric waves by a metal container on a microwave type RFID tag.

Further, in such a conventional RFID tag dedicated to a metal, the tag itself is designed/configured for a metal only, and an existing RFID tag cannot be used for a metal container.

That is, a problem that occurs when a regular general-purpose tag is used for a metal container cannot be solved.

Furthermore, the RFID tag dedicated to a metal component has a complicated configuration where a magnetic body or a dielectric material is arranged inside, and has a problem that the tag is increased in size and weight and the most important advantage of the RFID tag, i.e., a small size/thickness and a light weight is deteriorated.

That is, the conventionally proposed RFID tag for a metal component has a larger dimension, e.g., a larger thickness than that of a general-purpose RFID tag. When it is attached to a surface of a metal container, a state that the tag is attached is seemingly clear, thus possibly spoiling an appearance of the metal container. Moreover, the tag may come into contact with other commodities or instruments in shipment or display of commodities, and the tag may be thereby damaged. Additionally, the tag can be detached or damaged artificially, and hence a management system may possibly have a failure.

The RFID tag can exploit its characteristics at a maximum. That is, the RFID tag can be used as wireless communicating means having a low cost, a small size, a light weight, and a large memory capacity when a general-purpose tag that is mass-produced at a low cost is used.

Therefore, a tag having a large wall thickness exceeding 30 mm or a tag dedicated to a metal that has a large/complicated configuration and cannot cope with a resin container considerably diminishes merits of the general-purpose tag.

On the other hand, an RFID tag that is seemingly indistinctive can be reduced in size. However, in this case, a necessary antenna length cannot be assured, and a distance (a range) of wireless communication may be limited to a narrow range, or communication characteristics may be deteriorated due to, e.g., an influence of a neighboring metal container.

Additionally, in regard to the electric wave absorber proposed in Patent Document 4 that adds/mixes an electroconductive ultra-micronized powder covered with an insulative film to increase a dielectric constant, specific contents, e.g., a coating thickness of a resin mixed material taking a coating material conformation are not disclosed, and how this electric wave absorber can be utilized with respect to the actual RFID tag is not clear.

Further, Patent Document 4 discloses, e.g., the fact that a dielectric constant at 1 MHz is 45.7, but does not describe how the electric wave absorber can cope with a communication frequency in a GHz band that is used in a wireless LAN or a microwave type RFID tag, and does not solve the above-explained problems in the RFID tag.

SUMMARY OF THE INVENTION

In order to solve the above-explained problems of the conventional technology, firstly, it is an object of the present invention to provide an RFID tag substrate for a metal component, in which communication characteristics of an RFID tag do not vary due to an influence of contents in a container, the communication characteristics of the RFID tag are not deteriorated even if the container is formed of a metal, the communication characteristics of the RFID tag can be maintained well irrespective of presence/absence of contents in the container or a material of the container, a thickness/size of the tag can be reduced, and a general-purpose RFID tag can be used as it is, the RFID tag substrate for a metal component being suitable for a microwave type RFID tag using a UHF band or a frequency band of 2.45 GHz in particular.

Furthermore, secondly, it is an object of the present invention to provide a metal lid with an RFID tag and a metal container including this metal lid. According to this metal lid with an RFID tag, when an insulated and encapsulated RFID tag is attached to the metal lid that rarely comes into contact with other commodities or instruments or is rarely hidden by an adjacent metal container, the RFID tag can be attached without deteriorating an appearance of the container, a damage and others to the RFID tag can be prevented, and an influence of the metal container can be avoided to effect good wireless communication between the tag and a reader/writer.

Moreover, thirdly, it is an object of the present invention to provide a metal article with an RFID tag that is suitable for a metal container, e.g., an aluminum can or a steel can. According to this metal article with the RFID tag, when an IC chip electrically comes into contact with the metal article, the metal article itself functions as an antenna of the RFID tag, and the RFID tag can be thereby reduced in size, a necessary antenna length can be assured, and an influence of a metal on communication characteristics can be avoided.

To achieve the first object, according to the present invention, there is provided an RFID tag substrate on which an RFID tag that performs wireless communication with a reader/writer is disposed, comprising: a substrate layer; and a functional layer that is laminated or stacked on the substrate layer and has a predetermined relative dielectric constant and relative permeability.

Specifically, the RFID tag substrate according to the present invention has a configuration where a product of the relative dielectric constant and the relative permeability is not smaller than 250.

Additionally, the relative dielectric constant of the functional layer is not smaller than 80.

More specifically, the RFID tag substrate according to the present invention has a configuration where the high-dielectric-constant layer contains a metal powder that is made of Al and has a flat shape.

Further, the functional layer is formed of a plurality of layers having different characteristics, at least one of the plurality of layers is formed of a high-dielectric-constant layer having a predetermined dielectric constant, and at least the other of the plurality of layers is formed of a high-permeability layer having a predetermined permeability.

Furthermore, the high-dielectric-constant layer has a relative dielectric constant that is not smaller than 90, and the high-permeability layer has a relative permeability that is not smaller than 3.8.

According to the RFID tag substrate of the present invention having such a configuration, the functional layer whose relative permeability and relative dielectric constant are set to predetermined values is provided, thus assuring a long electric wave path in the substrate.

It can be considered that the long electric wave path in the substrate can be assured by increasing a refraction index in the substrate. The refraction index can be obtained from a dielectric constant and a permeability of a member, and the refraction index increases as the dielectric constant and the permeability become higher.

In the present invention, the functional layer laminated or stacked on the substrate layer is provided, and this functional layer is set to have a predetermined high dielectric constant and a high permeability. As a result, a refractive index in the substrate is increased to assure a long electric wave path.

The relative dielectric constant and the relative permeability of the functional layer can be measured based on a later-explained S parameter reflection method (Technical Report of Institute of Telecommunications Engineers, Vol. 84, No. 310).

Furthermore, in such an RFID tag substrate according to the present invention, when electric waves received by the RFID tag are reflected on a metal surface (a metal container) on which the tag is disposed, a longer communication distance can be assured.

Therefore, in the RFID tag substrate according to the present invention, even if a thickness of the substrate is reduced to, e.g., a ¼ wavelength or below of a communication frequency of the RFID tag, the same electric wave path as that when the RFID tag is disposed and separated from an object can be substantially assured, the antenna of the RFID tag can be prevented from being unrecognized by received electric waves due to an influence of the metal container, or deterioration or the like in a communication gain can be avoided. Furthermore, when a metal, e.g., an aluminum foil is provided on a rear surface of the substrate and the substrate is attached to a resin container, since the metal cancels an influence of a material on the rear surface, deterioration in communication characteristics due to a change in dielectric constant caused by contents in the resin container can be avoided.

Moreover, when electric waves received by the RFID tag are reflected on the metal container, a communication distance can be extended, and a predetermined communication distance can be assured even if an antenna size is reduced. As a result, a tag size can be decreased.

Consequently, any existing RFID tag can be disposed to a resin container or a metal container through the RFID tag substrate according to the present invention, thereby effecting accurate wireless communication in an essential proper communication range of the tag. Additionally, a desired communication distance can be assured, and a tag size can be reduced.

That is, according to the present invention, the substrate has a configuration including multiple layers with different characteristics and a relative permeability and a relative dielectric constant of each layer are set to predetermined values. As a result, a refraction index in the multilayer substrate can be increased, and a longer electric wave path through which electric waves are transmitted/received by using the RFID tag can be assured, thereby obtaining the same effect as that when the RFID tag is separated from the container by a predetermined distance. Further, when the metal container is positively utilized to reflect electric waves received by the tag on the metal surface, a communication distance can be assured.

Therefore, when the tag is disposed to the metal container, an influence of the metal on electric waves of the RFID tag can be reduced, thereby effectively avoiding deterioration in communication characteristics of the RFID tag. Furthermore, when a metal, e.g., an aluminum foil is provided on a rear surface of the substrate and the substrate is attached to a resin container, the metal cancels an influence of a material on the rear surface. Therefore, deterioration in communication characteristics due to a change in dielectric constant caused by contents in the resin container can be avoided.

As explained above, interposing the RFID tag substrate according to the present invention can always assure a communication gain of the RFID tag in an good state irrespective of a types of the RFID tag and a type of the container to which the RFID tag is disposed and irrespective of presence/absence of contents in the container. Accurate wireless communication is enabled, and an existing general-purpose tag can be used as it is, and the RFID tag that is superior in general versatility and reliability and reduced in thickness/size can be realized.

More specifically, according to the present invention, the RFID tag substrate has a configuration where the high-dielectric-constant layer contains a metal powder that is made of Al and has a flat shape.

Moreover, the high-permeability layer contains a metal powder that is made of at least one of magnetic materials Al, Fe—Si, Cu, Fe, and Ni and has a flat shape, or a metal oxide powder that is made of at least one of magnetic materials $TiO_2$, $Fe_2O_3$, and ferrite.

According to the RFID tag substrate of the present invention having such a configuration, a preferable metal material or magnetic material can be selected and used to set a permeability and a dielectric constant of the functional layer.

Here, in the present invention, a metal selected from preferable materials is a powder having a flat shape, and hence the metal can be evenly and uniformly mixed in a resin material serving as a binder.

As explained above, in the RFID tag substrate according to the present invention, the functional layer having a preferable dielectric constant and a permeability corresponding to an output or frequency characteristics of the RFID tag to be used can be set, thereby providing the RFID tag substrate superior in versatility and extensibility.

Additionally, according to the RFID tag substrate of the present invention, the substrate layer includes a resin layer formed of a thermoplastic resin.

Further, the substrate layer includes a distance layer formed of a nonwoven fabric or a resin foam.

According to the RFID tag substrate of the present invention having such a configuration, the resin layer formed of a plastic, e.g., a PET resin can be provided as a substrate layer that supports the functional layer, and this resin layer can be constituted as the distance layer (an air layer) that separates the RFID tag from the container side.

Further, the distance layer that is laminated on the resin layer or formed of a nonwoven fabric or a resin foam can be provided in place of the resin layer.

In order to reduce an influence of contents in the container with respect to the RFID tag, ideally, setting an effective relative dielectric constant at a mount part of the tag to 1.0 (air) is desirable. However, this means that the RFID tag is floating in air, and providing this structure with a plastic material alone is difficult.

Thus, according to this embodiment, the resin layer that serves as the substrate layer of the functional layer and is formed of a plastic, e.g., a PET resin is allowed to function as the distance layer (an air layer) that separates the RFID tag from the container, and a nonwoven fabric or a resin foam is laminated on the substrate layer to provide the distance layer.

Since many cavities are formed in the nonwoven fabric if this nonwoven fabric is formed of, e.g., a PET resin. Therefore, an effective relative dielectric constant can be reduced to be smaller than that of the PET resin itself and can be set to a value closer to 1.0 as an ideal value. The nonwoven fabric is optimum as a material constituting the distance layer that separates the RFID tag from the container. Likewise, in case of the resin foam, it has a gas, e.g., air, nitrogen, or a carbon dioxide filled therein, and an effective relative dielectric constant can be set to a value close to 1.0.

Furthermore, the nonwoven fabric or the resin foam is characterized in a degree of freedom in design, and the distance layer having a desired thickness and size can be readily formed at a low cost.

Thus, according to the present invention, a nonwoven fabric or a resin foam is adopted as the distance layer that separates the RFID tag from the container. As a result, it is possible to effectively avoid a change in communication characteristics due to an influence of a dielectric constant of contents in the container that occurs when the RFID tag moves close to/comes into contact with the container or an influence of the metal container.

It is to be noted that the distance layer can be also formed by applying, e.g., a resin coating material in a reticular pattern to provide cavities inside from the same standpoint besides using a nonwoven fabric or a resin foam, and the obtained layer can be adopted as the distance layer according to the present invention.

Moreover, the resin layer formed of, e.g., a PET resin can be set to have an arbitrary thickness as the distance layer, and can be thinly and longly formed into, e.g., a thin film shape that can be rolled. It is preferable as a material of the substrate on which the RFID tag having an arbitrary shape or size is mounted.

Additionally, the distance layer formed of, e.g., a nonwoven fabric can be further laminated on the resin layer formed into a film-like shape, and an electromagnetic interference shielding coating material or the like can be easily applied to a surface of the resin layer.

As explained above, the resin layer formed of a plastic, e.g., a PET resin can preferably function as the distance layer according to the present invention or the substrate layer on which the functional layer is mounted.

Furthermore, the RFID tag substrate according to the present invention has a configuration where the substrate layer includes a thermosetting resin layer or a thermoplastic resin layer.

According to the RFID tag substrate of the present invention having such a configuration, the thermosetting resin layer or the thermoplastic resin layer formed of a polyurethane resin or a polyester resin can be provided as the substrate layer that supports the functional layer. Moreover, such a thermosetting resin layer or a thermoplastic resin layer can also function as the distance layer that separates the RFID tag from the container side.

Generally, a thermosetting resin or a thermoplastic resin, e.g., a polyurethane resin or a polyester resin can be applied to a substrate surface formed of, e.g., a PET film, and its coating thickness can be readily controlled. Additionally, when a resin softer than the PET film is selected for the substrate, the substrate layer can be more flexibly formed.

Further, such a thermosetting resin or a thermoplastic resin can serve as an underlying coating of the functional layer, and can function as the distance layer that separates the RFID tag from the container like the example of the unwoven fiber layer.

Thus, according to the present invention, the thermosetting resin layer or the thermoplastic resin layer formed of, e.g., a polyurethane resin or a polyester resin is adopted as the substrate layer serving as a substrate of the functional layer, and such a layer can function as the substrate layer and the distance layer.

Furthermore, the RFID tag substrate according to the present invention can have configuration where the substrate layer includes a metal layer.

According to the thus configured RFID tag substrate of the present invention, the metal layer formed of, e.g., an Al foil layer can be provided as the substrate layer that supports the function layer, and this metal layer can be constituted as a substrate.

According to the RFID tag substrate of the present invention, provision of the functional layer having a predetermined refraction index prevents communication characteristics from being deteriorated even if the RFID tag is disposed to a metal. Therefore, the metal layer can be laminated or stacked on the substrate layer, or the substrate layer itself can be constituted of a metal.

Moreover, when a metal is used for the substrate, an influence of contents in the container can be further reduced, thereby realizing the RFID tag substrate that is preferable for a PET bottle container filled with, e.g., drinking water in particular.

According to the RFID tag substrate of the present invention, when the functional layer having a predetermined refraction index is provided, an influence of water can be sufficiently suppressed/reduced even though the container is filled with water, thus obtaining good communication characteristics.

However, when the RFID tag is provided on a front surface or a rear surface of, e.g., a cap of a PET bottle container, an influence of water must be considered depending on a water level of water that is put into the bottle container, i.e., a distance between a water surface and the RFID tag.

In general, a water level of water that is put into the bottle container is placed at a position that is approximately 1 cm lower than a bottle opening portion, and the RFID tag including the tag substrate according to the present invention can obtain good communication characteristics when a distance between a water surface and the RFID tag is approximately 5 mm. Therefore, even if the RFID tag is disposed to a cap of the bottle, an influence of water does not have to be considered in particular.

However, when water is fully poured to reach the bottle opening portion, a distance between the RFID tag disposed to the cap and the water surface may be reduced to be less than 5 mm.

Thus, in such a case, when the metal layer formed of, e.g., an Al foil is provided as the substrate layer of the RFID tag substrate, electric waves received by the RFID tag can be reflected on the metal layer. As a result, an influence of water in the bottle can be eliminated to obtain good communication characteristics.

Therefore, the substrate layer including the metal layer can be preferably used as a substrate of the RFID tag disposed to a cap portion of the PET bottle container in particular.

Additionally, in the present invention, the RFID tag attached to the RFID tag substrate according to the present invention is formed of a microwave type RFID tag.

Further, the RFID tag according to the present invention is an RFID tag that performs wireless communication with a reader/writer and comprises: an IC chip; an antenna; and a substrate on which the IC chip and the antenna are mounted, wherein the substrate is constituted of the RFID tag substrate according to the present invention.

As explained above, the present invention can provide the RFID tag substrate preferable for the microwave type RFID tag that uses a UHF band or a frequency band of 2.45 GHz, and the RFID tag including this RFID tag substrate.

As compared with an electromagnetic induction type RFID tag, the microwave type RFID tag is apt to be affected by reflection on a metal or moisture since it uses a high-frequency band. Simply interposing a magnetic body or the like between the tag and a container like the electromagnetic induction type tag cannot avoid deterioration in communication characteristics.

According to the present invention, setting a relative permeability and a relative dielectric constant of each layer constituting the substrate to predetermined values enables increasing a refraction index in the substrate and assuring a long electric wave path of the tag, thereby obtaining the same effects as those acquired when the RFID tag is separated from the container by a predetermined distance. Therefore, an influence of a metal on electric waves of the RFID tag and absorption by moisture can be sufficiently avoided, thus good communication characteristics of the microwave type RFID tag can be maintained/assured.

It is to be noted that, according to the RFID tag substrate of the present invention, a predetermined relative dielectric constant/relative permeability in the entire substrate can suffice, and the function layer may be formed of a high-dielectric-constant layer alone or a high-permeability layer alone.

Furthermore, a thickness of each layer can be arbitrarily set/changed in accordance with, e.g., communication characteristics, a shape, or a size of the tag to be mounted, and an arbitrary number of functional layers may be laminated or stacked.

Moreover, the plurality of substrates each having the functional layer may be laminated or stacked to constitute one RFID tags substrate.

Additionally, the RFID tag substrate according to the present invention can be used to form an arbitrary metal container or a resin container, e.g., a PET container wrapped with the RFID tag substrate, a metal can/label can such as an aluminum can or a steel can, or a pouch container. Further, the RFID tag substrate according to the present invention can be used to form a plastic container itself like a PET bottle.

That is, the entire container can be wrapped with the RFID tag substrate according to the present invention. Furthermore, a part of the container on which the RFID tag is mounted can be used as a label that is wrapped with the RFID tag substrate according to the present invention. Moreover, the plastic container itself can be constituted of the RFID tag substrate according to the present invention.

As explained above, according to the present invention, when any RFID tag is disposed, a resin container or a metal container having an arbitrary shape, size, or application can be provided as an RFID tag compatible container that can excellently assure a communication gain of the RFID tag irrespective of presence/absence of contents in the container.

Additionally, in order to achieve the second object, a metal lid with an RFID tag according to the present invention is a metal lid that encapsulates the container, and has a structure where the RFID tag comprising an IC chip and an antenna is attached through an insulating member.

According to the thus configured metal lid with an RFID tag of the present invention, the RFID tag that performs communication with a reader/writer is attached to a metal lid side of a metal container in a state where it is encapsulated in an insulating member, e.g., a rubber.

The RFID tag that is attached to the metal lid is insulated and encapsulated by using, e.g., a rubber, and can perform communication with the reader/writer without being affected by the metal lid or the metal container. Further, when the RFID tag is attached to the metal lid that functions as a dead space in appearance of the container, a sufficient antenna length that is required for communication can be assured without deteriorating the appearance of the container, thereby effecting good wireless communication with the reader/writer.

Furthermore, the RFID tag attached to the lid portion is not hidden by other containers or commodities even in a state where the metal container is stored/displayed, and can perform communication with the reader/writer in any state, thereby sufficiently demonstrating a function/characteristics as the RFID tag.

As the insulated and encapsulated RFID tag, an existing general-purpose tag can be used, and it can be inexpensively manufactured into a small size. Therefore, according to the present invention, the RFID tag for a metal component that can obtain good communication characteristics can be realized at a low cost.

Further, according to the present invention, when the RFID tag is attached on the metal lid side rather than the container main body side, the RFID tag becomes indistinctive in appearance of the container, and an appearance of the container is not spoiled by attachment of the tag, thereby maintaining the primary appearance/design of the container.

Furthermore, when the RFID tag apparently becomes indistinctive, it does not come under observation, and the RFID tag can be prevented from artificially being detached/damaged.

Moreover, the metal lid is placed on a top surface of the container, and rarely comes into contact with other containers, instruments, or commodities when the container is stored, shipped, or displayed. The RFID tag attached to the metal lid can be effectively prevented from coming into contact with other containers or commodities to be damaged or from coming off the container.

In particular, the metal lid with the RFID tag according to the present invention comprises an opening tab having a ring hole, and the RFID tag is disposed in the ring hole of the opening tab through the insulating member.

According to the thus configured metal lid with the RFID tag of the present invention, when the RFID tag is disposed in the ring hole of a pull-tab for opening a container, the ring hole of the opening tab can be utilized as an attachment space for the RFID tag, and the attached RFID tag can be protected by the ring portion of the pull-tab.

Although the ring hole of the opening tab (the pull-tab) provided in the metal container is generally recognized as a hole in which a finger is inserted at the time of opening, a recent opening tab is configured not to be separated from the metal lid even after opening. It is reduced in size and its ring hole is also small as different from a conventional large pull-tab that is completely separated from a container.

That is, a finger cannot be actually inserted into a ring hole of an opening tab in a currently distributed metal container, and the ring hole is pressed by a finger cushion at most at the time of opening.

According to the present invention, the ring hole of the opening tab that is actually a dead space is effectively exploited as an attachment space for the RFID tag. When the RFID tag is disposed in the ring hole of the tab, the space of the metal lid can be effectively utilized without deteriorating an essential function of the opening tab. Moreover, the RFID tag can be hidden in the ring hole to apparently become indistinctive, and the ring portion can thereby protect the RFID tag.

Additionally, the ring of the opening tab is configured to be separated from the surface of the metal lid to some extent. When the RFID tag is attached to the opening tab, it can be separated from the metal lid, thereby practically reducing an influence of a metal in wireless communication.

Further, the metal lid with an RFID tag according to the present invention has a configuration where the RFID tag is covered with the insulating member, and the RFID tag is disposed in the ring hole when the insulating member is press-fitted into the ring hole.

According to the thus configured metal lid with an RFID tag of the present invention, the insulating member that insulates and encapsulates the RFID tag is constituted of, e.g., a rubber having fixed elasticity, and the insulating member is formed to become slightly larger than an internal diameter of the ring hole of the opening tab. As a result, the insulating member encapsulating the RFID tag therein can be press-fitted into the ring hole of the tab, thereby attaching the RFID tag to the opening tab.

Consequently, the RFID tag encapsulated in, e.g., a rubber can be disposed to the lid side without requiring a substrate or an adhesive for attachment so that it cannot come off toward the metal lid side. Attachment of the RFID tag can be very easily carried out, and removal can be also readily performed. At the time of disposal/collection after use of a container, segregation of the container and the RFID tag can be facilitated, thereby realizing the metal container that can be subjected to recycling.

Furthermore, when the RFID tag is encapsulated in the insulating member having elasticity, it is protected from contact/impact shocks from the outside, thus providing the highly reliable metal container with the RFID tag.

Moreover, according to the present invention, there is provided a metal container comprising: a container main body; and a metal lid that seals the container main body, wherein the metal lid is formed of the metal lid with an RFID tag according to the present invention.

According to the thus configured metal container of the present invention, when the metal lid with an RFID tag according to the present invention is provided, good wireless communication with a reader/writer can be carried out in a metal container, e.g., an aluminum can or a steel can without spoiling an appearance/design of the container while preventing the RFID tag from being damaged/coming off.

Additionally, in order to achieve the third object, according to the present invention, there is provided a metal article with an RFID tag comprising: a metal article that is partially or entirely formed of a metal member; and an IC chip for the RFID tag including a contact member protruding toward the outside, wherein the metal member functions as an RFID tag antenna when the metal member and the IC chip are electrically connected with each other through the contact member.

According to the thus configured metal article with an RFID tag of the present invention, when the metal member and the IC chip constituting the metal article are electrically connected with each other through the electroconductive contact member, the metal member can function as the RFID tag antenna, and the metal member and the IC chip integrally constitute the RFID tag.

As a result, just mounting the IC chip on, e.g., a lid portion of the metal container enables constituting the metal container with the RFID tag, and the antenna formed of the metal container can assure a sufficient antenna length required for communication while reducing a size of the RFID tag main body, thereby solving a problem, e.g., deterioration in communication characteristics due to a metal.

Further, when the metal container functions as the antenna, an antenna on the tag size can be eliminated, and a cost for the antenna can be reduced. A size of the tag can be decreased as much as possible, thus realizing the small RFID tag for a metal at a low cost.

In particular, the metal article with an RFID tag according to the present invention has a configuration where the metal article is a metal container, the metal member is formed of a part of the metal container, and the metal member is formed of a metal lid that seals the container.

According to the thus configured metal article with an RFID tag of the present invention, when the IC chip is mounted on or connected with the metal lid of the metal container, the metal lid of the metal container can function as an antenna of the RFID tag. That is, the IC chip and the metal lid can constitute the RFID tag for the metal container.

As a result, the metal lid itself serves as an antenna, and communication characteristics is not affected by the metal lid or the metal container. The IC chip can perform communication with a reader/writer. Furthermore, just mounting the IC chip on the metal lid that is apparently a dead space in the container enables constituting the RFID tag, and the antenna formed of the metal lid can assure a sufficient antenna length that is required for communication without spoiling an appearance of the container, thereby performing good wireless communication with the reader/writer.

Moreover, the RFID tag formed of the metal lid is placed on a top surface of the container, and it is not hidden by other containers or commodities even if the metal container is stored/displayed. Communication with the reader/writer can be executed in any state, thus sufficiently demonstrating a function/characteristics as the RFID tag.

Additionally, as the IC chip mounted on the metal lid, an existing general-purpose IC chip can be used, and a small and inexpensive configuration can be obtained. According to the present invention, the RFID tag for a metal that can obtain good communication characteristics can be realized at a low cost.

Further, according to the present invention, when the RFID tag is formed of the lid portion of the container, the RFID tag becomes indistinctive in appearance of the container. Attachment of the tag does not spoil the appearance of the container, and the original appearance/design of the container can be maintained.

Furthermore, when the RFID tag becomes indistinctive in appearance, it does not come under observation, thereby suppressing artificial detachment or damages of the RFID tag.

Moreover, the metal lid rarely comes into contact with other containers, instruments, or commodities at the time of storage, shipment, or display of the container, and the IC chip attached to the metal lid can be effectively prevented from coming into contact with other containers or commodities to be damaged or from coming off the container.

Additionally, the metal article with an RFID tag according to the present invention has a configuration where the metal lid is insulated from a base portion of the container.

In particular, it is preferable for the base portion of the container to be formed of a resin coated metal material whose surface is coated with a resin.

According to the thus configured metal article with an RFID tag of the present invention, when the metal lid and the base portion of the metal container are configured to be positively insulated from each other, the metal lid functioning as an antenna of the RFID tag become electrically conductive with respect to the base portion of the metal container, thereby preventing communication characteristics of the tag from being deteriorated.

When enabling the metal lid of the metal container to function as the antenna of the tag, if a sufficient antenna length can be assured in an area portion of the metal lid, electrical conduction achieved between the base portion of the metal container and the lid portion may deteriorate communication characteristics in some cases.

Thus, according to the present invention, when the lid portion of the metal container is utilized as the antenna, the lid portion is positively insulated from the base portion, and an influence of a metal constituting the base portion can be thereby avoided to obtain good communication characteristics.

Here, insulation of the lid portion of the metal container from the base portion is carried out by applying/putting an insulating member, e.g., a urethane resin in a seam portion where the lid portion comes into contact with/is fitted to the base portion.

However, since the seam portion is press-fitted/tightly appressed in a state where the lid portion and the base portion are firmly caulked, putting, e.g., an urethane resin cannot obtain a sufficient insulating effect in some cases.

Thus, according to the present invention, when the metal lid functions as the RFID tag antenna, the container base portion is constituted of a resin coated metal.

In a can container, e.g., an aluminum can or a steel can, a resin coated can container having a metal component constituting a container base portion being coated with a plastic resin, e.g., PET resin is widely known.

In such a resin coated can container, an outer surface or an inner surface of the metal component constituting the container base portion is covered with, e.g., a PET resin, the base portion covered with such a resin and the lid portion are completely insulated from each other from the beginning irrespective of presence/absence of an urethane resin or the like.

According to the present invention, when the IC chip is mounted on the lid portion of this resin coated can container, the lid portion that is completely insulated from the base portion side functions as the RFID tag antenna. As a result, the lid portion and the base portion are completely insulated from each other without requiring, e.g., additionally filling the seam portion with an insulating member, thereby obtaining good communication characteristics.

Moreover, the metal article with an RFID tag according to the present invention has a configuration where the metal lid comprises an opening tab having a ring hole, the IC chip is arranged in the ring hole of the opening tab, and the IC chip and the metal lid are electrically connected with each other when the contact member comes into contact with the opening tab.

According to the thus configured metal article with an RFID tag of the present invention, when the IC chip is disposed in the ring hole of a pull-tab for opening a container, the ring hole of the opening tab can be utilized as a space for attachment of the RFID tag, and the attached RFID tag can be protected by the ring portion of the pull-tab.

As explained above, the ring hole of the opening tab (the pull-tab) provided in a metal container is configured not to be separated from the metal lid even after opening, and is reduced in size. The ring hole is also small and can be pressed by a finger cushion at the time of opening as different from a conventional large pull-tab that is completely separated from a container.

According to the present invention, the ring hole of the opening tab that is a dead space is effectively exploited as a space for attachment of the IC chip. When the IC chip is disposed in the ring hole of the tab, the space of the metal lid can be effectively utilized without deteriorating an essential function of the opening tab.

Moreover, the IC chip can be hidden in the ring hole to become indistinctive in appearance, and the ring portion can protect the IC chip.

Additionally, the metal article with an RFID tag of the present invention has a configuration where the IC chip is covered with an encapsulating member, and the IC chip is disposed in the ring hole when the encapsulating member is press-fitted into the ring hole.

According to the thus configured metal article with an RFID tag of the present invention, the encapsulating member that covers/encapsulates the IC chip is provided, this encapsulating member is formed f, e.g., a rubber having fixed elasticity, and the encapsulating member is formed to be slightly larger than an internal diameter of the ring hole. As a result, the encapsulating member encapsulating the IC chip therein can be press-fitted in the ring hole of the tab, and the IC chip can be thereby attached to the opening tab.

Further, the contact member protruding from the IC chip protrudes from the encapsulating member toward the outside, and it can be brought into contact with/become electrically conductive with respect to the opening tab.

As a result, the IC chip encapsulated in, e.g., a rubber can be attached to the lid side without requiring a substrate or an adhesive for attachment so that it cannot come off toward the metal lid side. Attachment of the RFID tag can be very easily carried out, and removal can be also readily effected. At the time of disposal/collection after use of the container, segregation of the container and the RFID tag can be facilitated, thereby realizing the metal container that can be subjected to recycling.

Furthermore, when the IC chip is covered with/encapsulated in the encapsulating member, the IC chip can be protected from contact/impact shocks from the outside, thus providing the highly reliable metal container with the RFID tag.

Further, the metal article with an RFID tag according to the present invention has a configuration where the opening tab has a catching groove in which the contact member can be caught.

According to the thus configured metal article with an RFID tag of the present invention, when the encapsulating member is press-fitted and the IC chip is attached to the opening tab, the contact member protruding from the encapsulating member is caught in the catching groove formed in the opening tab, and the IC chip and the opening tab consequently become electrically conductive with respect to each other.

When such a catching groove is formed on the opening tab side, the contact member can be further assuredly brought into contact with the opening tab, and positioning or the like when attaching the IC chip can be facilitated, thereby easily effecting an operation of connecting the contact member to the opening tab.

Moreover, when the contact member is caught in/engaged with the groove, the contact member is firmly held in the catching groove, and a connection failure or the like of the contact member can be avoided for a long period, thereby providing the highly reliable metal container with an RFID tag.

According to the present invention, at first, according to the RFID tag substrate for a metal component of the present invention, any existing RFID tag does not require a special configuration or the like on a tag side, and it can be attached to a container formed of any material and used without being affected by presence/absence of contents in the container, thereby enabling accurate wireless communication in a proper communication range inherent to the tag. Moreover, a metal container can be actively utilized to assure a longer communication distance of the tag.

As a result, even if the RFID tag is used in various kinds of resin containers or metal containers, essential communication characteristics of the RFID tag can be obtained without deteriorating merits of the general-purpose RFID tag, i.e., a small size, a small thickness, and a light weight. In particular, it is possible to provide the RFID tag substrate for a metal component, which is suitable for a resin container, e.g., a PET bottle, or a metal container, e.g., an aluminum can, a steel can, a label can, or a pouch container.

Moreover, at second, according to the metal lid with an RFID tag and a metal container including this metal lid of the present invention, when the insulated and encapsulated RFID tag is attached to the opening tab in the lid portion of the metal container, it does not come into contact with other commodities or instruments or is not hidden by an adjacent metal container. The RFID tag can be attached without spoiling an appearance/design of the container, and an influence of the metal container can be avoided while preventing the RFID tag from being damaged/coming off, thereby effecting good wireless communication with a reader/writer.

Additionally, at third, according to the metal article with an RFID tag of the present invention, when the IC chip is electrically brought into contact with the metal article, the metal article itself can function as an antenna of the RFID tag, and the metal article and the IC chip can integrally constitute the RFID tag.

As a result, the tag main body can be reduced in size, a necessary antenna length can be assured, and an influence of a metal on communication characteristics can be avoided. The tag becomes indistinctive in appearance, and the appearance of the metal container and others can be maintained. The metal article with the RFID tag that can carry out good wireless communication with the reader/writer and is particularly suitable for a metal container, e.g., an aluminum can or a steel can be realized.

DETAILED DESCRIPTION OF THE PREFERRED EMBODIMENTS

Preferred embodiments according to the present invention will now be explained hereinafter with reference to the accompanying drawings.

First Embodiment

As a first embodiment according to the present invention, a preferred embodiment of an RFID tag substrate and an RFID tag including this RFID tag substrate according to the present invention will now be explained with reference to FIGS. 1 to 12.

[RFID Tag Substrate]

Figure 1:
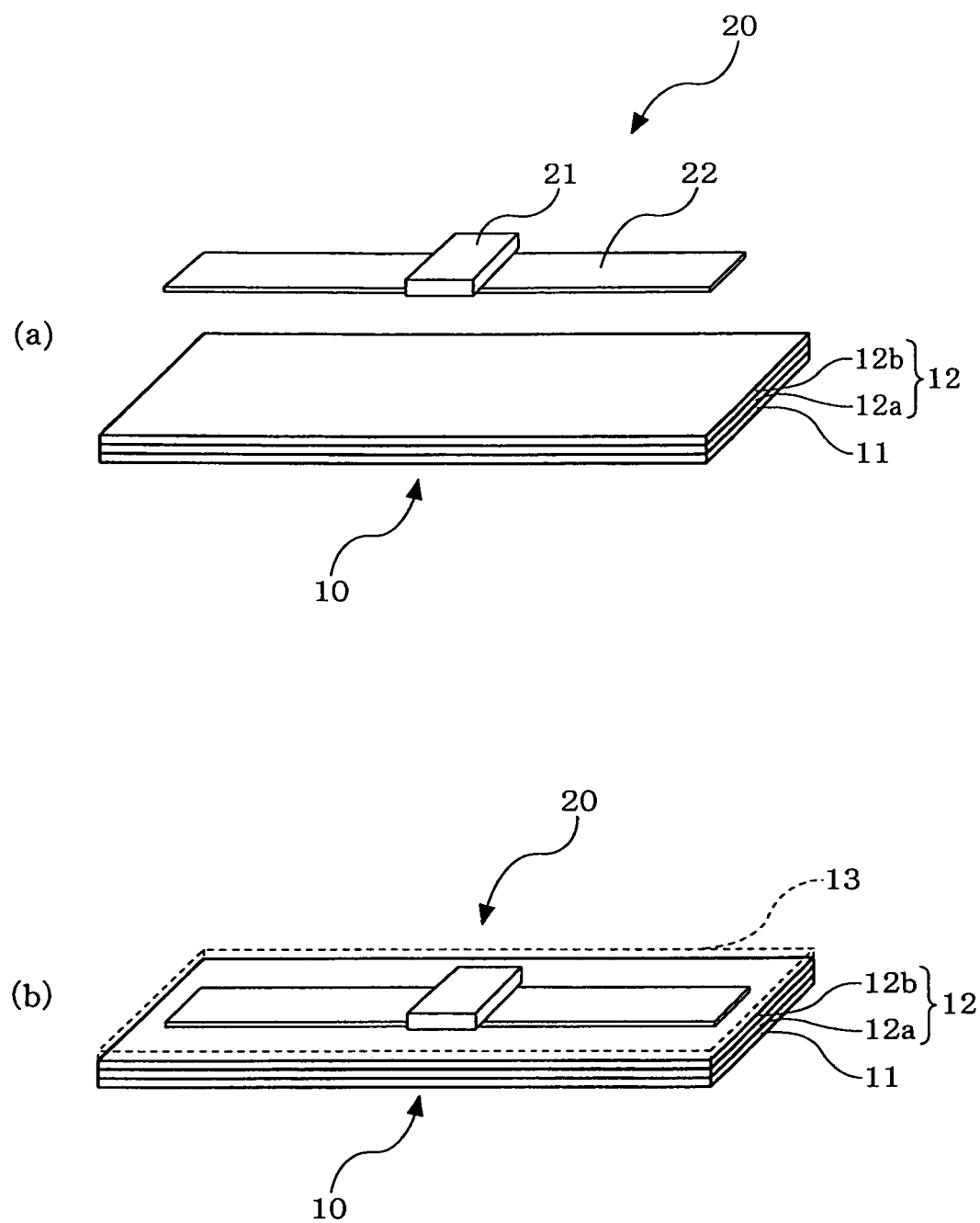
FIG. 1 are primary part perspective views schematically showing an RFID tag substrate and an RFID tag according to a first embodiment of the present invention, wherein (a) shows a state before the RFID tag is mounted and (b) shows a state where the RFID tag is mounted.

FIG. 1 are primary part perspective views schematically showing an RFID tag substrate according to an embodiment of the present invention, wherein (a) shows a state before an RFID tag is mounted and (b) shows a state where the RFID tag is mounted.

As shown in the drawings, an RFID tag substrate 10 according to this embodiment is a substrate that has an RFID tag 20 mounted thereon to constitute a part of the tag, and the RFID tag 20 that performs wireless communication with a reader/writer (not shown) is disposed at a predetermined position on a substrate surface.

Specifically, the RFID tag substrate 10 includes a substrate layer 11 and a functional layer 12, the RFID tag 20 including an IC chip 21 and an antenna 22 is mounted at a predetermined position on a surface of the functional layer 12, and the surface is covered with a cover film layer 13.

Here, the RFID tag substrate 10 according to this embodiment is a substrate on which the RFID tag 20 is mounted/supported, and the RFID tag substrate 10 having a size enabling mounting the RFID tag 20 thereon can suffice. However, the RFID tag substrate 10 can be formed with a size enabling wrapping an entire container as a wrapping target body, e.g., a PET bottle or a label can. Further, it can be formed to wrap a part of a container, e.g., wrap a base portion of the container.

Furthermore, as will be explained later, the RFID tag substrate 10 may be disposed on a surface of a cap of a PET bottle, or included/embedded in the cap (see FIGS. 6 to 9). In such a case, the RFID tag substrate 10 constitutes a part of the cap.

Moreover, the RFID tag substrate 10 can be used as a thin-film-like wrapping body that is, e.g., wound around an outer periphery of a container and can be also used as a wrapping body that constitutes a plastic container itself, e.g., a PET resin container.

That is, the RFID tag substrate 10 according to the present invention is used as a substrate that constitutes a part of the RFID tag 20, and the RFID tag substrate 10 formed into a film-like shape like a shrink film of a resin container or a label of a label can wrap an entire container. Additionally, the RFID tag substrate 10 can wrap a part of a container on which the RFID tag is mounted alone as a label. Further, the RFID tag substrate 10 according to the present invention having a predetermined thickness and strength can constitute a plastic container itself.

[Substrate Layer]

The substrate layer 11 is a layer serving as a substrate of the RFID tag substrate 10, and formed into a thin-film-like shape with, e.g., a PET resin.

Specifically. the substrate layer 11 is formed of a thermoplastic resin, e.g., polyester, polyethylene, polypropylene, or polyamide.

For example, the thermoplastic resin based resin can be formed into a thin film, thereby constituting the substrate layer 11. As the thermoplastic polyester based resin, a copolymer or a blend mainly containing, e.g., a polyethylene terephthalate or a polybutylene terephthalate and having a melting point of approximately 200 to 260° C. can be used. Furthermore, a thickness of the polyester based resin film is usually approximately 5 to 50 µm.

Considering a thickness, strength, durability, and others of the RFID tag substrate 10, a range of approximately 5 µm to 100 µm is preferable as a thickness of the substrate layer.

This substrate layer 11 may be a single layer (a one layer) or a multilayer formed of, e.g., two layers or three layers. The multilayer can be formed by bonding drawn films through hot gluing or an adhesive layer.

Moreover, the substrate layer 11 can be constituted of a film of the PET resin as well as a thermosetting resin layer or a thermoplastic resin layer formed of, e.g., a polyurethane resin or a polyester rein.

The thermosetting resin or the thermoplastic resin, e.g., a polyurethane rein or a polyester rein can be applied to the substrate and others, and a coating thickness of such a resin can be readily controlled. Therefore, the PET resin or the like is used as a base material and a polyurethane resin or a polyester rein is applied to a surface of the base material, thereby forming the substrate layer 11.

Additionally, such a polyurethane resin or a polyester resin can also serve as a foundation of coating of the functional layer 12. For example, when the plurality of functional layers 12 are laminated or stacked, the functional layer 12 and the substrate resin layer formed of a polyurethane resin or a polyester resin can be alternately applied/laminated or stacked (see a substrate resin layer 11a in FIG. 5 that will be explained later).

Further, such a substrate resin layer formed of a thermosetting resin or a thermoplastic resin can function as a distance layer 14 (see FIG. 3(d)) that separates the RFID tag 20 from a container like a later-explained nonwoven fabric layer.

Furthermore, the substrate layer 11 can be also constituted of a metal layer.

Specifically, as the substrate layer 11 that supports the functional layer 12, a metal layer made of, e.g., an Al foil layer can be provided.

In the RFID tag substrate 10 according to this embodiment, when the functional layer 12 having a later-explained predetermined refraction index is provided, communication characteristics are not deteriorated even if the RFID tag 20 is disposed to a metal. Therefore, a metal layer can be laminated or stacked on the substrate layer 11, or the substrate layer 11 itself can be constituted of a metal.

As a thickness of the metal layer, a range of approximately 5 µm to 100 µm is preferable considering a thickness, strength, durability, and others of the RFID tag substrate 10.

Moreover, when the substrate layer 11 is formed of a metal in this manner, an influence of contents in a container can be reduced, thereby realizing the RFID tag substrate that is particularly preferable for a PET bottle container filled with, e.g., drinking water.

According to the RFID tag substrate 10 of this embodiment, when the functional layer 12 having a predetermined refraction index is provided, an influence of water can be sufficiently suppressed/reduced even though a container is filled with water, thereby obtaining good communication characteristics.

Meanwhile, for example, when the RFID tag is disposed on a front surface or a rear surface of a cap of a PET bottle container (see FIGS. 6 to 9), an influence of water must be considered depending on a water level of water put into the bottle container, i.e., a distance between a water surface and the RFID tag.

In general, a water level of water put into the bottle container is placed at a position that is approximately 1 cm below a bottle opening portion. If a distance from a water surface is approximately 5 mm, the RFID tag 20 including the RFID tag substrate 10 according to this embodiment can obtain good communication characteristics, and hence an influence of water does not have to be considered in particular even though the RFID tag is disposed to the cap of the bottle.

However, in case of a fully filled state where water is put to reach the bottle opening portion, a distance between the RFID tag disposed to the cap and a water surface may be reduced to be less than 5 mm (see FIG. 9 that will be explained later).

Thus, in such a case, when a metal foil layer formed of, e.g., an Al foil is provided as the substrate layer 11 of the RFID tag substrate 10, electric waves received by the RFID tag can be reflected on the metal foil layer, thereby obtaining good communication characteristics while eliminating an influence of water in the bottle. Therefore, the substrate layer 11 including, e.g., a metal foil layer is suitable as a substrate for the RFID tag that is disposed to a cap portion of a PET bottle container in particular.

It is to be noted that an inside plug having a space of approximately 5 mm may be provided in a cap to assure a distance between the RFID tag and a water surface.

When the substrate layer 11 serving as a substrate is provided in this manner, the RFID tag substrate 10 can be thinly and longly formed into a thin-film-like shape that can be rolled up, and it is preferable as the RFID tag substrate 10 that wraps a container having an arbitrary shape or size.

It is to be noted that this substrate layer 11 can be appropriately eliminated. As will be explained later, the RFID tag substrate 10 according to this embodiment includes a distance layer 14 that separates the RFID tag 20 from a container (see FIG. 3(d)). If this distance layer 14 can be used as a substrate to directly laminate the functional layer 12 on the distance layer 14, the substrate layer 11 can be omitted.

In this sense, the substrate layer 11 can be regarded as a layer constituting a part of the distance layer 14. A thickness of the substrate layer 11 as well as the distance layer 14 formed of, e.g., a nonwoven fabric can separate the RFID tag 20 from a container, thus obtaining good communication characteristics. That is, when both the distance layer 14 and the substrate layer 11 are provided, a thickness of "the distance layer+the resin layer" enables the RFID tag 20 to be separated from a container by a predetermined distance.

[Functional Layer]

The functional layer 12 is a layer that is laminated or stacked on the surface of the substrate layer 11, and has a predetermined relative dielectric constant and a relative permeability.

Figure 2:
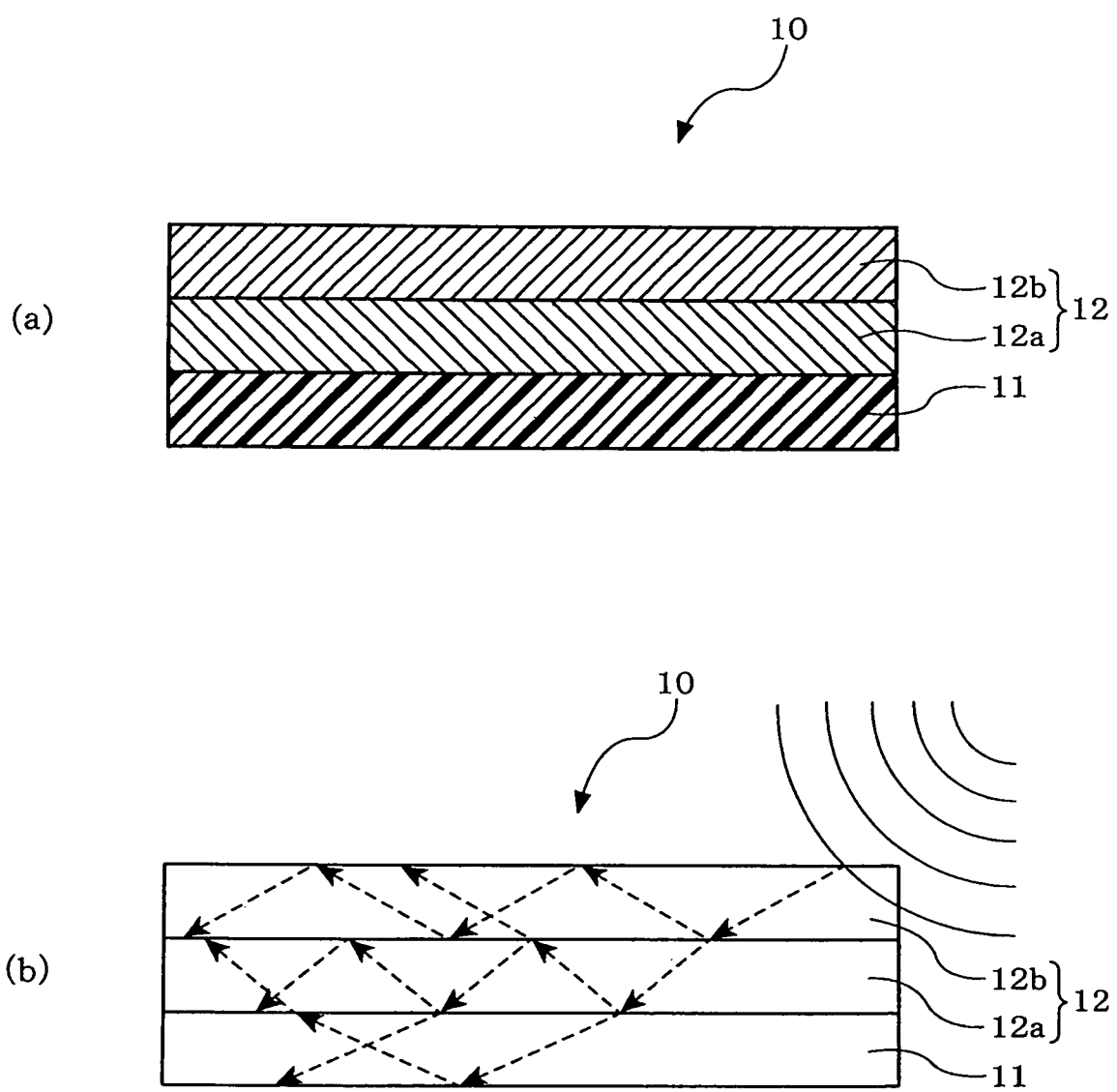
FIG. 2 are explanatory views schematically showing the RFID tag substrate depicted in FIG. 1, wherein (a) is a front view of the substrate and (b) is a front view showing a state where electric waves are transmitted through the substrate.
Figure 3:
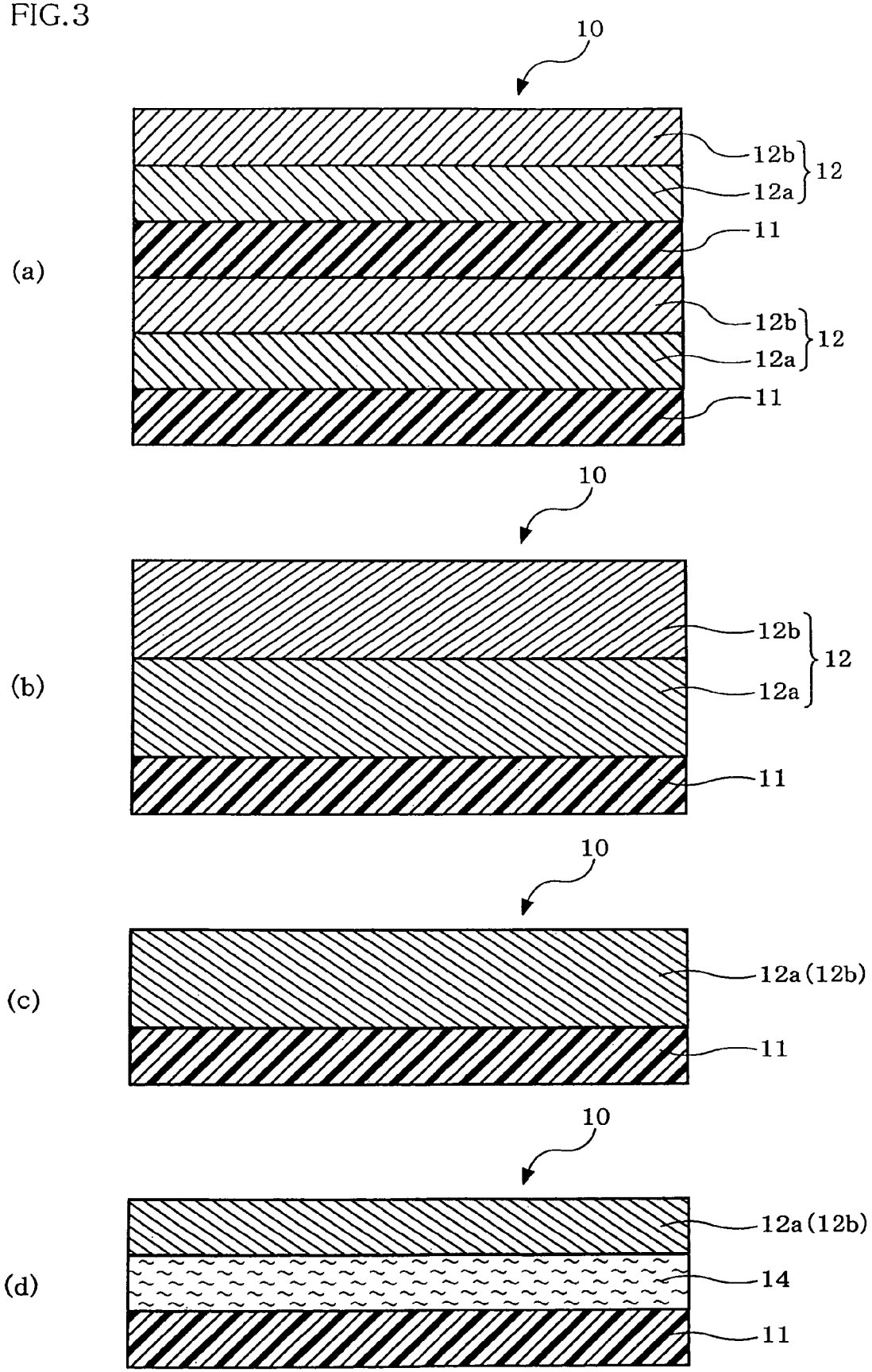
FIG. 3 area front views of the substrate showing how the RFID tag substrate is laminated or stacked.

In this embodiment, as shown in FIGS. 1 and 2, the functional layer 12 is formed of two layers having different characteristics. One of the two layers is a high-dielectric-constant layer 12a having a predetermined dielectric constant, and the other is a high-permeability layer 12b having a predetermined permeability.

Moreover, the functional layer 12 is configured in such a manner that a product of the relative dielectric constant and the relative permeability of the high-dielectric-constant layer 12a and the high-permeability layer 12b as a whole becomes 250 or above. Additionally, in order to obtain such characteristics, the functional layer 12 is configured in such a manner that the relative dielectric constant of the high-dielectric-constant layer 12a and the high-permeability layer 12b becomes 80 or above.

More specifically, the functional layer 12 is configured in such a manner that the relative dielectric constant of the high-dielectric-constant layer 12a becomes 90 or above and the relative permeability of the high-permeability becomes 3.8 or above.

When the functional layer 12 having the relative permeability and the relative dielectric constant set to predetermined values in this manner is provided, a long electric wave path in the substrate can be assured as shown in FIG. 2(b).

In general, a refraction index is obtained based on a dielectric constant and a permeability of its member, and the refraction index increases when the dielectric constant and the permeability become higher. A refraction index n is expressed as a value obtained by dividing a light velocity c in a vacuum by a light velocity v in a medium, and can be obtained by the following expression (Expression 1).

$$n = \frac{c}{v} = \sqrt{\frac{\epsilon\mu}{\epsilon_0\mu_0}} \quad [\text{Expression 1}]$$

Here, $\epsilon$ is a dielectric constant of a member, $\mu$ is a permeability of a material, $\epsilon_0$ is a dielectric constant of a vacuum, and $\mu_0$ is a permeability of the vacuum.

In this embodiment, $\pi = \epsilon\mu/\epsilon_0\mu_0$ is provided to enable an easy calculation, and this value is determined as an index. For example, in order to realize an air layer having a size of 30 mm in 1 mm, it can be considered that setting to achieve $\pi=900$ based on the expression of the refraction index can suffice.

Thus, in this embodiment, when the high-dielectric-constant layer 12a having a predetermined dielectric constant and the high-permeability layer 12b having a predetermined permeability are provided, a desired refraction index can be obtained in the entire functional layer 12.

It is to be noted that the relative dielectric constant and the relative permeability of the functional layer can be measured based on an S parameter reflection method. (Technical Report of Institute of Telecommunications Engineers, Vol. 84, No. 310).

An outline of the S parameter reflection method will now be explained.

[S Parameter Reflection Method]

A measurement method of a relative dielectric constant and a relative permeability based on the S parameter reflection method is a technique of measuring a reflection amount, a transmission amount, and a phase to calculate a complex relative dielectric constant and a complex relative permeability when an electric wave signal having a frequency that is to be measured vertically enters a sample.

Specifically, the measurement is carried out by using a network analyzer and a coaxial tube, and a measurement procedure is as follows.

(1) Full Reflection Measurement (Reference)

First, a metal sheet is disposed at a distal end of the coaxial tube (a sample is not disposed).

Then, the network analyzer is allowed to emit an electric wave signal having a frequency to be measured toward the coaxial tube, and S11 and a phase are measured.

Here, S11 means an intensity of electric waves received by the network analyzer and an intensity of electric waves emitted by the network analyzer. The phase means a phase difference in the intensity of the electric waves received by the network analyzer and the electric waves emitted by the network analyzer.

(2) Pseudo Transmission Measurement (Reference)

First, a jig through which electric waves are readily transmitted is disposed at the distal end of the coaxial tube (the sample is not disposed).

Then, the network analyzer is allowed to emit an electric wave signal having a frequency to be measured toward the coaxial tube, and S11 and a phase are measured.

(3) Sample Reflection Measurement

First, a metal sheet is disposed at the distal end of the coaxial tube, and a sample is placed on a surface of the metal sheet in the coaxial tube.

Then, the network analyzer is allowed to emit an electric wave signal having a frequency to be measured toward the coaxial tube, and S11 and a phase are measured.

(4) Sample Transmission Measurement

First, a jig through which electric waves are readily transmitted is disposed at the distal end of the coaxial tube, and a sample is placed on a surface of the jig in the coaxial tube.

Then, the network analyzer is allowed to emit an electric wave signal having a frequency to be measured toward the coaxial tube, and S11 and a phase are measured.

When the above-explained four measurements are carried out, a complex relative dielectric constant and a complex relative permeability can be derived based on the calculation.

The high-dielectric-constant layer 12a can be constituted when a metal powder that is formed of Al and has a flat shape is contained in a binder made of, e.g., a resin material.

Additionally, the high-permeability layer 12b can be constituted when a metal powder having a flat shape formed of at least one of magnetic materials Al, Fe—Si, Cu, Fe, and Ni or a metal oxide powder formed of at least one of magnetic materials $TiO_2$, $Fe_2O_3C$, and ferrite is contained in a binder made of, e.g., a resin material.

Each of the high-dielectric-constant layer 12a and the high-permeability layer 12b can be formed as a coating material and laminated or stacked by coating as will be explained later. Each of these layers is formed with a thickness (a film thickness) of approximately 10 to 20 μm.

Table 1 shows relative dielectric constants and relative permeabilities of the high-dielectric-constant layer 12a formed of Al and the high-permeability layer 12b formed of Fe—Si in a band of 2.45 GHz, and Table 2 shows relative dielectric constants, relative permeabilities, and π of the high-dielectric-constant layer 12a, the high-permeability layer 12b, and the functional layer 12 as a whole in the band of 2.45 GHz.

Incidentally, as to values in Table 1, both the dielectric constant and the permeability increase to become close to Max when dispersibility of the metal powder is improved.

Further, as shown in Table 2, it can be understood that a high refraction index can be obtained when each of the high-dielectric-constant layer 12a and the high-permeability layer 12b has a layer configuration.

TABLE 1

|  | Relative dielectric constant | Relative permeability |
|---|---|---|
| Al (Min) | 117 | 1.8 |
| Al (Max) | 175.2 | 2.6 |
| Fe—Si (Min) | 48.4 | 4.4 |
| Fe—Si (Max) | 61.5 | 6.2 |

TABLE 2

|  | Relative dielectric constant | Relative permeability | π |
|---|---|---|---|
| Al | 156.8 | 2.0 | 313 |
| Fe—Si | 50.5 | 4.6 | 231 |
| Fe—Si (three layers) + Al (three layers) | 136.1 | 3.4 | 462 |

As explained above, according to this embodiment, when the predetermined relative dielectric constant and relative permeability are obtained, an arbitrary metal material or the like can be selected and used as the functional layer 12 that assures a communication distance of the RFID tag 20, thereby forming the functional layer 12 having the preferable dielectric constant and permeability associated with an output or frequency characteristics of the RFID tag 20 to be utilized.

It is to be noted that, in this embodiment, when a metal selected from preferable materials is a powder body having a flat shape, the powder body can be evenly and uniformly dispersed/mixed in a resin material serving as a binder as will be explained later.

Furthermore, when the predetermined relative dielectric constant and relative permeability can be obtained in the entire substrate, a thickness of each layer or the number of layers as the functional layer 12 can be arbitrarily set in accordance with communication characteristics, a shape, a size, and others of the tag to be mounted.

For example, as shown in FIG. 3(a), an arbitrary number of functional layers 12 can be laminated or stacked. In the example shown in this drawing, the substrate layer 11 and the functional layer 12 having the same configuration form one set, and two sets are laminated or stacked.

Moreover, as shown in FIG. 3(b), a thickness of the high-dielectric-constant layer 12a or the high-permeability layer 12b in the functional layer 12 can be increased (or decreased). In the example shown in this drawing, thicknesses of both the high-dielectric-constant layer 12a and the high-permeability layer 12b are increased to provide the same thickness, as that of the substrate depicted in FIG. 3(a) as the entire substrate.

Additionally, as shown in FIG. 3(c), the functional layer 12 can be constituted of the high-dielectric-constant layer 12a (or the high-permeability layer 12b) alone. It is to be noted that, although not shown, an arbitrary number of functional layers 12 each of which is constituted of the high-dielectric-constant layer 12a (or the high-permeability layer 12b) alone can be likewise laminated or stacked.

Further, as shown in FIG. 3(d), the distance layer 14 formed of, e.g., a nonwoven fabric that will be explained later may be provided between the substrate layer 11 and the functional layer 12.

It is to be noted that, although not shown, the distance layer 14 may be laminated on the front surface side of the functional layer 12. In this case, the RFID tag 20 to be mounted is mounted on the front surface of the distance layer 14.

Furthermore, the functional layer 12 having the above-explained configuration is constituted of a coating material that can be applied to the surface of the substrate layer 11. The coating material is obtained by dispersing a metal powder as a filler in a resin as a binder. That is, the high-dielectric-constant layer 12a or the high-permeability layer 12b constituting the functional layer 12 is formed by coating as a liquid, and it is laminated or stacked and formed when it is applied to the surface of the substrate layer 11. As a result, a manufacturing process of the functional layer 12 can be very easily and rapidly carried out.

Moreover, since the functional layer 12 can be formed by simply applying the coating material in this manner, the functional layer 12 having an arbitrary size/shape can be easily and rapidly applied and formed at an arbitrary part of the substrate layer 11 in accordance with a size or an attachment part of the RFID tag 20 to be used by applying the coating material to a mounting part on which the RFID tag 20 is disposed.

Therefore, when the RFID tag 20 is randomly disposed at an arbitrary part on the RFID tag substrate 10, the coating material is applied to the entire surface of the substrate layer 11 to form the functional layer 12.

[Manufacture of Coating Material]

As a manufacturing method of the coating material constituting the functional layer 12, the coating material can be manufactured by mixing a filler made of a metal powder of, e.g., Fe—Si or Al in a solvent of a resin serving as a binder, e.g., a varnish, a primer, epoxy, polyurethane, or polyester.

Figure 4:
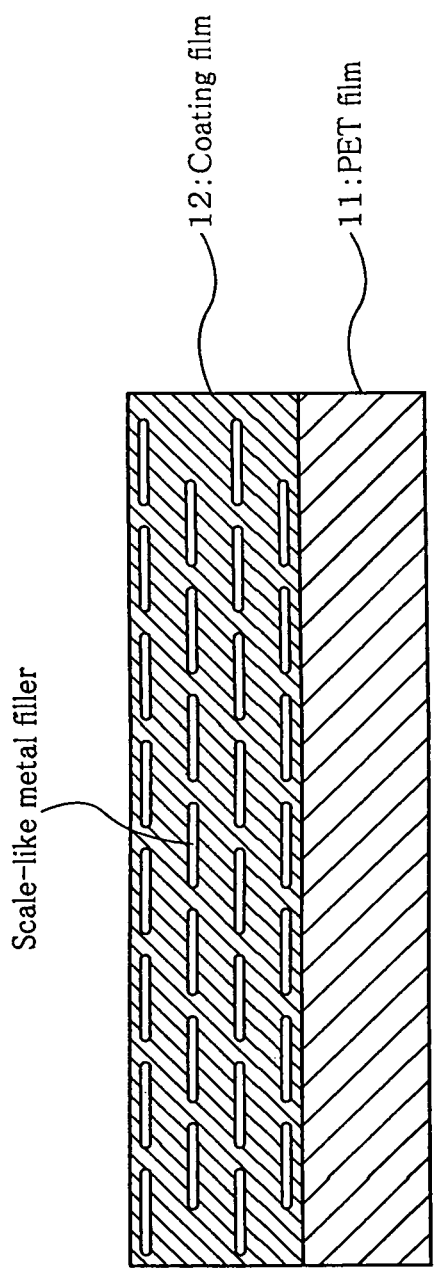
FIG. 4 is a front view of the substrate schematically showing a coating material constituting a functional layer of the RFID tag substrate according to the present invention.

As shown in FIG. 4, it is preferable for the metal powder as the filler to have a flat shape (a scale-like shape) so that it can be evenly and uniformly mixed in a resin solvent.

However, the powder may have a spherical shape, and both the flat shape and the spherical shape may be mixed. Additionally, three rollers and others may be used to disperse the filler.

As a particle diameter of the flat shape of the metal powder to be used, a range of, e.g., 25 nm to 2000 nm is preferable. This is also applied to an example where the powder has a spherical shape.

As the solvent, an oil-based or water-based coating material can be used, and it is not restricted to a specific type, e.g., a thermal drying type or a UV curing type.

Further, as a mixing ratio of the filler and the solvent, considering an effect of refraction or a viscosity enabling application to a metal, when a drained weight of the binder is determined as 100, a range of 100 to 1000 parts by weight (better ratio: approximately 350 parts by weight) of the filler is preferable.

[Coating Method of Coating Material]

When coating the substrate layer 11 with the coating material, a bar coater, a roll coater, or a brush can be used. Furthermore, although the substrate layer 11 may be directly coated with the coating material, an adhesive, e.g., a primer may be applied to the upper side of the substrate layer 11 and then the coating material may be applied thereto considering close contact.

Figure 5:
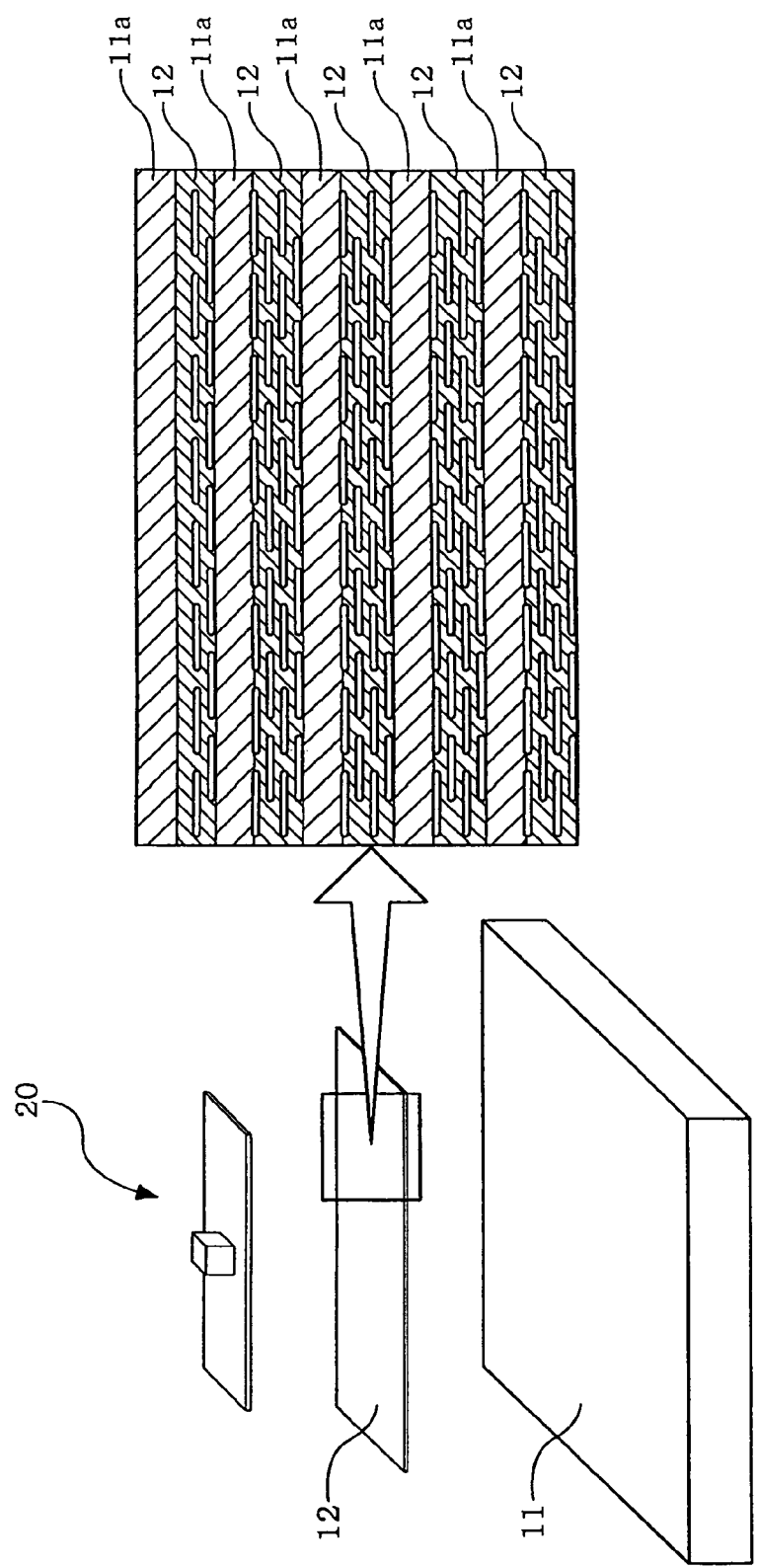
FIG. 5 is a front view of the substrate schematically showing a state where the coating material constituting the functional layer of the RFID tag substrate according to the present invention is applied in a plurality of layers.

Moreover, as shown in FIG. 5, the coating material serving as the functional layer 12 and the substrate resin layer 11a formed of a varnish, a primer, a polyurethane resin, or a polyester resin may be alternately applied and laminated or stacked on the substrate layer 11 made of a PET resin or an Al foil. In this case, the substrate resin layer is preferable as an uppermost layer.

As a coating thickness of the coating material, a range of approximately 10 μm to 200 μm is preferable when a thickness of the RFID tag substrate 10 is taken into consideration although it depends on a mixing concentration of the metal powder in the solvent and a size of the powder.

[Distance Layer]

The distance layer 14 is a layer that is laminated on the substrate layer 11 and separates the RFID tag 20 from a container (see FIG. 3(d)).

The distance layer 14 can be formed of a nonwoven fabric, a resin foam, or a thermosetting resin or a thermoplastic resin, e.g., a polyurethane resin or a polyester resin.

In order to reduce an influence of contents in a resin container or an influence of a metal container with respect to the RFID tag 20, setting an effective relative dielectric constant of a tag mounting part to 1.0 (air) is ideally desirable, but this means that the RFID tag floats in air, and it is difficult to adopt such a configuration with the RFID tag substrate 10 alone.

Thus, when the distance layer 14 formed of a nonwoven fabric or a resin foam is formed, an effective relative dielectric constant close that when the RFID tag floats in air can be obtained.

When the nonwoven fabric is formed of, e.g., a PET resin, many cavities are formed therein. Therefore, the effective relative dielectric constant can be reduced smaller than that of the PET resin itself, and can be set to a value closer to 1.0 that is an ideal value. Likewise, in case of the resin foam, it is filled with air or a gas, e.g., nitrogen or a carbon dioxide therein, and its effective relative dielectric constant can be set to a value close to 1.0.

Furthermore, the nonwoven fabric or the resin foam is characterized in a degree of freedom in design, and the distance layer with a desired thickness and size can be formed at a low cost.

According to this embodiment, the nonwoven fabric or the resin foam is adopted as the distance layer 14 that separates the RFID tag 20 from a container, thereby avoiding a change in communication characteristics caused when the RFID tag comes into contact with/moves close to a metal or deterioration in communication characteristics due to an influence of contents.

As the nonwoven fabric formed of an arbitrary material, e.g., a synthesized fiber or a natural fiber can be selected, and its thickness, size, or shape can be arbitrarily set in accordance with the RFID tag 20 to be mounted.

Moreover, although the resin foam preferable as the distance layer 14 can be formed by various methods. For example, there are a method of using a foaming agent, a method of injecting air or a nitrogen gas when mixing (kneading) a polymer, a method of utilizing a chemical reaction, and others.

The nonwoven fabric or the resin foam constituting this distance layer 14 is bonded/laminated on the surface of the substrate layer 11 serving as a substrate through, e.g., an adhesive or heat sealing.

It is to be noted that, besides the nonwoven fabric or the resin foam, for example, applying a resin coating material in a reticular pattern enables forming the distance layer having cavities therein from the same viewpoint, and the obtained layer can be adopted as the distance layer 14.

Moreover, as explained above, when the substrate layer 11 functions as the distance layer 14 formed of, e.g., a nonwoven fabric and a communication gain of the RFID tag can be sufficiently assured, the substrate layer 11 can be used as the distance layer 14, and the distance layer 14 formed of, e.g., a nonwoven fabric can be omitted.

[RFID Tag]

As shown in FIG. 1, the RFID tag 20 has the IC chip 21 and the antenna 22, and the IC chip 21 and the antenna 222 are mounted on a substrate formed of, e.g., a resin or glass and integrally encapsulated to constitute one RFID tag.

Additionally, according to this embodiment, the RFID tag substrate 10 is used as a substrate for the RFID tag 20, and the RFID tag 20 is mounted on the surface of the functional layer 12 of the RFID tag substrate 10 as shown in FIG. 1.

It is to be noted that, as explained above, the distance layer 14 formed of, e.g., a nonwoven fabric may be provided on the surface of the functional layer 12, and the RFID tag 20 is mounted on the surface of the distance layer 14 in this case.

In a manufacturing process of a container that is wrapped with the RFID tag substrate 10, this RFID tag 20 can be mounted on the RFID tag substrate 10 in advance, and it can be also disposed to the manufactured/shipped RFID tag substrate 10 or a container wrapped with the RFID tag substrate 10 afterward.

The example shown in FIG. 1 is a case where the RFID tag 20 is previously mounted in the manufacturing process of the RFID tag substrate 10, and the RFID tag 20 mounted on the surface of the functional layer 12 is further covered with the cover film layer 13.

Here, the IC chip provided in the RFID tag 20 is constituted of a semiconductor chip, e.g., a memory, and can record data of, e.g., several-hundred bits to several-kilo bits.

Further, reading and writing (data calling, registration, deletion, updating, and others) are executed by wireless communication with a reader/writer through the antenna, and data recorded in the IC chip is thereby recognized.

As data recorded in the IC chip, arbitrary information or various kinds of data, e.g., a name or a weight of a commodity, an interior content, a name of a manufacturer/seller, a location of manufacture, a production date, an expiration date, and others can be recorded, and such data can be also rewritten. Recording or rewriting data can be executed by using a dedicated reader/writer.

Furthermore, as frequency bands used in the RFID tag 20, there are several types of frequency bands, e.g., a band that is not greater than 135 kHz, a band of 13.56 MHz, a band of 860 M to 960 MHz belonging to a so-called UHF band, a band of 2.45 GHz, and others. A communication distance enabling wireless communication differs depending on a frequency band to be used, and an optimum antenna length varies depending on a frequency band.

In this embodiment, the microwave type RFID tag 20 that uses a UHF band or a 2.45 GHz band is utilized in particular.

FIG. 2(b) schematically shows a state where electric waves received by the RFID tag 20 are transmitted while being refracted in the substrate.

As shown in the drawing, electric waves received by the RFID tag 20 are transmitted while being refracted in the high-dielectric-constant layer 12a and the high-permeability layer 12b of the functional layer 12 in the substrate.

As a result, even if a thickness of the substrate is reduced, the same electric wave length as that when the RFID tag 20 is disposed and separated from an object can be substantially assured, thereby avoiding deterioration in communication characteristics due to a metal container to which the tag is disposed.

Furthermore, when the tag is disposed to the metal container, a part of electric waves transmitted through the substrate layer 11 is reflected on the metal container to thereby increase a communication distance. Even if an antenna size is reduced, a predetermined communication distance can be assured.

[Manufacturing Method of RFID Tag Substrate]

A manufacturing method of the RFID tag substrate 10 according to this embodiment will now be explained.

In the RFID tag substrate 10, the substrate layer 11 is first formed into a thin film by using a plastic resin, e.g., a PET resin or a metal, e.g., an Al oil, and a coating material obtained by dispersing the metal power in a binder is applied to a surface of this substrate layer 11 to form the functional layer 12.

At this moment, the coating material applied to the substrate layer 11 can be applied to the entire surface of the substrate layer 11, and can be also applied to a part on which the RFID tag 20 is mounted.

Further, the substrate layer 11 formed of, e.g., an Al foil is coated with the functional layer 12 (coating), the substrate resin layer 11a formed of a thermosetting resin or a thermoplastic resin, e.g., a polyurethane resin or a polyester resin is applied thereto, the functional layer 12 is applied thereto, and the substrate resin layer 11a is again applied thereto. Repeating this process enables easily forming the RFID tag substrate 10 having multiple layers that are the functional layer 12 and the substrate resin layer 11a (see the substrate resin layer 11a depicted in FIG. 5).

Furthermore, the distance layer 14 formed of, e.g., nonwoven fabric is laminated on the surface of the substrate layer 11 before forming the functional layer 12 or on the surface of the functional layer 12 laminated on the substrate layer 11 as required.

The nonwoven fabric is secured on the formation surface by means of, e.g., an adhesive or heat sealing so that it is not peeled off.

Moreover, the distance layer 14 can be also formed by applying a resin coating material to the formation surface. That is, when the resin coating material is applied in a reticular pattern to an arbitrary part on the surface of the substrate layer 11 or the functional layer 12, the distance layer 14 having cavities therein can be formed.

The above-explained process brings the RFID tag substrate 10 according to this embodiment to completion.

It is to be noted that the process order is just an example, and the RFID tag substrate 10 can be manufactured by other processes. As explained above, although the distance layer 14 can be laminated on the functional layer 12, it can be laminated on the substrate layer 11 before the functional layer 12.

Moreover, the laminating order of the substrate layer 11 and the high-dielectric-constant layer 12a and the high-permeability layer 12b of the function layer 12 (and the distance layer 14) can be arbitrarily changed. In the example depicted in FIG. 3, the substrate layer 11, (the distance layer 14), the high-dielectric-constant layer 12a, and the high-permeability layer 12b are laminated or stacked from a container side in the mentioned order. However, other laminating order may be adopted. For example, the layers may be laminated or stacked in the order of the substrate layer 11, the distance layer 14, the high-permeability layer 12b, and the high-dielectric-constant layer 12a, or in the order of the distance layer 14, the substrate layer 11, the high-dielectric-constant layer 12a, and the high-permeability layer 12b.

[RFID Tag Having Built-In Cap]

The thus configured RFID tag substrate 10 can be disposed on a surface of a cap of a PET bottle or a can bottle or included/embedded in the cap together with the RFID tag 20 to be mounted.

Figure 6:
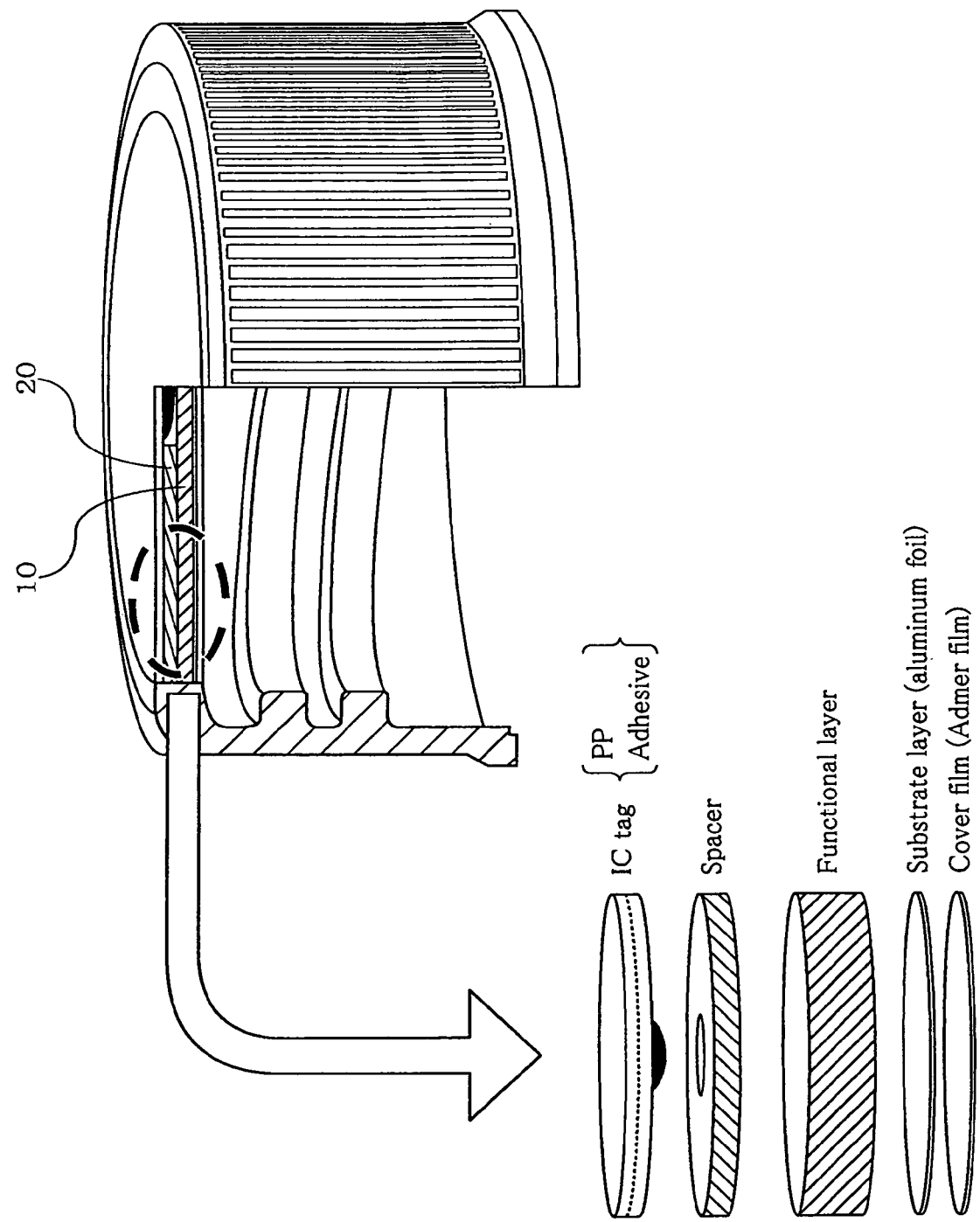
FIG. 6 is a primary part cross-sectional perspective view showing a cap of, e.g., a PET bottle container integrally including the RFID tag substrate according to the present invention by insert molding.

Specifically, as shown in FIG. 6, the RFID tag mounted on the RFID tag substrate 10 can be integrally molded with the cap by insert molding.

Figure 7:
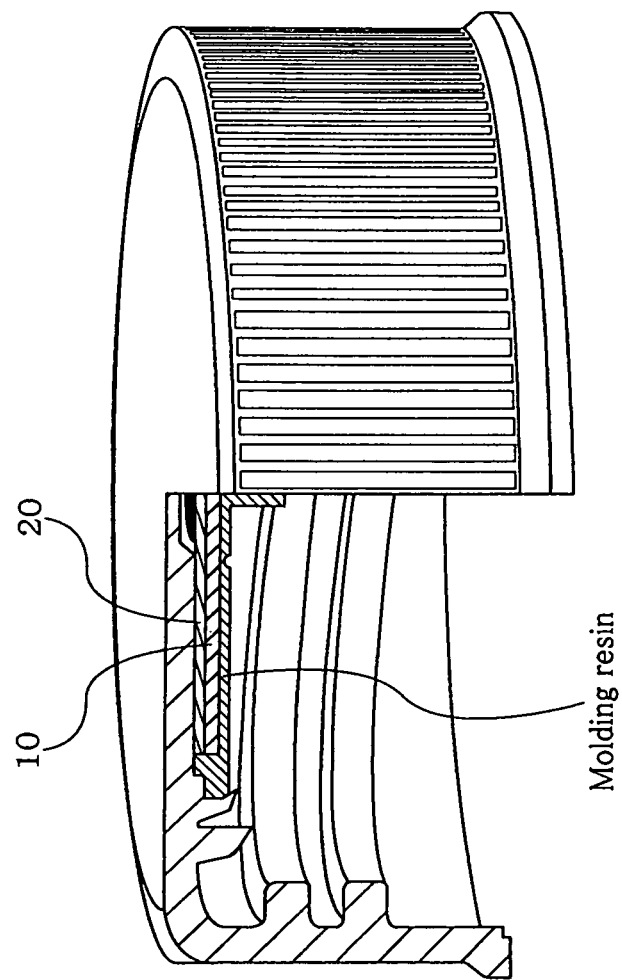
FIG. 7 is a primary part cross-sectional perspective view showing a cap of, e.g., a PET bottle container in which the RFID tag substrate according to the present invention is encapsulated by using a molding resin.

Additionally, as shown in FIG. 7, the RFID tag substrate 10 having the RFID tag 20 mounted thereon can be arranged on a cap rear surface (a top surface) of, e.g., a PET bottle, and this structure may be encapsulated in a resin, e.g., a molding resin to embed the RFID tag in the cap.

Figure 8:
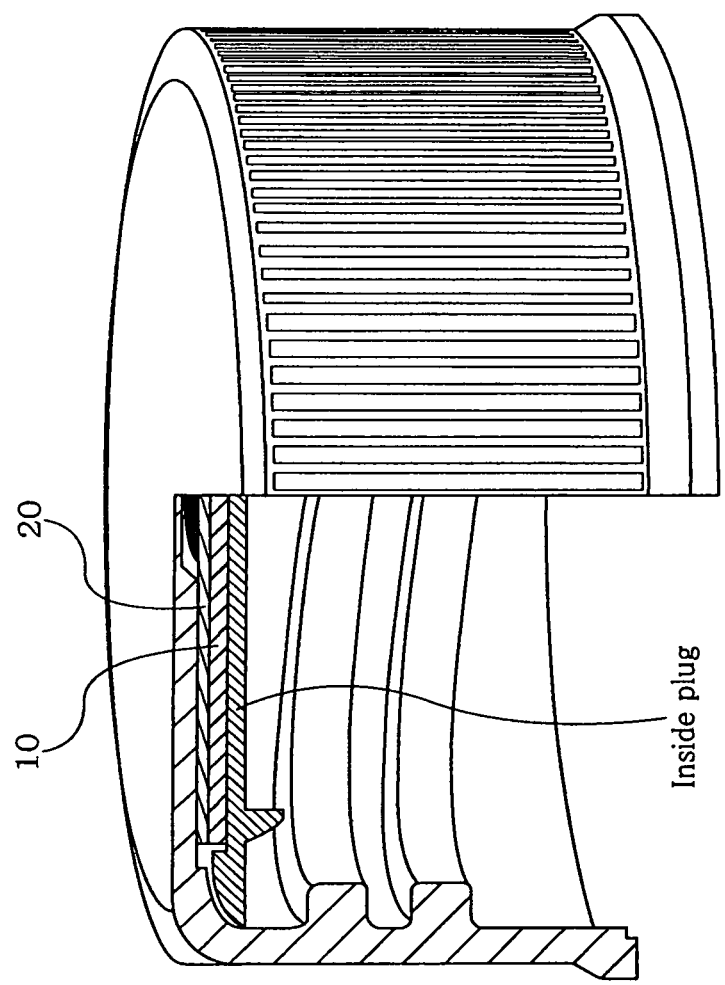
FIG. 8 is a primary part cross-sectional perspective view showing a cap of, e.g., a PET bottle container to which the RFID tag substrate according to the present invention is disposed by utilizing a cap inside plug so that the RFID tag substrate cannot fall off.

Further, as shown in FIG. 8, the RFID tag substrate 10 having the RFID tag 20 mounted thereon may be arranged on a cap rear surface (a top surface) of, e.g., a PET bottle, an inside plug may be put thereon, and the RFID tag 20 and the RFID tag substrate 10 may be thereby disposed to the cap in such a manner that they cannot fall off.

Figure 9:
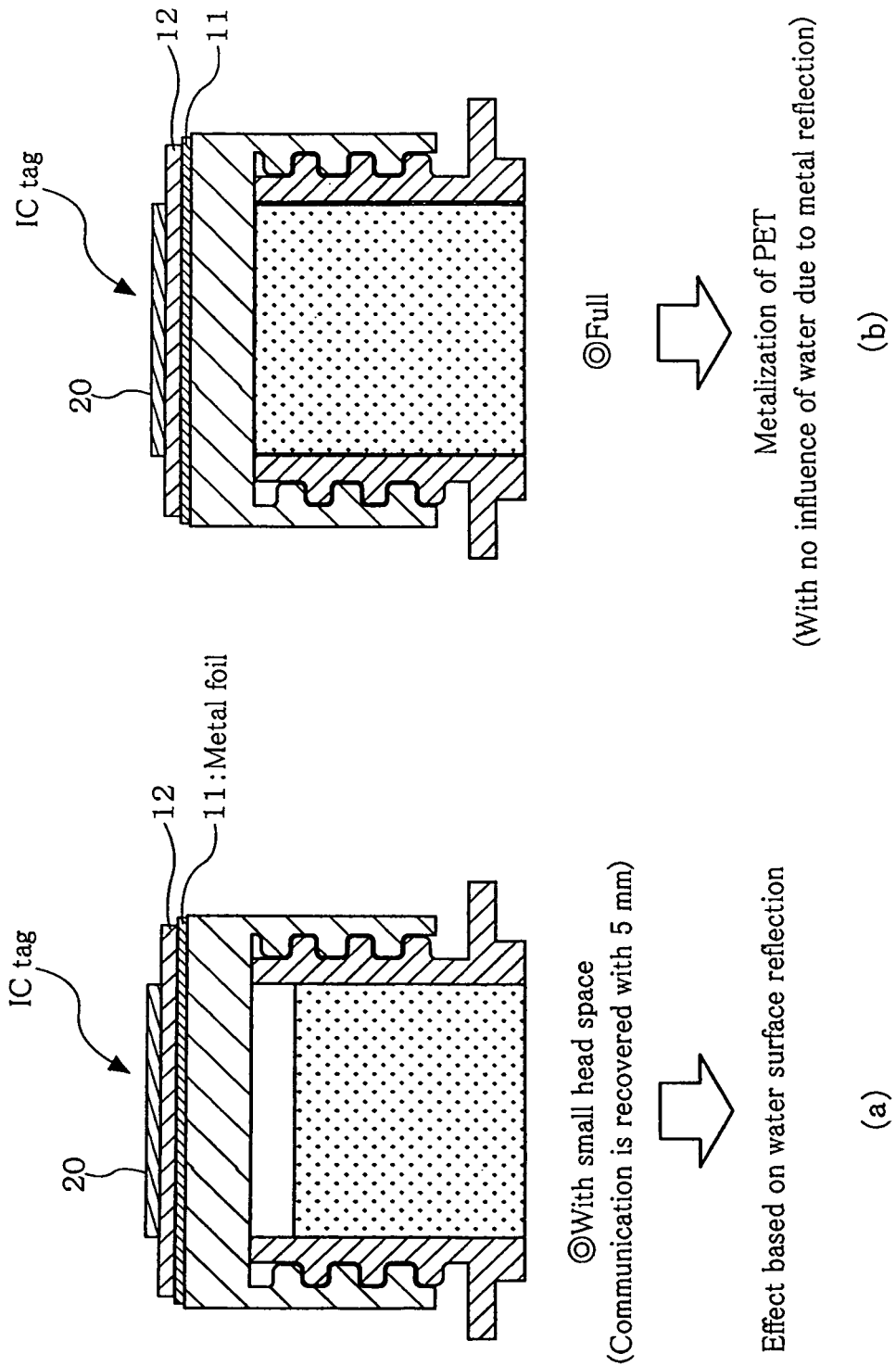
FIG. 9 are primary part cross-sectional front views showing a cap of, e.g., a PET bottle container in which the RFID substrate according to the present invention is disposed on a cap surface, wherein (a) shows a state where a water level of water put in the bottle container is lower than a bottle opening portion and (b) shows a fully filled state where water is put to reach the bottle opening portion.

Furthermore, as shown in FIG. 9, the RFID tag substrate 10 having the RFID tag 20 mounted thereon may be mounted on/attached to a surface of a cap.

Moreover, as explained above, when housing or disposing the RFID tag 20 and the RFID tag substrate 10 in or to the cap, providing a metal layer as the substrate layer 11 of the RFID tag substrate 10 is preferable.

As explained above, according to the RFID tag substrate 10 of this embodiment, when the functional layer 12 or the distance layer 14 is provided, an influence of water in a container can be suppressed/reduced, thereby obtaining good communication characteristics.

However, when the RFID tag is provided on a front surface or a rear surface of a cap of, e.g., a PET bottle, an influence of water must be considered depending on a water level of water put in the bottle container, i.e., a distance between a water surface and the RFID tag.

Specifically, as shown in FIG. 9(a), a water level of water put in the bottle container is usually placed at a position that is approximately 1 cm from a bottle opening portion. The RFID tag 20 including the IC substrate 10 according to this embodiment can obtain good communication characteristics by an effect of a high refraction index of the functional layer 12 and water surface reflection in the bottle when the distance from the water surface is approximately 5 mm. Therefore, even if the RFID tag is disposed to the cap of the bottle, an influence of water does not have to be considered in particular.

However, as shown in FIG. 9(b), in a fully filled state where water is put to reach the bottle opening portion, a distance between the RFID tag disposed to the cap and the water surface may be reduced to be less than 5 mm.

Thus, in such a case, when a metal foil layer formed of, e.g., an Al foil is provided as the substrate layer 11 of the RFID tag substrate 10, electric waves received by the RFID tag can be reflected on the metal foil layer, and an influence of water in the bottle can be thereby eliminated to obtain good communication characteristics. In particular, this configuration is preferable when the RFID tag 20 having a resonance frequency of 2.45 GHz that is apt to be affected by water is disposed to the cap portion of the PET bottle container.

[Communication Characteristics]

Communication characteristics of the RFID tag 20 mounted on, e.g., a container through the RFID tag substrate 10 according to this embodiment will now be explained with reference to FIGS. 10 to 12.

Figure 10:
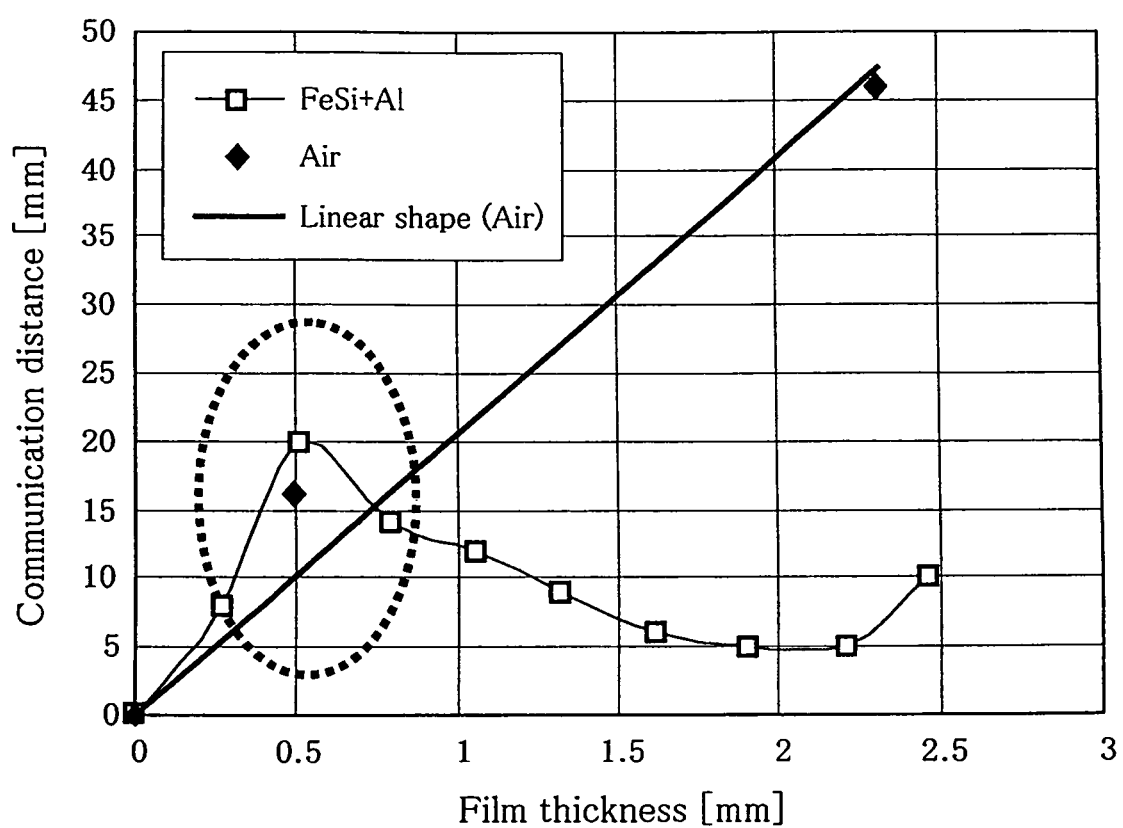
FIG. 10 is a graph showing a relationship between a communication distance of the RFID tag mounted on the RFID tag substrate according to the first embodiment of the present invention and a film thickness of the substrate.

FIG. 10 is a graph showing a relationship between a film thickness and a communication distance of the RFID tag when the RFID tag 20 having a resonance frequency of 2.45 GHz is mounted on a metal container through the RFID tag substrate 10 according to this embodiment including the high-dielectric-constant layer 12a formed of Al and the high-permeability layer 12b made of Fe—Si as the functional layer 12. It is to be noted that this drawing shows a result of using an existing general-purpose tag that is designed without considering an influence of, e.g., a surrounding environment.

First, a thick line connecting "♦" indicates a relationship between a separation distance from the container and a communication distance of the tag when the tag is simply separated from the metal container, i.e., when the tag is floating in air, and the communication distance is increased as the tag is separated from the metal container.

On the other hand, as indicated by a polygonal line connecting "□", the tag disposed to the metal container through the RFID tag substrate 10 according to this embodiment demonstrates a peak value that is a communication distance of approximately 20 mm when a thickness of the entire RFID tag is approximately 0.5 mm, and the communication distance longer that that when the tag is simply separated is obtained.

Therefore, in case of the RFID tag substrate 10 including the functional layer 12 formed of FeSi+Al, the RFID tag having an entire RFID tag thickness of approximately 0.5 mm and a communication distance of approximately 20 mm can be realized.

Figure 11:
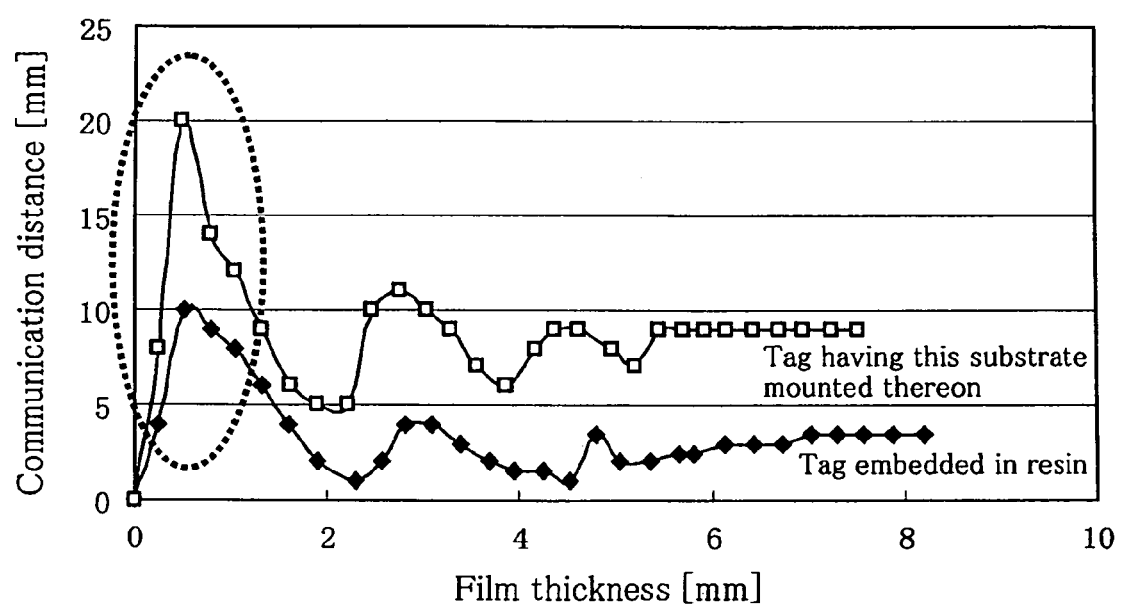
FIG. 11 is a graph showing a relationship between a communication distance of the RFID tag mounted on the RFID tag substrate according to the first embodiment of the present invention and a film thickness of the substrate in comparison with a regular resin embedded type RFID tag.

FIG. 11 shows a relationship between a communication distance and a film thickness with respect to a structure in which a general-purpose RFID tag is mounted on the RFID tag substrate 10 according to this embodiment depicted in FIG. 10 and a structure in which a general-purpose tag is embedded in a regular resin substrate. A polygonal line with "□" indicates the general-purpose tag mounted on the RFID tag substrate 10 according to this embodiment, and a polygonal line with "♦" indicates the other small tag.

As shown in this drawing, when the general-purpose tag and the small tag are used, both the tags have a peak when a film thickness of each of the tags is 0.5 mm. As a result, it can be understood that the peak is not dependent on the tag.

Figure 12:
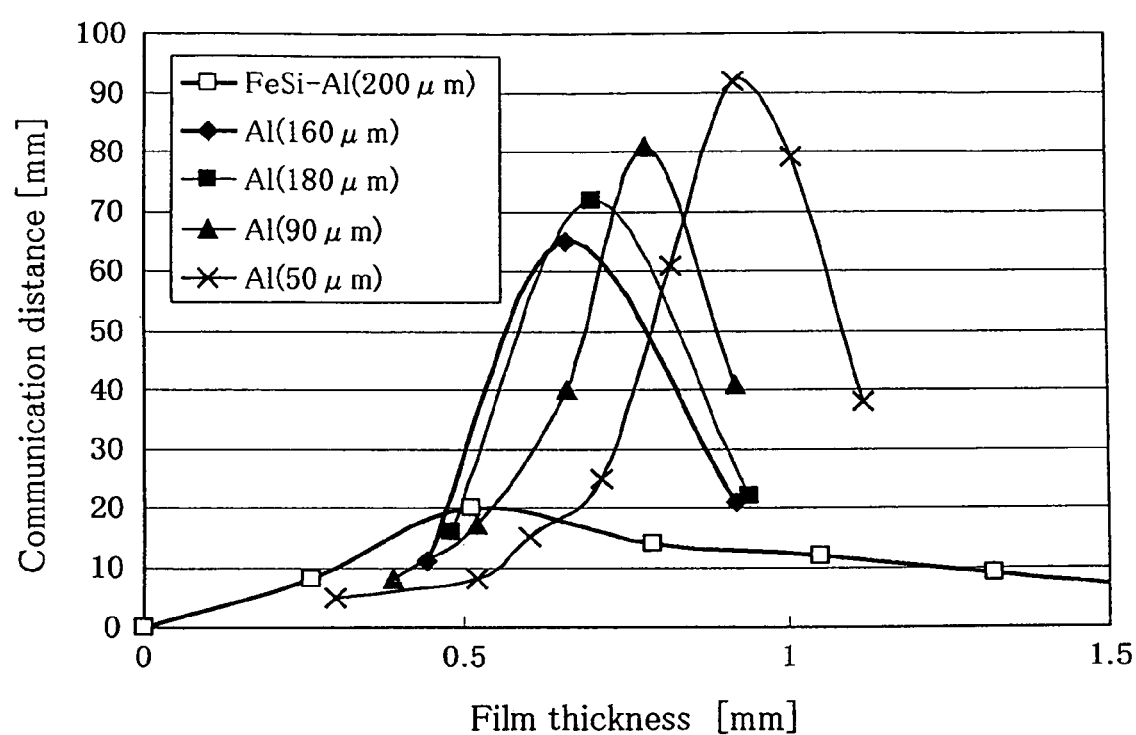
FIG. 12 is a graph showing a relationship between a communication distance of the RFID tag mounted on the RFID tag substrate according to the first embodiment of the present invention, a material and a film thickness of the substrate.

FIG. 12 is a graph showing each communication distance when a material of the functional layer 12 and a thickness of the entire substrate as the RFID tag substrate 10 according to this embodiment are changed.

In this drawing, a polygonal line with "□" indicates the substrate 10 including the high-dielectric-constant layer 12a formed of Al and the high-permeability layer 12b made of Fe—Si as the functional layer 12. A film thickness of the functional layer 12 is set to approximately 200 μm, and this functional layer 12 is stacked on the substrate layer 11 formed of a PET resin layer having a film thickness of approximately 50 μm. This structure is determined as one unit, this substrate is sequentially stacked to increase a film thickness of the entire substrate (see FIG. 3(a)), and a communication distance is checked.

In this example, the maximum communication distance of approximately 20 mm is obtained when a film thickness is approximately 0.5 mm.

In FIG. 12, each of polygonal lines with "♦", "■", "Δ", and "x" indicates a structure where an Al layer with a thickness of approximately 160 μm, 180 μm, 90 μm, or 50 μm is applied to the substrate layer 11 formed of a PET resin layer with a film thickness of approximately 50 μm with respect to the substrate 10 including the high-dielectric-constant layer 12a formed of Al alone as the function layer 12 (see FIG. 3(c)). The film thickness of the Al layer is sequentially increased to check a communication distance.

In this example, the maximum communication distance of approximately 65 mm to 90 mm is obtained when the film thickness is approximately 0.7 mm to 1.0 mm.

Based on the above explanation, focusing on a length of a communication distance, when the substrate 10 including the functional layer 12 formed of the Al layer alone is used, the maximum communication distance of approximately 90 mm can be obtained when a film thickness of the Al layer is approximately 1 mm. In a case where the tag is simply separated from a metal (see FIG. 10), a fourfold communication distance or a longer communication distance can be obtained when the distance (the film thickness) is the same.

Furthermore, focusing on a reduction in film thickness of the substrate, the substrate including the functional layer 12 formed of the Fe—Si and the Al layers can obtain the maximum communication distance of approximately 20 mm when the film thickness is approximately 0.5 mm. As compared with an example where the tag is separated from the metal, the double communication distance can be obtained when the distance (the film thickness) is the same. In order to obtain the same communication distance, reducing the film thickness of the substrate to ½ can suffice.

As can be understood from the graphs of FIGS. 10 to 12, when the RFID tag substrate 10 according to this embodiment is used, a long communication distance can be assured and a film thickness of the substrate can be reduced as compared with an example where the RFID tag is simply separated from the metal or where it is embedded in a resin.

As explained above, according to the RFID tag substrate 10 of this embodiment, when the functional layer 12 having the relative permeability and the relative dielectric constant being set to predetermined values is provided, refraction index can be increased and a long electric wave path can be assured in the substrate.

Moreover, in such a tag substrate 10 according to this embodiment, when electric waves received by the RFID tag 20 are reflected on the metal surface (a metal container) on which the tag is disposed, a longer communication distance be assured.

Therefore, in the RFID tag substrate 10 according to this embodiment, even if a thickness of the substrate is reduced to, e.g., ¼ wavelength or below of a communication frequency of the RFID tag 20, the same electric path as that when the RFID tag 20 is separated from an attachment target can be substantially assured, thereby avoiding loss of a communication gain due to an influence of the metal container. Additionally, when the RFID tag substrate is attached to a resin container while providing a metal, e.g., an aluminum foil on a rear surface of the substrate, since the metal cancels an influence of a material on the rear surface, deterioration in communication characteristics due to a change in dielectric constant caused by contents in the resin container can be avoided.

Further, when electric waves received by the RFID tag 20 are reflected by the metal container, a communication distance can be extended. Therefore, a predetermined communication distance can be assured even if an antenna size is reduced, thereby decreasing a tag size.

As explained above, an any existing RFID tag 20 can be disposed to a resin container or a metal container through the RFID tag substrate 10 according to this embodiment. As a result, accurate wireless communication can be effected within a proper communication range inherent to the tag, and the tag can be reduced in thickness/size while assuring a desired communication distance.

EXAMPLES

An example of the RFID tag substrate according to the present invention will now be explained.

Example 1

A coating material obtained by mixing 50 g of an Al powder (an average particle diameter: 9.5 μm, an aspect ratio: 67.8) in 50 g of an polyester-based binder (Clear Coating 7850 manufactured by Valspar Rock) was applied to a PET film having a thickness of 50 μm, and this structure was subjected to thermal curing (10 minutes in an oven at 180° C.) to manufacture a substrate. A thickness of the coating film was set to 50, 90, 160, or 180 μm.

A dielectric constant and a permeability of the coating film were measured by using ∈r and μr measurement system using S parameter method in reflection mode with coaxial lines manufactured by Keycom corporation. As a measurement result, a relative dielectric constant ∈=175.2 and a relative permeability μ=2.3 were obtained in a 2.45 GHz band, and their product was 403.0.

The substrates having the same coating film thickness were stacked to provide an RFID tag substrate, and a general-purpose RFID tag having an operating frequency of 2.45 GHz was disposed on a PET film side. Table 3 shows a result of disposing this RFID tag to an aluminum DI can and conducting a communication test.

TABLE 3

| Film thickness (μm) | Substrate lamination thickness (mm) | Communication distance (mm) |
|---|---|---|
| 50 | 0.92 | 92 |
| 90 | 0.78 | 81 |
| 160 | 0.7 | 72 |
| 180 | 0.66 | 65 |

Example 2

A coating material obtained by mixing 350 parts by weight of an Al powder (an average particle diameter: 9.5 μm, an aspect ratio: 67.8) in 100 parts by weight of a resin component in a polyurethane-based binder (manufactured by Nippon Polyurethane Industry Co., Ltd.) was applied to a PET film having a thickness of 12 μm, and this structure was dried (three minutes in an oven at 130° C.) to manufacture a substrate. A thickness of the coating film was 30 μm.

A dielectric constant and a permeability of the coating film were substantially equal to those in Example 1.

As a result of conducting the same communication test as Example 1, a communication distance was 98 mm when a substrate lamination thickness was 0.94 mm.

Example 3

An RFID tag (a coating film thickness: 50 μm, a lamination thickness: 0.92 mm, an operating frequency: 2.45 GHz) manufactured like Example 1 was attached to a side wall of a PET bottle filled with 500 ml of water to execute a communication test. As a result, a communication distance was 90 mm, and good communication characteristics were obtained without being affected by contents.

Comparative Example 1

A coating material obtained by mixing 50 g of an FeSi powder (an average particle diameter: 25 μm, an aspect ratio: 50) in 50 g of a binder 7850 was applied with a thickness of 140 μm to a PET film having a thickness of 50 μm, and this structure was subjected to thermal curing under the same conditions as those in Example 1 to manufacture a substrate.

In regard to physical properties of the coating film, ∈=52.9 and μ=4.7 were achieved in a 2.45 GHz band and their product was 248.6.

This substrate was stacked in the same direction, and a general-purpose RFID tag having an operating frequency of 2.45 GHz was disposed on the PET film side. This RFID tag was attached to an aluminum DI can to execute a communication test. As a result, when a lamination thickness was not greater than 1 mm, a communication distance was approximately 5 mm, and good communication characteristics were not obtained.

Example 4

A coating material obtained by mixing the same Al powder as that in Example 1 was applied with a thickness of 95 μm to a PET film having a thickness of 50 μm, and this structure was subjected to thermal curing (180° C., 10 minutes). Further, the same coating material having an FeSi powder mixed therein as that in Comparative Example 1 was further applied with a thickness of 105 μm, and this structure was subjected to thermal curing (180°, 10 minutes), thereby manufacturing a substrate. In regard to physical properties of the Al coating film of this substrate, ∈=175.2 and μ=2.3 were attained in a 2.45 GHz band and their product was 403.0. As to physical properties of the FeSi coating film, ∈=52.9 and μ=4.7 were achieved in a 2.45 GHz band and their product was 248.6. Furthermore, in regard to physical properties of the entire coating film portion, ∈=146.2 and μ=3.5 were achieved in the 2.45 GHz band and their product was 511.7.

These substrates were stacked in the same direction, and a general-purpose RFID tag having an operating frequency of 2.45 GHz was attached to the PET film side. This RFID tag was disposed to an aluminum ID can to conduct a communication test. As a result, a peak was obtained when the substrates were stacked with a thickness of 0.51 mm. Moreover, a communication distance at that moment was 20 mm.

Second Embodiment

A preferred embodiment of a metal lid with an RFID tag and a metal container including this metal lid as a second embodiment according to the present invention will now be explained with reference to FIGS. 13 to 20.

[Metal Container]

Figure 13:
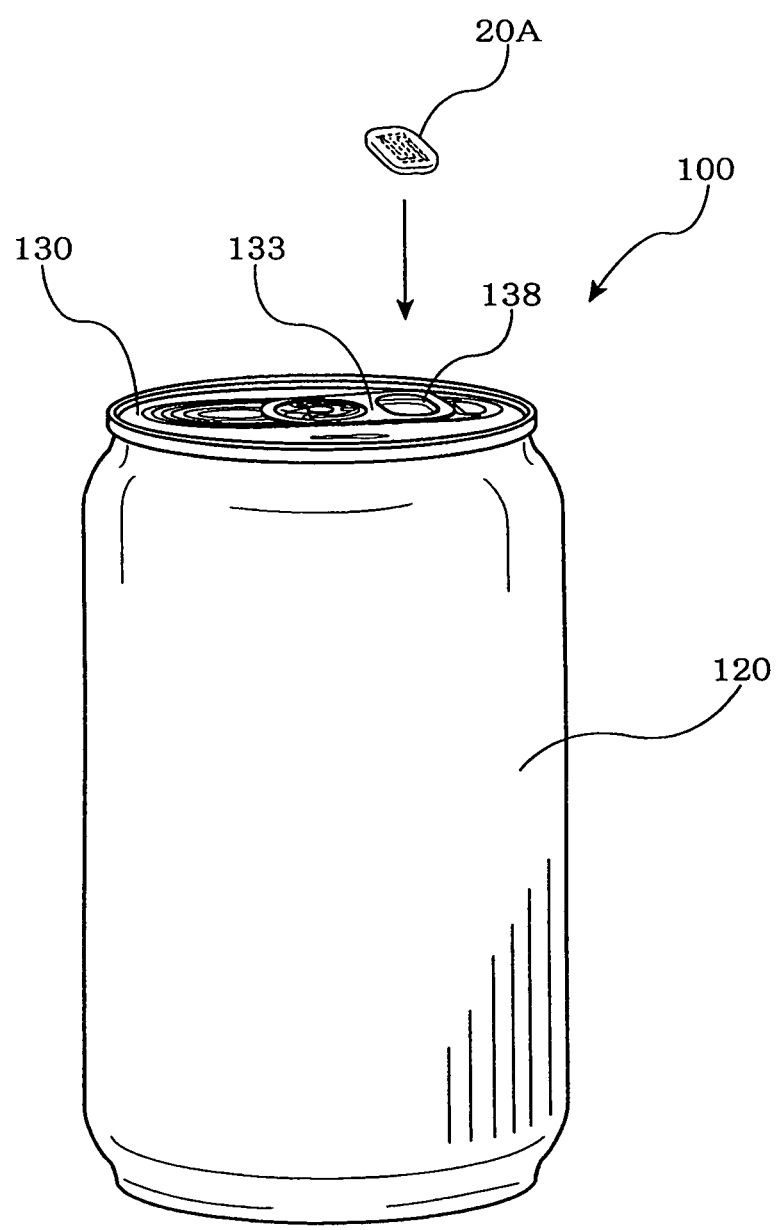
FIG. 13 is a perspective view showing a metal container including a metal lid with an RFID tag according to a second embodiment of the present invention.
Figure 14:
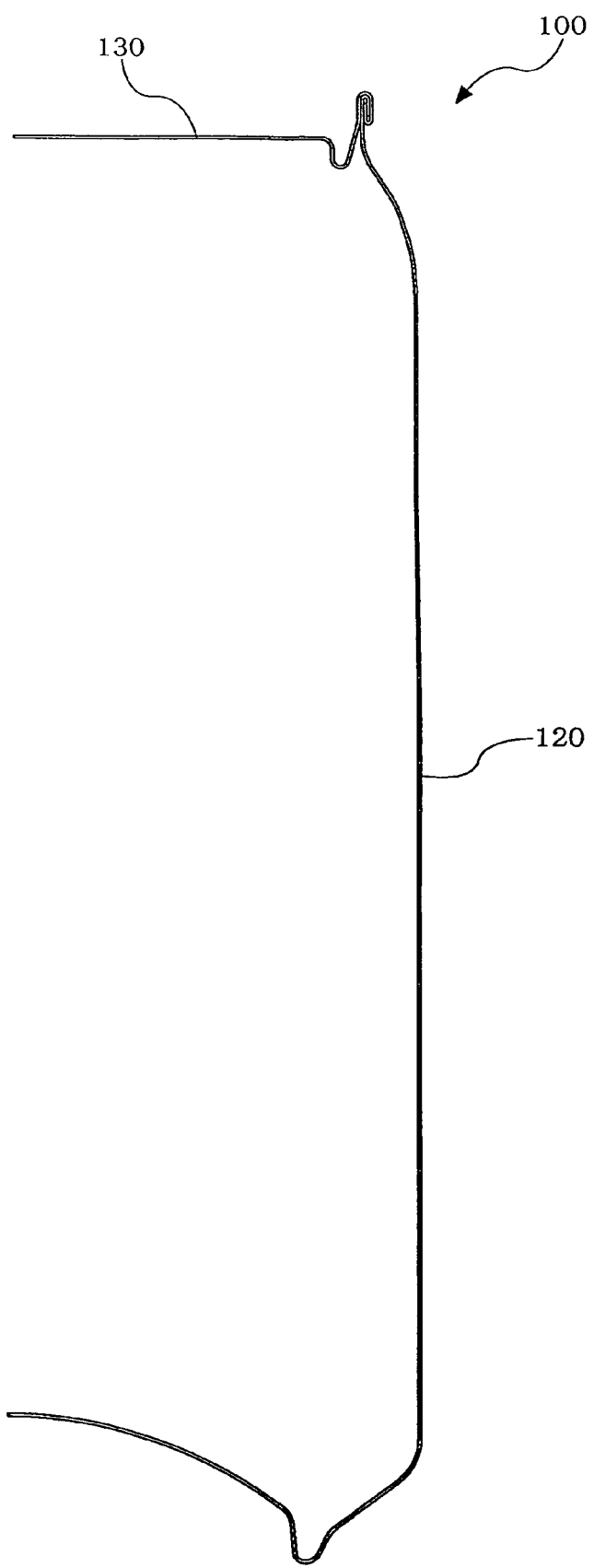
FIG. 14 is a partially cross-sectional view showing the metal container including the metal lid with an RFID tag according to the second embodiment of the present invention.
Figure 15:
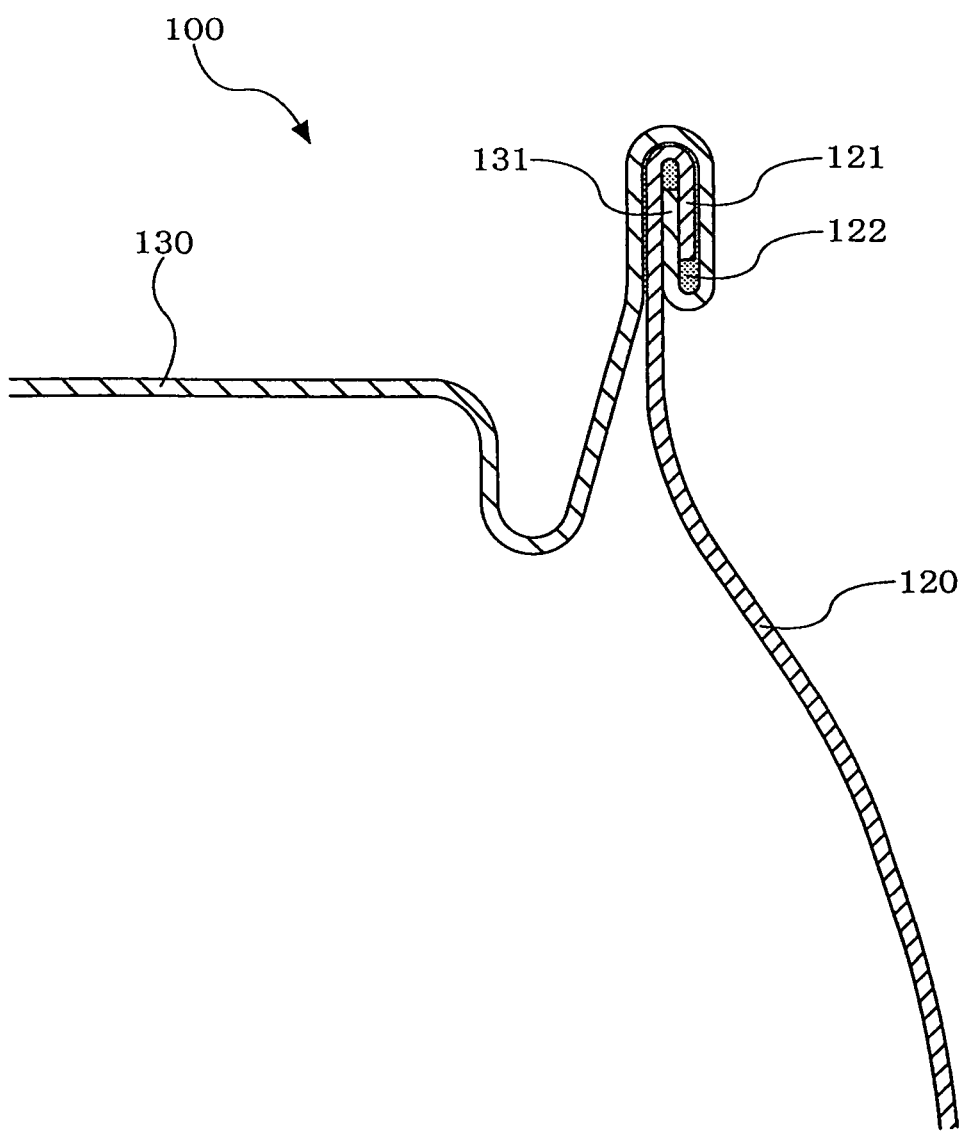
FIG. 15 is a cross-sectional view of a seam portion of the metal container including the metal lid with an RFID tag according to the second embodiment of the present invention.

FIG. 13 is a perspective view showing a metal container including a metal lid with an RFID tag according to an embodiment of the present invention, FIG. 14 is a partial cross-sectional view showing the metal container according to this embodiment, and FIG. 15 is a cross-sectional view showing a seam portion of the metal container according to this embodiment.

As shown in these drawings, a metal container 100 according to this embodiment is a can container, e.g., an aluminum can or a steel can filled with a drink, and includes a container main body 120 made up of a base portion and a bottom portion of a can, and a metal lid 130 serving as a lid portion of the can.

Additionally, an RFID tag 20A according to this embodiment that performs communication with a reader/writer is attached to the metal lid 130 of such a metal container 100.

Here, when the can container constituting the metal container 100 is a so-called a three-piece can, and the base portion, the lid portion, and the bottom portion are separated from each other, and the can container is formed by seaming the lid portion and the bottom portion with respect to the base portion. In case of a so-called two-piece can, a bottom portion and a base portion are integrated to constitute a container main body, and the can container is formed by seaming a lid portion with respect to this container main body.

The metal container 100 according to this embodiment is constituted of a two-piece can in which the metal lid 130 constituting a lid portion is seamed with respect to the container main body 120 forming a base portion and a bottom portion.

However, the metal container 100 may be constituted of a three-piece can.

As shown in FIGS. 14 and 15, a seam portion of the container main body 120 and the metal lid 130 is formed by laminating a body hook 121 formed at an upper edge of the container main body 120 on a cover hook 131 formed at an outer rim of the metal lid 130 and bonding them with a pressure in a rolled state.

This seam portion is a part that greatly affects keeping a quality of contents put in the metal container 100. Usually, as shown in FIG. 15, an urethane resin 122 or the like is applied to a laminated part of the seam portion so that necessary tight sealing properties are assured.

[Metal Lid]

Figure 16:
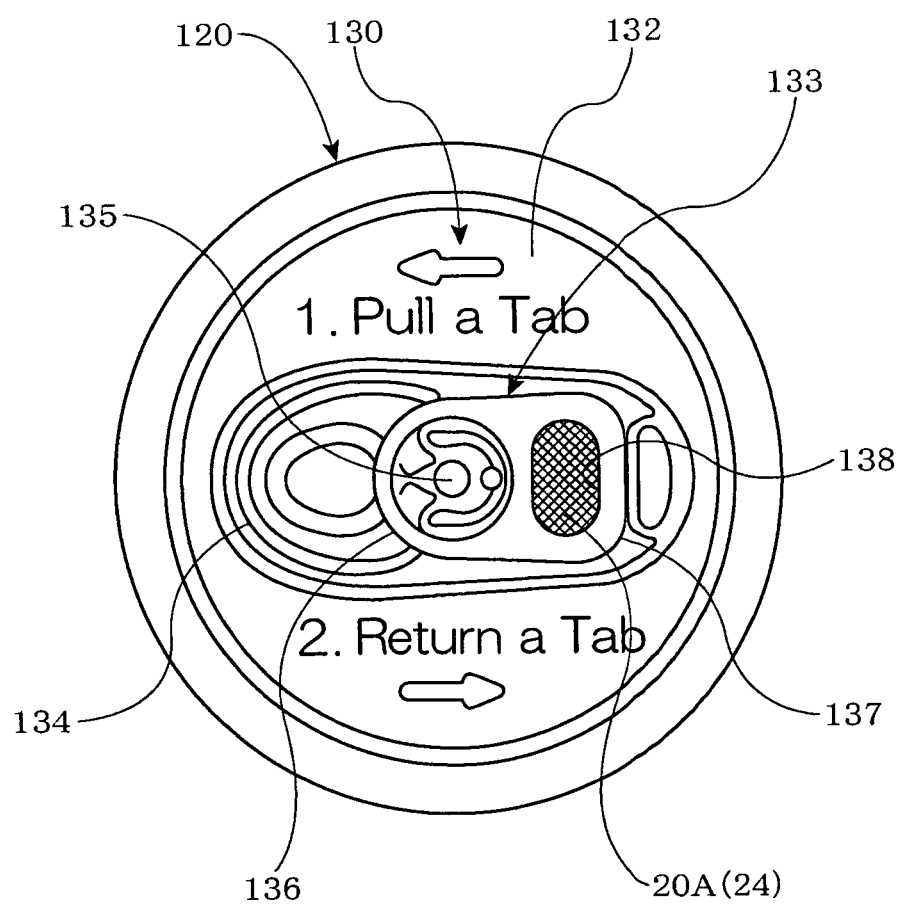
FIG. 16 is a plan view showing the metal lid with an RFID tag according to the second embodiment of the present invention.

FIG. 16 is a plan view of the metal lid 130 according to an embodiment of the present invention.

As shown in this drawing, the metal lid 130 includes a circular lid panel 132 and an opening tab 133.

The lid panel 132 is a circular metal sheet, the above-explained cover hook 131 (see FIG. 15) is formed at a rim portion, and a score 134 is formed at a central offset position to surround a planned opening region.

The opening tab 133 is a metal-sheet-like member having rigidity, and a fixed portion 136 fixed to the lid panel 132 through a rivet 135 and a ring portion 137 extending from the fixed portion 136 along the lid panel 132 are integrally formed.

The fixed portion 136 is fixed to the lid panel 132 to overlap the planned opening region that is surrounded by the score 134, and the ring portion 137 extends in a direction along which it is distanced from the score 134.

The ring portion 137 is an annular knob portion having a ring hole 138. When a finger is put at a distal end of the ring portion 137 to be pulled up, a distal end of the fixed portion 136 moves down with the rivet 135 being used as a supporting point, and the score 134 is torn by a so-called principle of leverage. As a result, the planned opening region is opened, and the contents can be poured.

It is preferable to form a part or all of the ring portion 137 to be separated from a surface of the lid panel 132. When such a structure is adopted, a finger hook space is assured between the ring portion 137 and the lid panel 132, and hence the ring portion 137 can be readily hooked by a finger or can be easily pulled up.

Further, in this embodiment, the RFID tag 20A is disposed in the ring hole 138 of the ring portion 137 of this opening tab 133 (see a hatched part in FIG. 16).

Although the ring hole of the opening tab is generally recognized as a finger hook hole in an opening operation, a recent opening tab is configured in such a manner that it is not separated from the metal lid even after opening. The opening tab is reduced in size and also has a small ring hole as different from a conventional large pull-tab that is completely separated from a container. The opening tab 133 according to this embodiment is of a type that it is not separated from the metal lid even after opening, and has the small ring hole. Actually, a finger is not put into the hole, and the hole is just pressed by a finger cushion at most in the opening operation.

Thus, according to this embodiment, the ring hole 138 of the ring portion 137 of the opening tab 133 that is actually a dead space is effectively exploited as an attachment space for the RFID tag 20A.

[RFID Tag]

Figure 17:
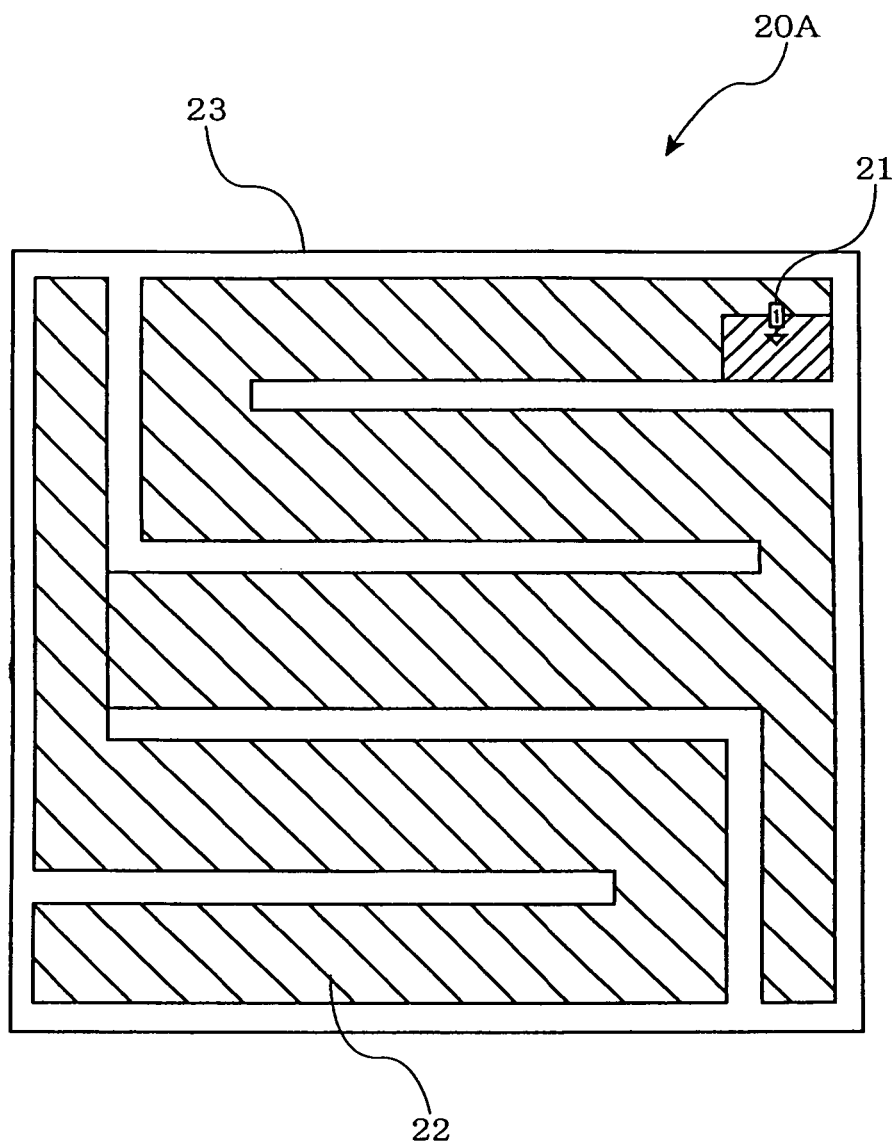
FIG. 17 is an enlarged plan view of the RFID tag attached to the metal lid with an RFID tag according to the second embodiment of the present invention.
Figure 18:
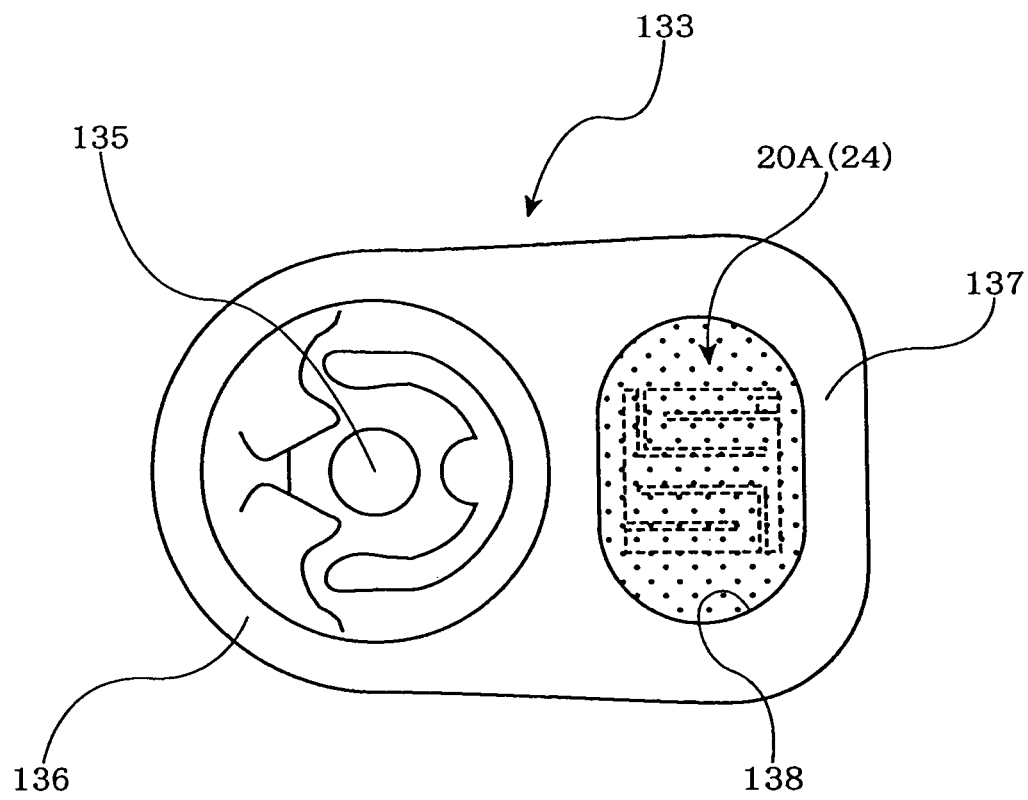
FIG. 18 is an enlarged plan view showing an opening tab of the metal lid with an RFID tag according to the second embodiment of the present invention.

FIG. 17 is an enlarged plan view of the RFID tag 20A attached to the metal lid with an RFID tag according to this embodiment, and FIG. 18 is an enlarged plan view showing the opening tab 133 of the metal lid 130 according to this embodiment.

As depicted in FIG. 17, the RFID tag 20A has an IC chip 21 and an antenna 22, and these members are mounted on a substrate 23 formed of, e.g., a resin, thereby constituting one RFID tag 20A.

Furthermore, as shown in FIG. 18, this RFID tag 20A is attached to the metal lid 130 in a state where the entire tag is encapsulated in an insulating member 24, e.g., a rubber.

Specifically, when the insulating member 24 having the RFID tag 20A encapsulated therein is press-fitted into the ring hole 138 of the opening tab 133 provided to the metal lid 130, the RFID tag 20A is attached to the metal lid 130.

When the RFID tag 20A is disposed in the ring hole 138 of the opening tab 133 in this manner, the ring hole 138 of the opening tab 133 can be utilized as an attachment space for the RFID tag 20A, and the attached RFID tag 20A can be protected by the ring portion 137 of the opening tab 133.

As explained above, a finger is not actually inserted into the ring hole of the opening tab of a currently distributed metal container, and the ring hole is just pressed by a finger cushion at the time of opening. Thus, in this embodiment, the ring hole 138 of the opening tab 133 that actually serves as a dead space is effectively exploited as the attachment space for the RFID tag to dispose the RFID tag 20A in the ring hole 138 of the opening tab 133.

When such a structure is adopted, the space of the metal lid 130 can be effectively utilized without deteriorating an essential function of the opening tab, and the RFID tag 20A can be hidden in the ring hole 138 so that it becomes indistinctive in appearance. Furthermore, the RFID tag can be protected by the ring portion 137.

Moreover, the ring portion 137 of the opening tab 133 is configured to be separated from a surface of the metal lid to some extent. When the RFID tag 20A is attached to this opening tab 133, it is separated from the metal lid 130, thereby reducing an influence of the metal lid 130 and the metal container 100 in wireless communication as much as possible.

Here, the IC chip 21 provided in the RFID tag 20A is formed of a semiconductor chip, e.g., a memory, and can record data of, e.g., several-hundred bits to several-kilo bits.

Additionally, data is read/written (data calling, registration, deletion, updating, and others) with respect to a non-illustrated reader/writer through an antenna 22 connected with the IC chip 21 based on wireless communication, and data recorded in the IC chip 21 is recognized, thereby reading/writing the data.

It is to be noted that arbitrary data, e.g., an identification code of a commodity, a name, a weight, an interior content, a name of a manufacturer/seller, a location of manufacture, a production date, or an expiration date can be recorded as the data recorded in the IC chip 21, and the recorded data can be rewritten or erased.

As a frequency band used in the RFID tag 20A, there are several types of frequency bands, e.g., a band that is equal to or below 135 kHz, a band of 13.56 MHz, a band of 860 M to 960 MHz belonging to a so-called UHF band, and a band of 2.45 GHz. Moreover, a communication distance enabling wireless communication differs depending on a frequency band to be used, and an optimum antenna length or a wiring pattern differs depending on a frequency band.

In this embodiment, as the wiring pattern of the antenna 22 suitable for the 2.45 band, a linear non-spiral pattern is adopted as shown in FIG. 17. However, as the antenna pattern, an arbitrary wiring pattern, e.g., a non-linear spiral pattern or a linear spiral pattern can be used.

The insulating member 24 that insulates and encapsulates the RFID tag 20A is formed of a material that electrically insulates the RFID tag 20A and the metal lid 130 from each other. As this material, there are, e.g., an urethane resin, a polyester resin, a polypropylene resin, a phenol resin, a rubber, and others. Additionally, when the RFID tag is embedded in a resin, an isocyanate resin may be mixed in an urethane resin or a polyester resin as a curing agent.

Further, it is preferable for the insulating member 24 to be a member having fixed elasticity so that it can be press-fitted into the ring hole 138 of the opening tab 133. For example, it is preferable to constitute the insulating member 24 by using a natural rubber, a styrene rubber (SBR), a butadiene rubber (BR), a chloroprene rubber (CR), a butyl rubber (IIR), a nitrile rubber (NBR), an ethylene-propylene rubber (EPM), a Hypalon rubber (CSM), an acrylic rubber (ACM), a silicone rubber, an urethane rubber, or a fluorine-based rubber as a rubber-based material.

Encapsulation of the RFID tag 20A in such an insulating member 24 is carried out as follows, for example.

An isocyanate resin as a curing agent is mixed in an urethane resin, and this mixture is cast into a mold having RFID tag therein and cured to encapsulate the RFID tag. Further, a substrate formed of a resin or a rubber may be molded and nipped or attached in such a manner that the RFID tag can be disposed, thereby enabling encapsulation.

Furthermore, it is preferable for the insulating member 24 that insulates and encapsulates the RFID tag 20A to be formed in such a manner that its outer shape becomes slightly larger than an internal diameter of the ring hole 138 of the opening tab and the insulating member 24 can be press-fitted into the ring hole 138.

As a result, when the RFID tag 20A encapsulated in an elastic member, e.g., rubber is press-fitted into the ring hole 138 without requiring a substrate or an adhesive for attachment, it can be attached to the metal lid 130 in such a manner that it cannot fall off, and the operation of disposing the RFID tag 20A can be very easily carried out.

Moreover, the thus press-fitted RFID tag 20A can be also readily removed. At the time of disposal/collection after use of a container, segregation of the container and the RFID tag can be facilitated, thereby realizing a metal container that can be subjected to recycling.

Additionally, the RFID tag 20A encapsulated in an elastic member, e.g., rubber can be protected from external contact/impact shocks.

As explained above, according to the present invention, since the RFID tag 20A is attached to the metal lid 130 rather than the container main body 120 side of the metal container 100, the RFID tag 20A becomes indistinctive in appearance, and the appearance of the metal container 100 (the container main body 120) can be maintained. Further, the RFID tag 20A can be suppressed from being artificially undetached/damaged.

Furthermore, the RFID tag 20A attached to the metal lid 130 hardly comes into contact with other commodities or instruments, and hence the possibility that it comes into contact with other commodities or instruments to be damaged at the time of shipment or display of the commodity can be reduced.

Moreover, since the RFID tag 20A attached to the metal lid 130 can be increased in size without becoming distinctive in appearance, not only a sufficient antenna length can be readily assured, but also, e.g., the possibility that the tag is hidden by an adjacent metal container 100 can be reduced, thus enabling good wireless communication with a reader/writer.

[Method of Attaching RFID Tag]

A method of attaching the RFID tag 20A to the metal lid 130 will now be explained with reference to FIG. 19.

Figure 19:
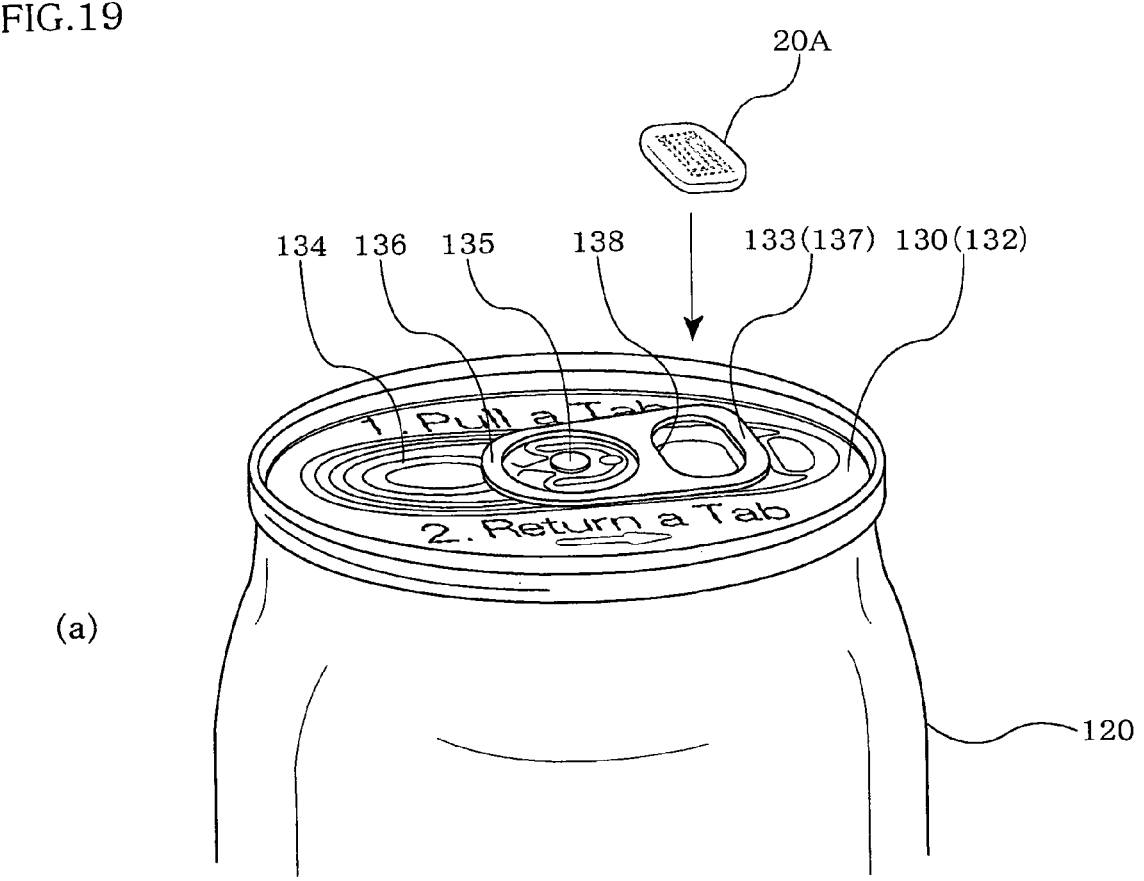
FIG. 19 are partially perspective views of a metal container showing a method of attaching the RFID tag to the metal lid with an RFID tag according to the second embodiment of the present invention, wherein (a) shows a state before the RFID tag is attached and (b) shows a state where the RFID tag is attached.
Figure 19:
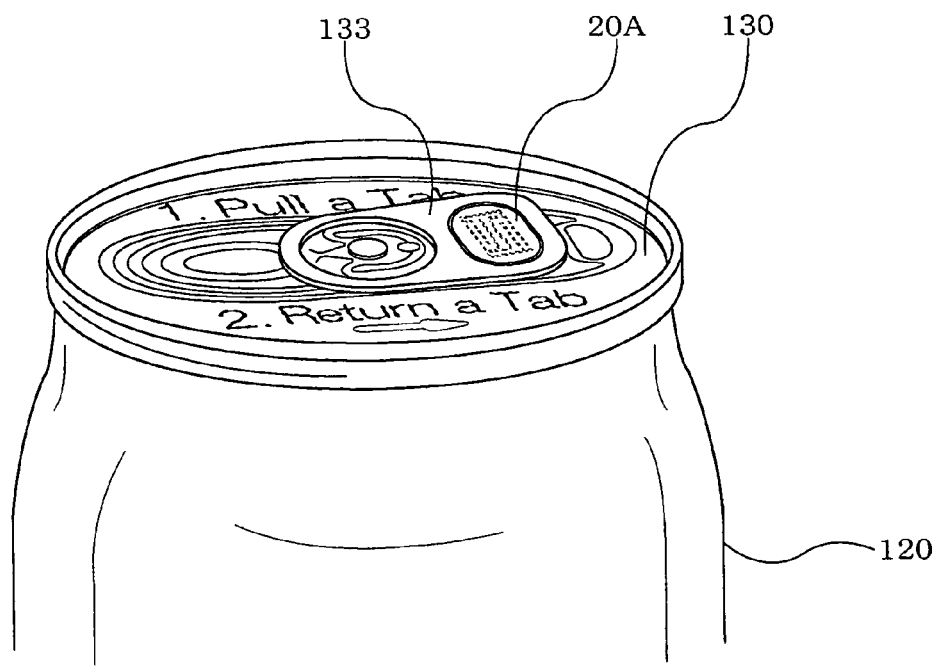

FIG. 19 are partially perspective views of the metal container showing the method of attaching the RFID tag according to this embodiment, wherein (a) shows a state before the RFID tag is attached and (b) shows a state where the RFID tag is attached.

First, as explained above, the entire RFID tag 20A is covered with/encapsulated in the insulating member 24 in advance, and the insulating member 24 encapsulating the RFID 20A therein has appropriate elasticity.

Additionally, an outer shape of the insulating member 24 that covers/encapsulates the RFID tag 20A is associated with an shape of the ring hole 138 of the opening tab 133, and formed to be slightly larger than the ring hole 138 (see FIG. 19(a)).

Further, the thus insulated and covered RFID tag 20A is press-fitted into the ring hole 138 of the opening tab 133 (see FIG. 19(b)).

In the attachment operation, the insulating member 24 having elasticity is pushed into the ring hole 138, thereby realizing easy attachment.

A lower surface of the thus attached RFID tag 20A faces the lid panel 132 through the insulating member 24 or a space. As a result, a fixed distance can be assured between the RFID tag 20A and the lid panel 132, thus reducing an influence of the metal container.

Furthermore, at the time of disposal/collection after, e.g., use of the container, when the insulating member 24 press-fitted in the ring hole 138 is pushed out, the RFID tag 20A can be removed from the opening tab 133.

[Communication Characteristics]

Communication characteristics of the RFID tag that is mounted on the metal lid with an RFID tag according to this embodiment will now be explained with reference to FIG. 20.

Figure 20:
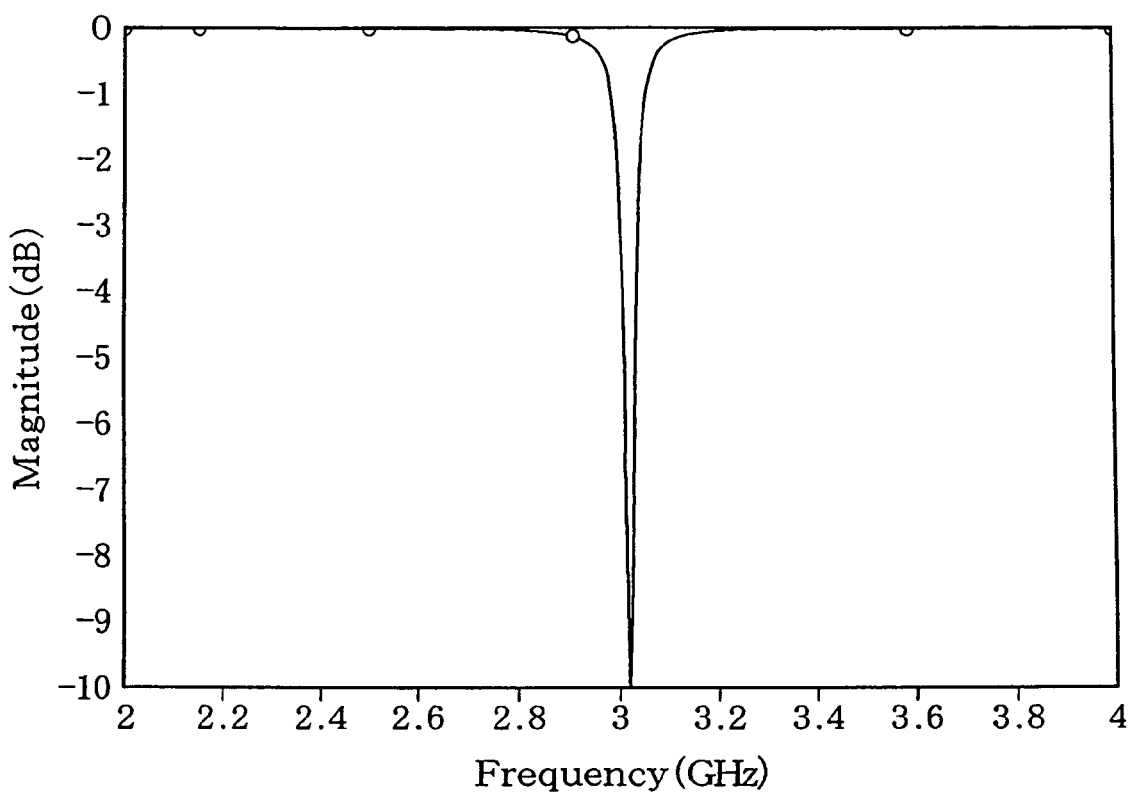
FIG. 20 is a graph showing a relationship between a resonance frequency and a magnitude of a wireless signal of the RFID tag attached to the metal lid with an RFID tag according to the second embodiment of the present invention.

FIG. 20 is a graph showing a relationship of a resonance frequency and a magnitude of a wireless signal of the RFID tag when the RFID tag 20A having the resonance frequency of 2.45 GHz is insulated and encapsulated, and then mounted on/attached to the metal container 100 via the metal lid 130 according to this embodiment.

As shown in the drawing, a return loss of the RFID tag becomes −10 dB or below in a band of the resonance frequency of 3.0 GHz, and it can be understood that adopting the structure according to this embodiment enables assuring good communication characteristics.

As explained above, according to the metal lid with an RFID tag and the metal container insulating this metal lid of this embodiment, the RFID tag 20A that performs communication with a reader/writer is attached to the metal lid 130 side of the metal container 100 in a state where this tag is encapsulated in the insulating member 24, e.g., a rubber.

The RFID tag 20A attached to the metal lid 130 is insulated and encapsulated by using, e.g., a rubber, and can perform communication with the reader/writer without being affected by the metal lid 130 or the container main body 120.

Moreover, when the RFID tag 20A is attached to the metal lid 130 that serves as a dead space in appearance, a sufficient antenna length that is required in communication with the RFID tag can be assured without deteriorating the appearance of the container, and the RFID tag 20A can carry out good communication with the reader/writer.

Additionally, the RFID tag 20A attached to the metal lid side 130 is arranged on a top surface of the metal container 100, it is not hidden by other containers or commodities even in a state where the metal container 100 is stored/displayed. It can perform communication with the reader/writer in any state, thereby sufficiently demonstrating functions/characteristics as the RFID tag.

Further, an existing general-purpose tag can be used as the insulated and encapsulated RFID tag 20A, and the small RFID tag 20A can be inexpensively manufactured, thus realizing the RFID tag for a metal that can obtain good communication characteristics at a low cost.

Furthermore, according to this embodiment, since the RFID tag 20A is attached to the metal lid 130 side rather than the container main body 120 side, the RFID tag 20A becomes indistinctive in appearance of the container, and attachment of the RFID tag does not spoil the appearance of the container, thereby maintaining the essential appearance/design of the container.

As explained above, when the RFID tag 20A becomes indistinctive in appearance in this manner, it is hardly perceived, and the RFID tag can be prevented from being artificially detached/damaged.

Moreover, the metal lid 130 placed on the top surface of the metal container 100 hardly comes into contact with other containers or instruments or other commodities at the time of storage, shipment, or display of the metal container, and the RFID tag 20A attached to the metal lid 130 can be effectively prevented from coming into contact with other containers or commodities to be damaged or fall off the container.

Third Embodiment

A preferred embodiment of a metal article with an RFID tag according to the present invention will now be explained as a third embodiment with reference to FIGS. 21 to 30.

[Metal Article]

Figure 21:
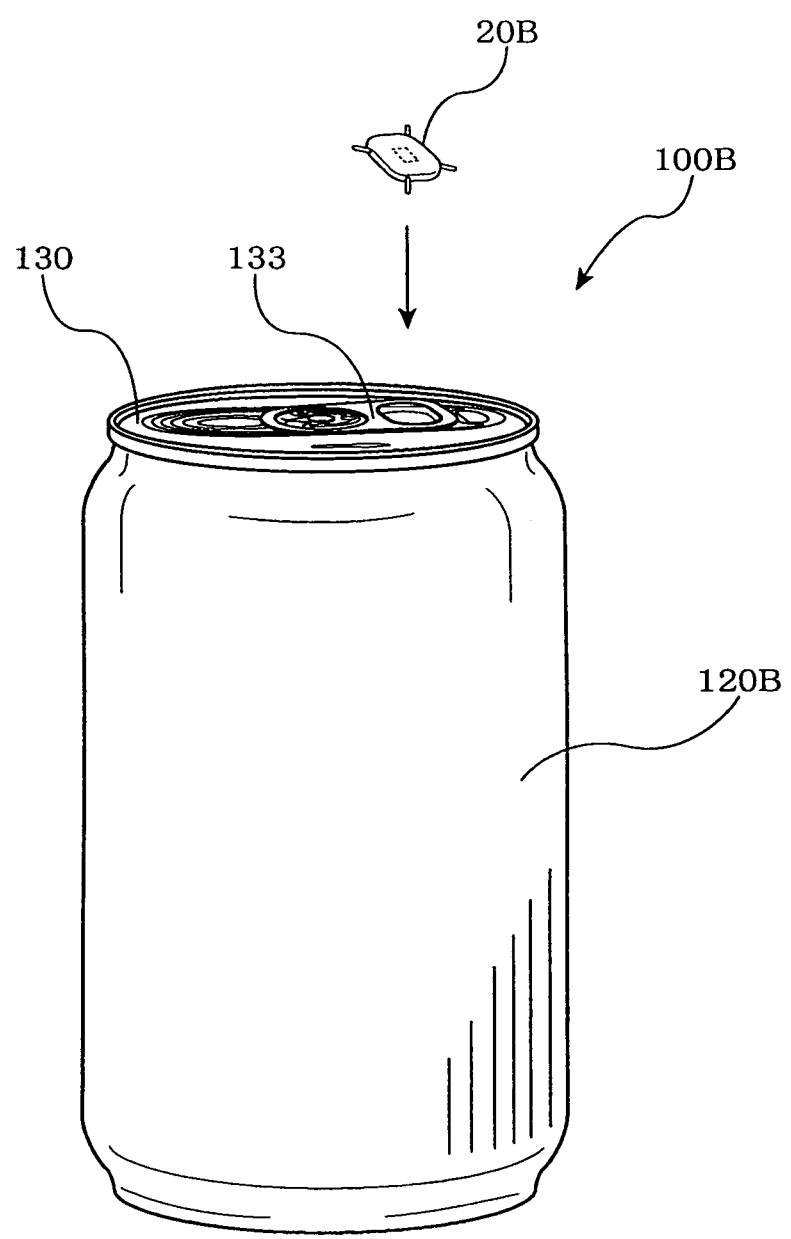
FIG. 21 is a perspective view showing a metal container constituting a metal article with an RFID tag according to a third embodiment of the present invention.
Figure 22:
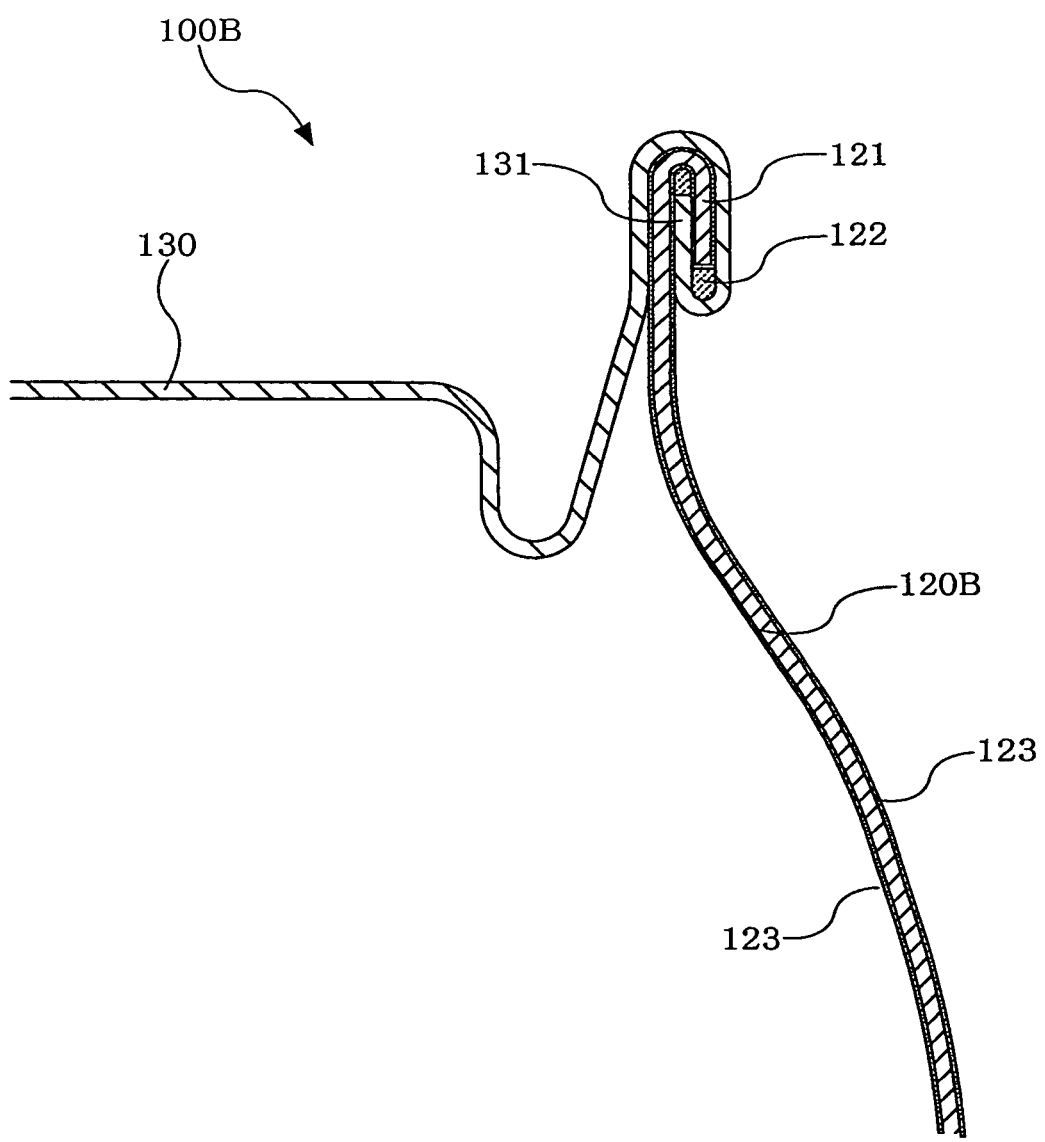
FIG. 22 is a cross-sectional view showing a seam portion of the metal container constituting the metal article with an RFID tag according to the third embodiment of the present invention.

FIG. 21 is a perspective view showing a metal container that is a metal article with an RFID tag according to an embodiment of the present invention, and FIG. 22 is a cross-sectional view showing a seam portion of the metal container according to this embodiment.

As depicted in these drawings, a metal container 100B according to this embodiment is a can container, e.g., an aluminum can or a steel can filled with a drink like the metal container 100 according to the second embodiment, and includes a container main body 120B formed of a base portion and a bottom portion of the can, and a metal lid 130 that is a lid portion of the can.

Further, an RFID tag 20B according to this embodiment that performs communication with a reader/writer is attached to the metal lid 130 of such a metal container 100B.

Here, like the metal container 100 according to the second embodiment, the can container forming the metal container 100B is constituted of a so-called three-piece can or a two-piece can.

Furthermore, as shown in FIG. 22, a seam portion of the metal container 120B and the metal container 130 is formed by laminating a body hook 121 formed at an upper edge of the metal container 120B and a cover hook 131 formed at an outer rim of the metal lid 130 and press-fitting them in a rolled state.

Moreover, according to this embodiment, an IC chip 20B is mounted on the metal lid 130 that is seamed with respect to the metal container 120B, and the IC chip 20B is electrically connected with the metal lid 130 via each contact member 25 protruding from the IC chip 20B. As a result, the metal lid 130 can function as an antenna for the RFID tag.

As explained in conjunction with the second embodiment, the seam portion of the metal lid and the container main body of the metal container is a part that greatly affects maintenance of a quality of contents put in the metal container. Usually, an urethane resin (see the urethane resin 122 depicted in FIG. 22) or the like is applied to a laminated part of the seam portion, thus assuring necessary close contact properties.

Based on such a configuration, the container main body 120B and the metal lid 130 according to this embodiment are electrically insulated from the urethane resin 122 that is an insulating member.

However, since the seam portion is press-fitted/appressed in a state where the metal lid 130 and the container main body (the base portion) 120B are firmly caulked, the urethane resin 122 or the like alone cannot obtain a sufficient insulating effect in some cases.

According to this embodiment, the metal lid 130 of the metal container 100B functions as an antenna of the tag, and a sufficient antenna length can be obtained in an area portion of the metal lid 130 as will be explained later. Therefore, when the base portion (the container main body 120B) of the metal container becomes electrically conductive with respect to the metal lid, there is a possibility that communication characteristics of an antenna formed of the metal lid 130 are deteriorated.

Thus, in this embodiment, the lid portion (the metal lid 130) and the base portion (the container main body 120B) of the metal container 100B are positively insulated from each other. As a result, an influence of a metal constituting the base portion can be avoided to obtain good communication characteristics.

Specifically, in this embodiment, the container main body 120B is constituted of a resin coated metal (see the resin coated layers 123 and 123 depicted in FIG. 22) so that the metal lid 130 and the container main body 120B can be completely insulated from each other. However, even if the metal lid 130 and the container main body 120B are not insulated from each other, it's possible to communicate.

In a can container, e.g., an aluminum can or a steel can, a resin coated can container in which a metal component constituting a container base portion is coated with a plastic resin, e.g., a PET resin is widely known.

In such a resin coated can container, an outer surface or an inner surface of the metal component constituting the container base portion is coated with, e.g., a PET resin, and such a base portion and a lid portion coated with a resin are completely insulated from each other from the beginning irrespective of presence/absence of, e.g., an urethane resin.

According to this embodiment, as shown in FIG. 22, the container main body 120B is constituted of such a resin coated can container, and an IC chip is mounted on a lid portion (the metal lid 130) of this resin coated can container. As a result, the lid portion completely insulated from the base portion side can function as an RFID tag antenna. Consequently, the metal lid 130 can be completely insulated from the container main body 120B without additionally requiring, e.g., a filler that is an insulating member in the seam portion, and the antenna constituted of the metal lid 130 can obtain good communication characteristics.

However, even if the container main body 120B and the metal lid 130 are not completely insulated from each other, communication with the RFID tag (the IC chip) can be performed. In this sense, complete insulation of the container main body 120B and the metal lid 130 is preferable, but obtaining constant insulating properties can suffice.

Specifically, the container main body 120B constituted of the resin coated can container is formed of a resin coated metal sheet with a thickness of 0.1 to 0.4 mm in which a thermoplastic resin film of, e.g., a polyester resin or a polypropylene resin is laminated on both surfaces of, e.g., a tin-free steel plate in advance.

As the resin coated metal plate, one obtained by laminating a polybutylene terephthalate film or a polyethylene terephthalate film having a thickness of 20 μm on both surfaces of a metal thin plate, e.g., a tin-free steel plate having a thickness of 0.18 mm is preferably used.

Further, as the resin covering the metal thin plate, there are a polyester-based resin, e.g., a polyethylene terephthalate, a polybutylene terephthalate, an ethylene terephthalate-isophthalate copolymer, an ethylene terephthalate-adipate copolymer, or a butylene terephthalate-isophthalate copolymer, a polyolefin-based resin, e.g., polyethylene, polypropylene, an ethylene-polypropylene copolymer, an ethylene-acetate copolymer, or an ionomer, a polyamide-based resin, e.g., nylon 6 or nylon 66, and others.

[Metal Lid]

Figure 23:
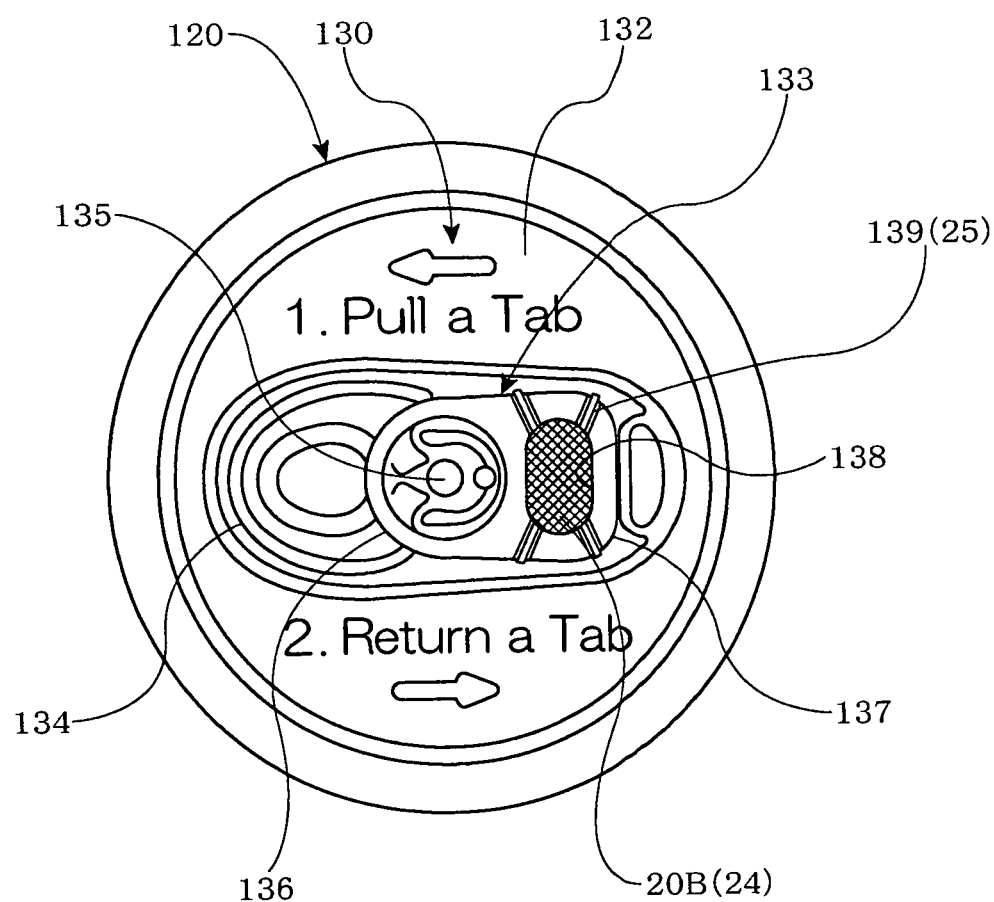
FIG. 23 is a plan view of a metal lid of the metal container constituting the metal article with an RFID tag according to the third embodiment of the present invention.

FIG. 23 is a plan view showing the metal lid 130 according to an embodiment of the present invention.

As shown in the drawing, the metal lid 130 according to this embodiment has substantially the same configuration as the metal lid 130 according to the second embodiment depicted in FIG. 16, and includes a circular lid panel 132 and an opening tab 133.

The lid panel 132 is formed of a circular metal plate, a cover hook 131 is formed at a rim portion, and a score 134 is formed at a central offset position to surround a planned opening region.

The opening tab 133 is formed of a metal-sheet-like member superior in rigidity, and a fixed portion 136 fixed to the lid panel 132 through a rivet 135 and a ring portion 137 extending along the lid panel 132 from the fixed portion 136 are integrally formed, and the opening tab 133 and the lid panel 132 are electrically conducted through the rivet 135.

The fixed portion 136 is fixed to the lid panel 132 to overlap the planned opening region surrounded by the score 134, and the ring portion 137 is extended in a direction along which it is distanced from the score 134.

The ring portion 137 is an annular knob portion having a ring hole 138. When a distal end of the ring portion 137 is caught by a finger to be pulled up, a distal end of the fixed portion 136 moves down to tear the score 34 with the rivet 135 functioning as a supporting point, thereby opening the planned opening region.

Moreover, a part or all of the ring portion 137 is formed to be separated from a surface of the lid panel 132, and a finger hook space is assured between the ring portion 137 and the lid panel 132 so that the ring portion 137 can be readily caught by a finger or pulled up.

Additionally, in this embodiment, the RFID tag 20B is disposed in the ring hole 138 of the ring portion 137 of this opening tab 133 (see a hatched portion depicted in FIG. 23).

As explained in the second embodiment, a recent opening tab has a structure that it is not separated from a metal lid even after opening. As the ring hole, a small type into which a finger is not inserted at the time of opening is general. As the opening tab 133 according to this embodiment, one with a small ring hole that is not separated from a metal lid even after opening is adopted.

Further, in this embodiment, the ring hole 138 of the ring portion 137 of the opening tab 133 that is a dead space is effectively exploited as an attachment space for the RFID tag 20B (the IC chip 21) like the second embodiment.

[RFID Tag]

Figure 24:
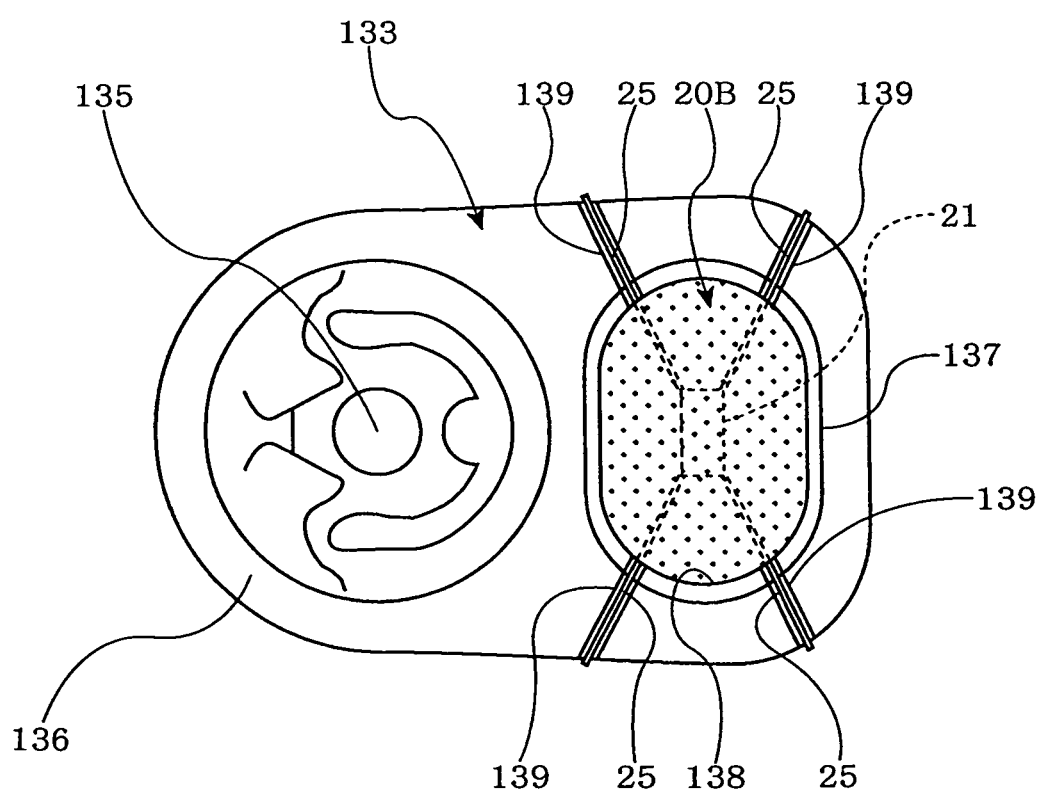
FIG. 24 is an enlarged plan view showing an opening tab of the metal lid of the metal container constituting the metal article with an RFID tag according to the third embodiment of the present invention.

FIG. 24 is an enlarged plan view showing a state where the RFID tag 20B is attached to the opening tab 133 of the metal lid 130 according to this embodiment.

As shown in the drawing, the RFID tag 20B according to this embodiment is attached to the opening tab 133 of the metal lid 130 in a state where it is encapsulated in the insulating member (the encapsulating member 24) in substantially the same manner as the second embodiment.

In general, an RFID tag has an IC chip and an antenna, and these members are mounted on a substrate formed of, e.g., a resin. However, the RFID tag 20B according to this embodiment does not include a dedicated antenna, and a part of the metal container 100B is electrically connected with the IC chip 21 for the RFID tag to function as an antenna of the RFID tag 20B.

Specifically, the RFID tag 20B according to this embodiment includes the IC chip 21 and each contact member 25 that protrudes from the IC chip 21 toward the outside, and the IC chip 21 and a part of the metal container 100B (the metal lid 130 in this embodiment) are electrically brought into contact with/become conductive with each other through each contact member 25.

Furthermore, as shown in FIG. 24, the RFID tag 20B is attached to the opening tab 133 of the metal lid 130 in a state where it is encapsulated in the encapsulating member, e.g., a rubber.

That is, the RFID tag 20B is attached to the metal lid 130 when the encapsulating member 24 having the IC chip 21 therein is press-fitted into the ring hole 138 of the opening tab 133 provided to the metal lid 130 like the RFID tag 20A according to the second embodiment (see FIG. 18).

Moreover, in this embodiment, the contact members 25 connected with the IC chip 21 protrude from the encapsulating member 24 toward the outside (external four directions in this embodiment), and each of these contact members 25 comes into contact with the opening tab 133, thereby electrically conducting the IC chip 21.

As explained above, in this embodiment, the resin coated can container is adopted as the metal container 100B, and the metal lid 130 is completely insulated from the container main body 120B. Therefore, a function of the metal lid 130 (to 138) as an antenna is not affected by a metal constituting the container main body 120B.

Here, in this embodiment, although the four contact members 25 protrude, the number of the contact members 25 are not restricted in particular. Additionally, all of the protruding contact members 25 do not have to be electrically connected with/become conductive with the IC chip 21.

For example, of the four protruding contact members 25, the number of the contact members that actually come into contact with the IC may be one or two depending on an antenna design (see FIGS. 26 and 27 that will be explained later), and the other contact members may just function to fix/support the RFID tag 20 and the pull-tab without being electrically conductive with respect to the IC.

Further, as a material of the contact member 25, a wire formed of Cu or Al is preferable. However, when electrical conduction properties with respect to the IC are required, the contact member 25 can be formed of a material having electrical conduction properties like a metal. On the other hand, when fixation with respect to the pull-tab alone is required but electrical conduction properties with respect to the IC are unnecessary, the contact member 25 does not have to be formed of an electroconductive material, e.g., a metal, and an arbitrary material/member that is suitable for support/fixation of the RFID tag 20, e.g., a resin material can be used.

When the IC chip 20B is disposed in the ring hole 138 of the opening tab 133 in this manner, the ring hole 138 of the opening tab 133 can be utilized as an attachment space for the RFID tag, and the attached IC chip 20B can be protected by the ring portion 137 of the opening tab 133.

As explained above, a finger is not actually inserted into a ring hole of an opening tab of a currently distributed metal container, and the ring hole is pressed by a finger cushion at most in an opening operation. Thus, in this embodiment, the ring hole 138 of the opening tab 133 that actually serves as a dead space is effectively exploited as an attachment space for the RFID tag and the IC chip 20B is disposed in the ring hole 138 of the opening tab 133 like the second embodiment.

As a result, in this embodiment, the space of the metal lid 130 can be effectively utilized without spoiling the essential function of the opening tab, the IC chip 20B is hidden in the ring hole 138 so that it can become indistinctive in appearance, and the RFID tag 20B can be protected by the ring portion 137.

Furthermore, in this embodiment, catching grooves 39 in which the respective contact members 25 protruding from the encapsulating member 24 of the RFID tag 20B are caught are provided in the opening tab 133, and the IC chip 21 and the opening tab 133 become electrically conductive with respect to each other when the contact members 25 are caught in/brought into contact with the catching grooves 39.

Specifically, as shown in FIG. 24, the four contact members 25 protrude from the RFID tag 20B in a radial pattern, and the four catching grooves 139 in which the contact members 25 can be caught are formed on an upper surface part of the ring portion 137 of the opening tab 133.

When such catching grooves 139 are formed on the opening tab 133 side, the contact members 25 can be more assuredly brought into contact with the opening tab 133, positioning or the like when attaching the IC chip 21 can be facilitated, and an operation of connecting the contact members 25 with the opening tab 133 can be readily carried out.

Further, when the contact members 25 are caught in/engaged with the grooves, the contact members 25 are firmly held by the catching grooves 139, and, e.g., a connection defect of the contact members 25 can be prevented for a long time.

It is to be noted that a structure or a function of the IC chip 21, a type or an amount of data to be recorded, a frequency band to be used, an optimum antenna length, a wiring pattern, and others are the same as those of the IC chip 21 according to the second embodiment.

Furthermore, according to this embodiment in particular, since the metal lid 130 functions as an antenna, an antenna suitable for a specific frequency band (e.g., a 2.45 GHz band) can be provided by setting a diameter and an area of the metal lid 130 to predetermined values.

The encapsulating member 24 that encapsulates/insulates the RFID tag 20B can be configured like the insulating member 24 explained in conjunction with the second embodiment, and it is preferably a member having fixed elasticity so that it can be press-fitted in the ring hole 138 of the opening tab 133. For example, a rubber material, e.g., an urethane resin, a polyester resin, a polypropylene resin, a phenol resin, a silicone rubber, SBR, or an urethane rubber can be used.

Moreover, when embedment using a resin is carried out, an isocyanate resin may be mixed as a curing agent in an urethane resin or a polyester resin.

It is to be noted that encapsulating the IC chip 21 in the encapsulating member 24 can be carried out like encapsulation using the insulating member 24 according to the second embodiment.

Additionally, the encapsulating member 24 that encapsulates the IC chip 21 is formed to be slightly larger than an internal diameter of the ring hole 138 of the opening tab 133 so that it can be press-fitted into the ring hole 138 like the second embodiment.

As a result, the RFID tag 20B encapsulated in an elastic member, e.g., a rubber can be attached to the metal lid 130 without requiring a substrate or an adhesive for attachment in such a manner that it cannot fall off, thereby facilitating the operation of attaching the RFID tag 20B.

Further, the RFID tag 20B attached in a press-fitting manner can be also readily removed. At the time of disposal/collection after use of the container, segregation of the container and the RFID tag can be facilitated, thereby realizing the metal container that can be subjected to recycling.

Furthermore, the RFID tag 20B encapsulated in the elastic member, e.g., a rubber can be protected from external contact or impact shocks.

As explained above, in this embodiment, when the RFID tag 20B is attached to the metal lid 130 not the container main body 120B, the metal lid 130 and the IC chip 21 integrally constitute the RFID tag 20B. As a result, the RFID tag 20B becomes indistinctive in appearance, and the appearance of the metal container 10 can be maintained, and the RFID tag 20B can be also prevented from being artificially detached or damaged. Moreover, the RFID tag 20B attached to the metal lid 130 hardly comes into contact with other commodities or instruments, the possibility that it comes into contact with other commodities or instruments to be damaged at the time of shipment or display of the commodity can be reduced.

Additionally, since the RFID tag 20B attached to the metal lid 130 can be increased in size without becoming distinctive in appearance, a sufficient antenna length can be readily assured by the metal lid 130, and the possibility that the tag is hidden by an adjacent metal container 10 can be reduced, thus performing good wireless communication with a reader/writer.

[Method of Attaching RFID Tag]

A method of attaching the RFID tag 40 to the metal lid 30 will now be explained with reference to FIG. 25.

Figure 25:
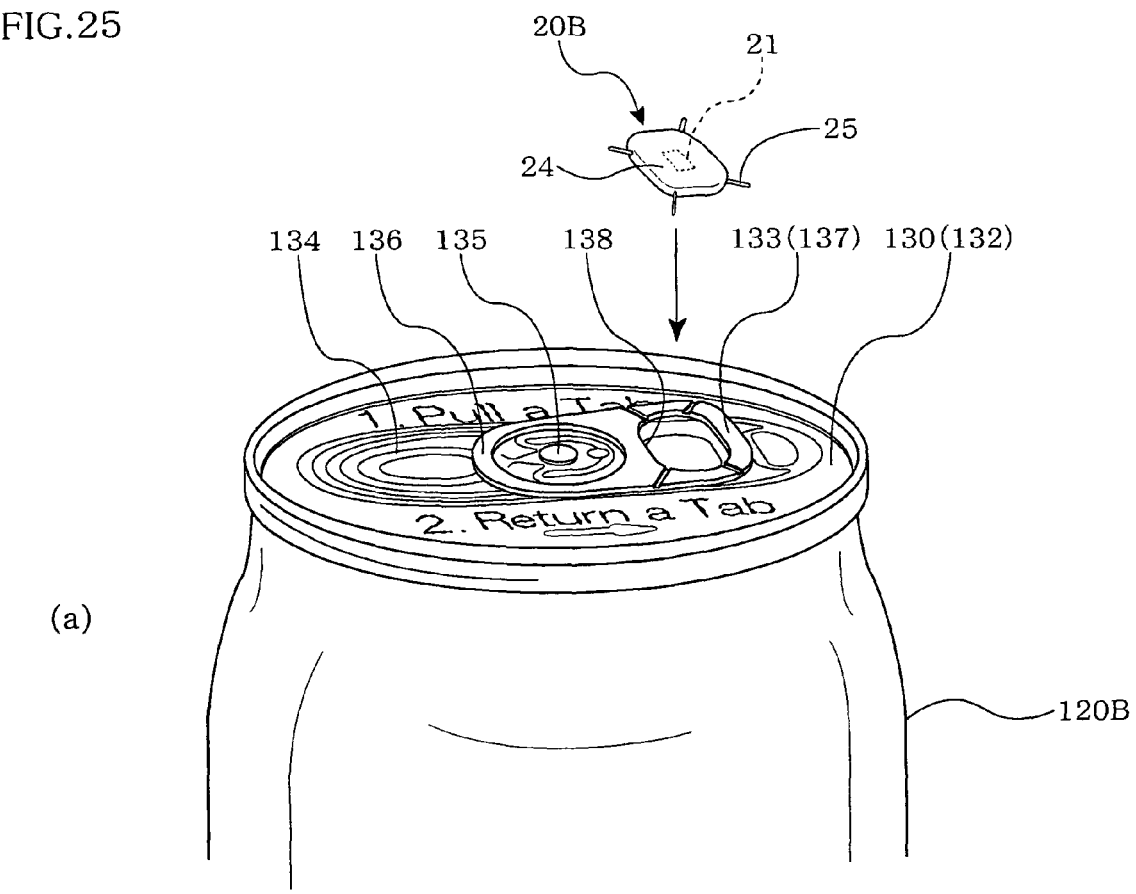
FIG. 25 are partially perspective views of the metal container showing a method of attaching an IC chip constituting the metal article with an RFID tag according to the third embodiment of the present invention, wherein (a) shows a state before the RFID tag is attached and (b) shows a state where the RFID tag is attached.
Figure 25:
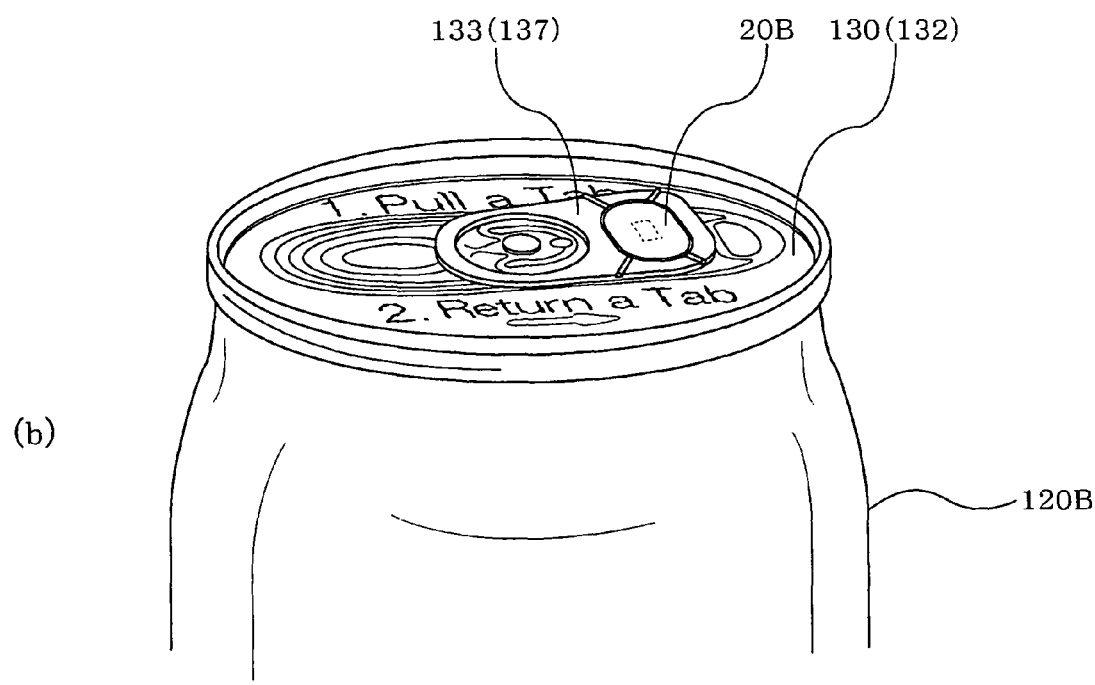

FIG. 25 is a partially perspective view of a metal container showing a method of attaching an RFID tag according to this embodiment, wherein (a) shows a state before the RFID tag is attached and (b) shows a state where the RFID tag is attached.

The method of attaching the RFID tag according to this embodiment can be carried out in substantially the same manner as the second embodiment (see FIG. 19).

First, in the RFID tag 20B, the entire IC chip 21 is covered with/encapsulated in the encapsulating member 24 in advance, and the encapsulating member 24 having the IC chip 21 encapsulated therein has appropriate elasticity as explained above.

Further, an outer shape of the encapsulating member 24 that covers/encapsulates the RFID tag 20B corresponds to a shape of the ring hole 138 formed in the opening tab 133, and it is formed to be slightly larger than the ring hole 138 (see FIG. 25(a)).

Furthermore, in the RFID tag 20B according to this embodiment, the contact members 25 electrically connected with the IC chip 21 are extended in four directions, and the contact members 25 pierce the encapsulating member 24 to protrude toward the outside.

Moreover, the thus encapsulated RFID tag 20B is press-fitted into the ring hole 138 of the opening tab 133 (see FIG. 25(b)).

In the attachment operation, the encapsulating member 24 having elasticity can be readily attached in such a manner that it is press-fitted into the ring hole 138 while positioning the contact members 25 protruding from the encapsulating member 24 and the catching grooves 139 of the opening tab 133.

When the RFID tag 20B is disposed in the ring hole 138, the contact members 25 protruding from the encapsulating member 24 come into contact with the ring portion 137 to become electrically conductive with respect to the opening tab 133, and they are caught/held in the catching grooves 139 formed in the ring portion 137.

In the thus attached RFID tag 20, the opening tab 133 and the IC chip 21 become electrically conductive with respect to each other through the contact members 25, and the metal lid 130 can function as an antenna of the RFID tag 20B.

Additionally, at the time of disposal/collection after use of the container, pushing out the encapsulating member 24 press-fitted in the ring hole 138 readily enables removal of the RFID tag 20B from the opening tab 133.

[Communication Characteristics]

Communication characteristics of the RFID tag constituted of a metal article with an RFID tag according to this embodiment will now be explained with reference to FIG. 26.

Figure 26:
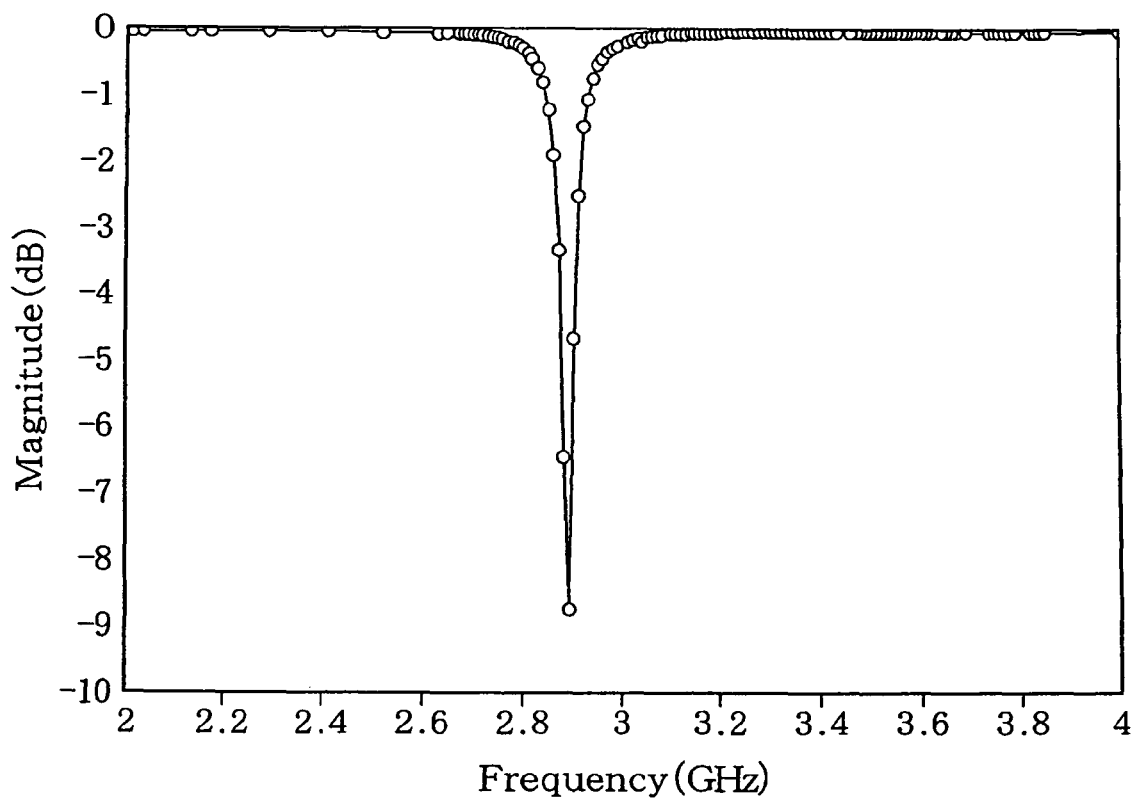
FIG. 26 is a graph showing a resonance frequency and magnitude of a wireless signal of the RFID tag constituted of the metal article with an RFID tag according to the third embodiment of the present invention.

FIG. 26 is a graph showing a relationship between a resonance frequency and a magnitude of a wireless signal of the RFID tag when the RFID tag 20B having the resonance frequency of 2.45 GHz is insulated and encapsulated and it is further mounted on/attached to the metal container 100B via the metal lid 130 according to this embodiment. The graph in this drawing shows a result when the two contact members and the IC become electrically conductive with each other and the pull-tab portion is regarded as a dipole antenna.

As depicted in this drawing, a return loss of the RFID tag becomes −12 dB or below in a band of the resonance frequency 2.9 GHz, and it can be understood that adopting the structure according to this embodiment can assure good communication characteristics.

Figure 27:
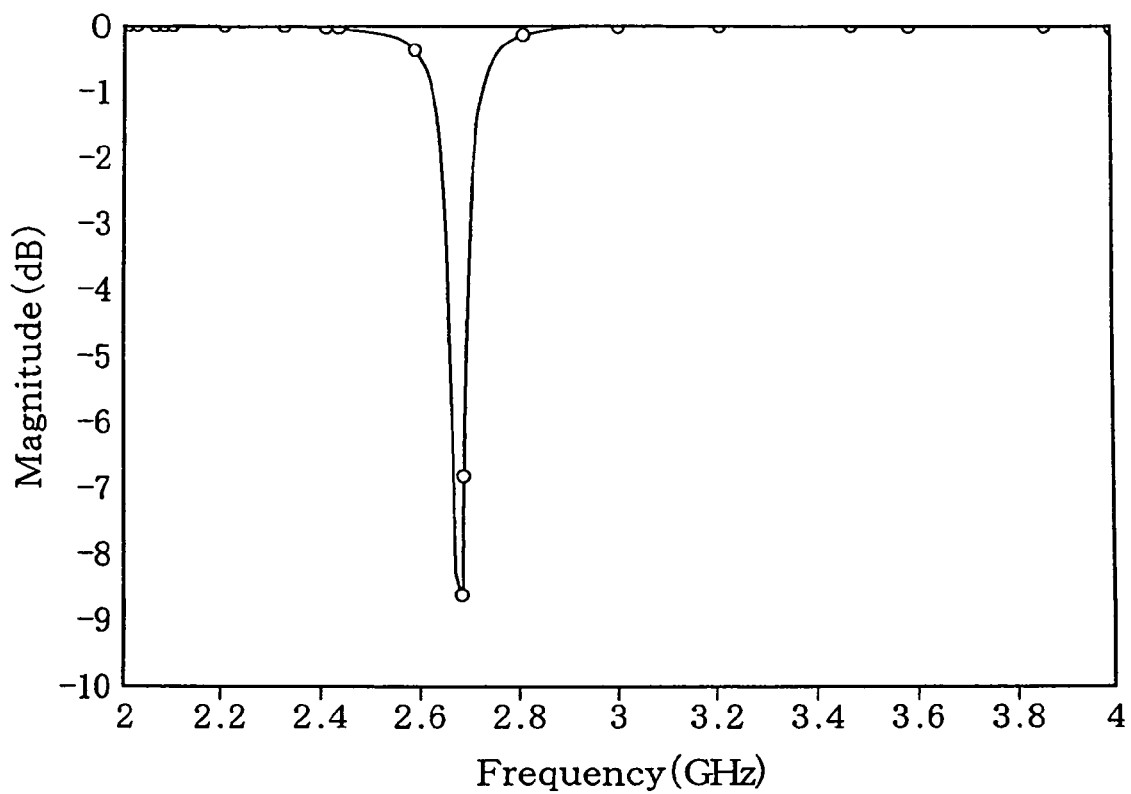
FIG. 27 is a graph showing a resonance frequency and a magnitude of a wireless tag of an IC tag constituted of the metal article with an IC tag according to a modification of the third embodiment of the present invention.

Additionally, FIG. 27 shows a result when the single contact member and the IC become electrically conductive with each other and the pull-tab is regarded as a monopole antenna. It can be confirmed that the same good communication characteristics as those when the two contact members become electrically conductive can be assured.

[Comparison of Antenna Performance Based on Sizes of Metal Lids]

Figure 28:
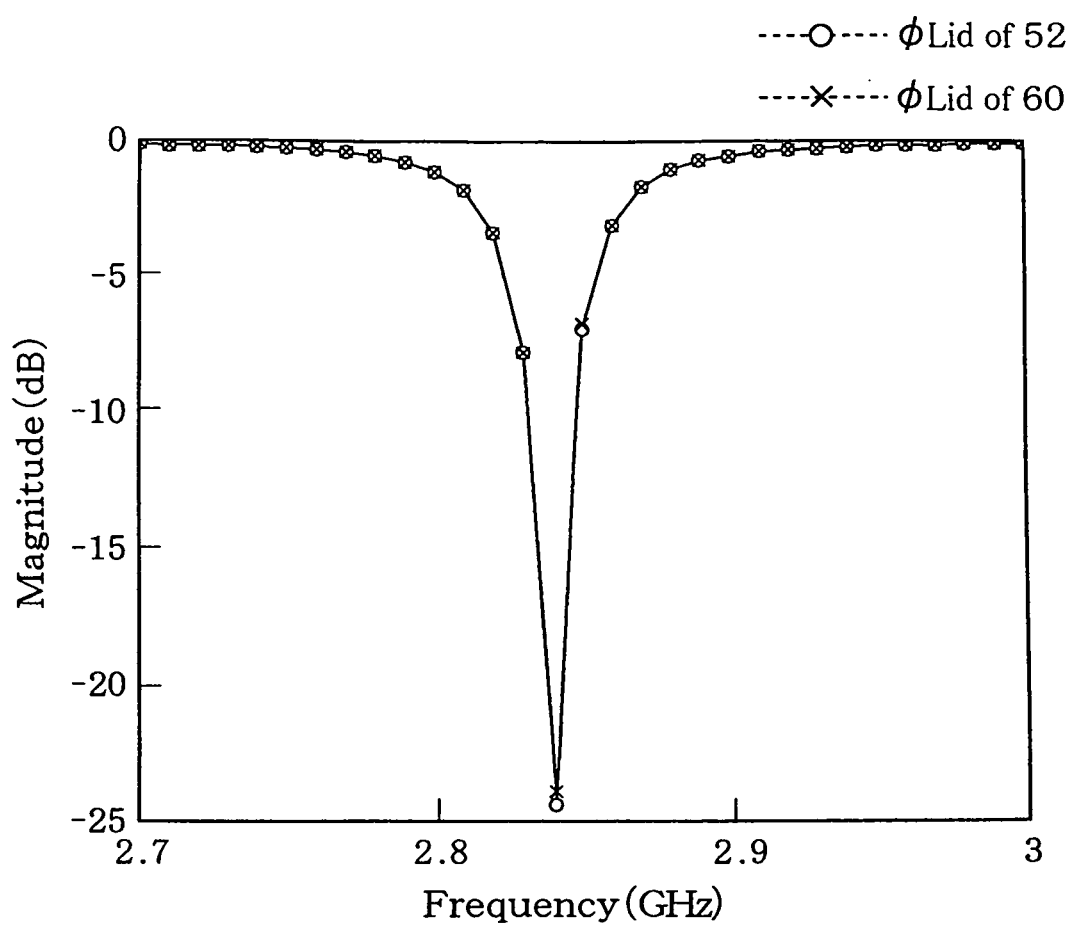
FIG. 28 is a graph showing a change in antenna performance based on a lid diameter of a metal lid according to the third embodiment of the present invention.

Comparing antenna performance based on sizes of the metal lids, for example, when the metal lids of φ52 mm and φ60 mm are caused to function as antennas for the RFID tag as shown in FIG. 28, both the antennas have substantially the same return loss.

[Verification of IC Impedance for Metal Lid Antenna]

In the RFID tag, an impedance of the antenna portion (Zan) must be matched with an impedance of the IC portion (Zic).

That is, the best performance can be provided when the impedance is a complex number, a real number part {Re(Zan)} and a value of {Re(Zic)} match with each other, and a sum of an imaginary number part {Im(Zan)} and {Im(Zic)} becomes zero. If they do not match with each other, the performance of the IC tag 40 is thereby deteriorated.

Figure 29:
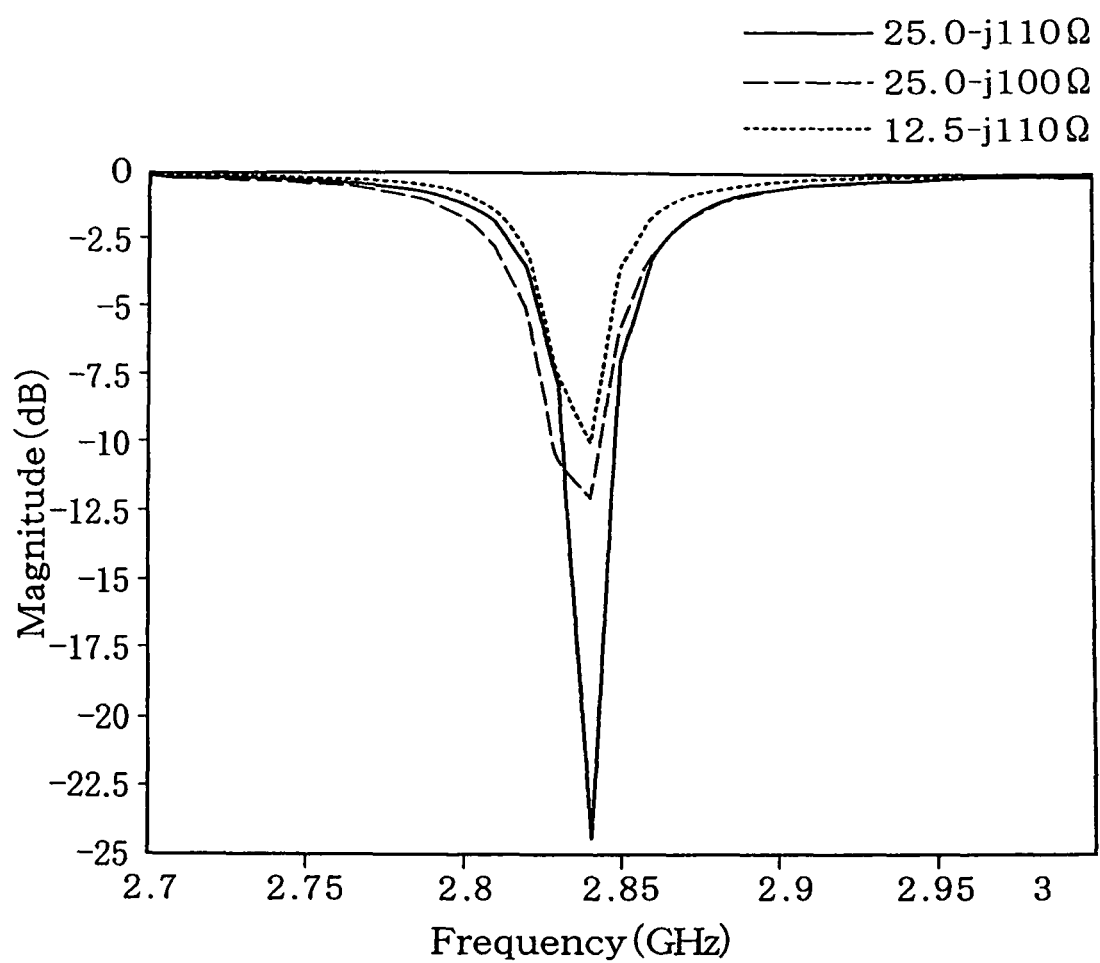
FIG. 29 is a graph showing a change in antenna performance based on an IC impedance of the metal lid according to the third embodiment of the present invention.

FIG. 29 shows a return loss of the metal lid antenna when the IC impedance is changed.

As shown in this drawing, in the metal lid antenna, the return loss provides the best performance (−25 db) when the IC impedance is set as follows:

$$Zic=25\Omega-j110\Omega$$

Further, the return loss becomes −10 db to deteriorate the performance because of mismatch when the IC impedance is set as follows:

$$Zic=12.5\Omega-j110\Omega$$

Figure 30:
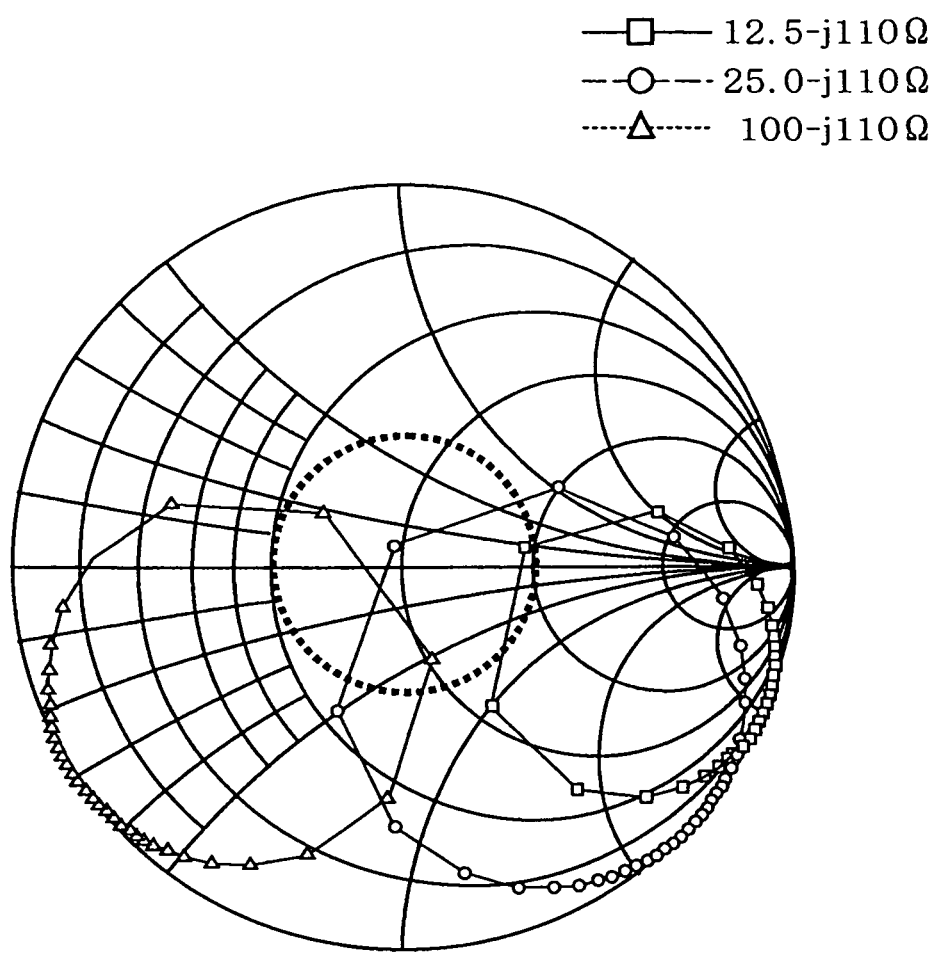
FIG. 30 is a smith chart showing a change in antenna performance based on an IC impedance (a real number part) of the metal lid according to the third embodiment of the present invention.
Figure 31:
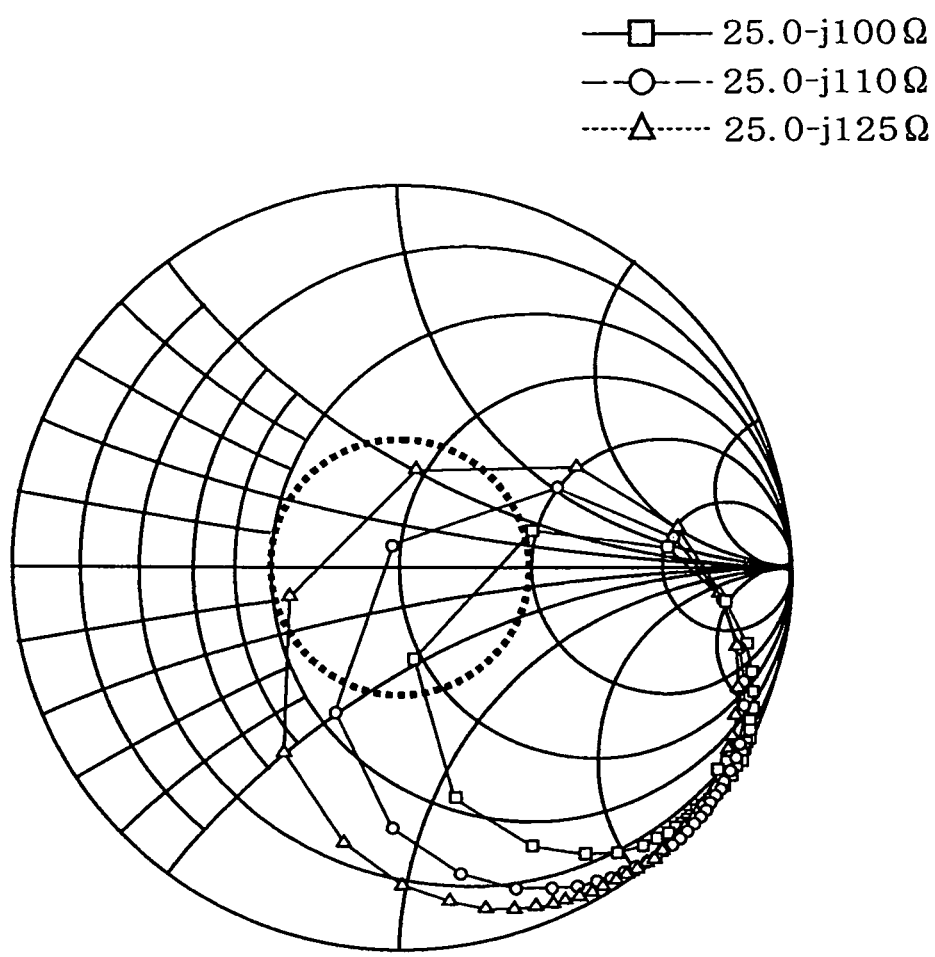
FIG. 31 is a smith chart showing a change in antenna performance based on an IC impedance (an imaginary number part) of the metal lid according to the third embodiment of the present invention.
Figure 32:
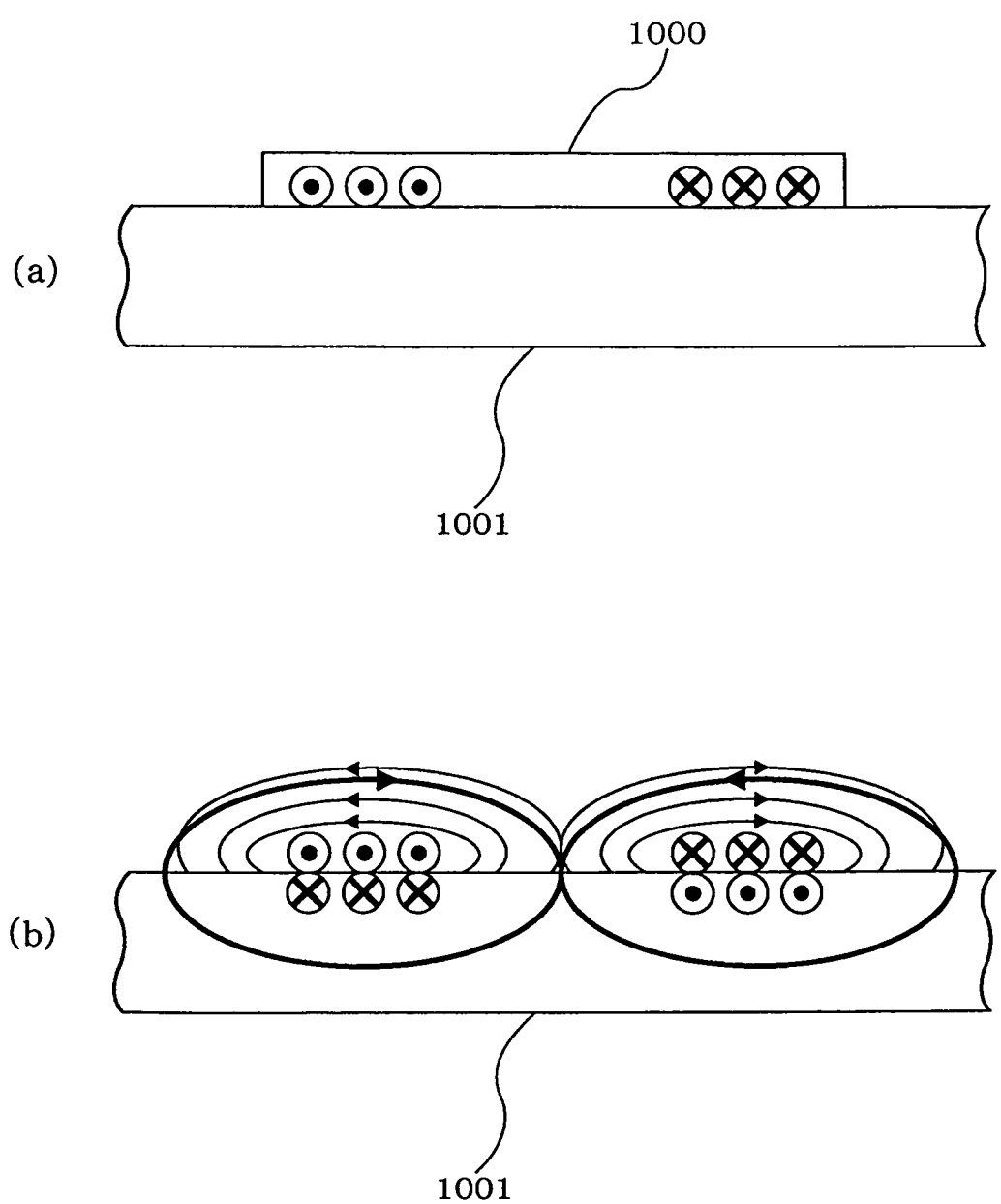
FIG. 32 are explanatory views schematically showing states of communication characteristics when an RFID tag is mounted on a conventional general metal container, wherein (a) shows a state of the RFID tag mounted on the metal container and (b) shows a state of each magnetic flux generated by the RFID tag depicted in (a)
Figure 33:
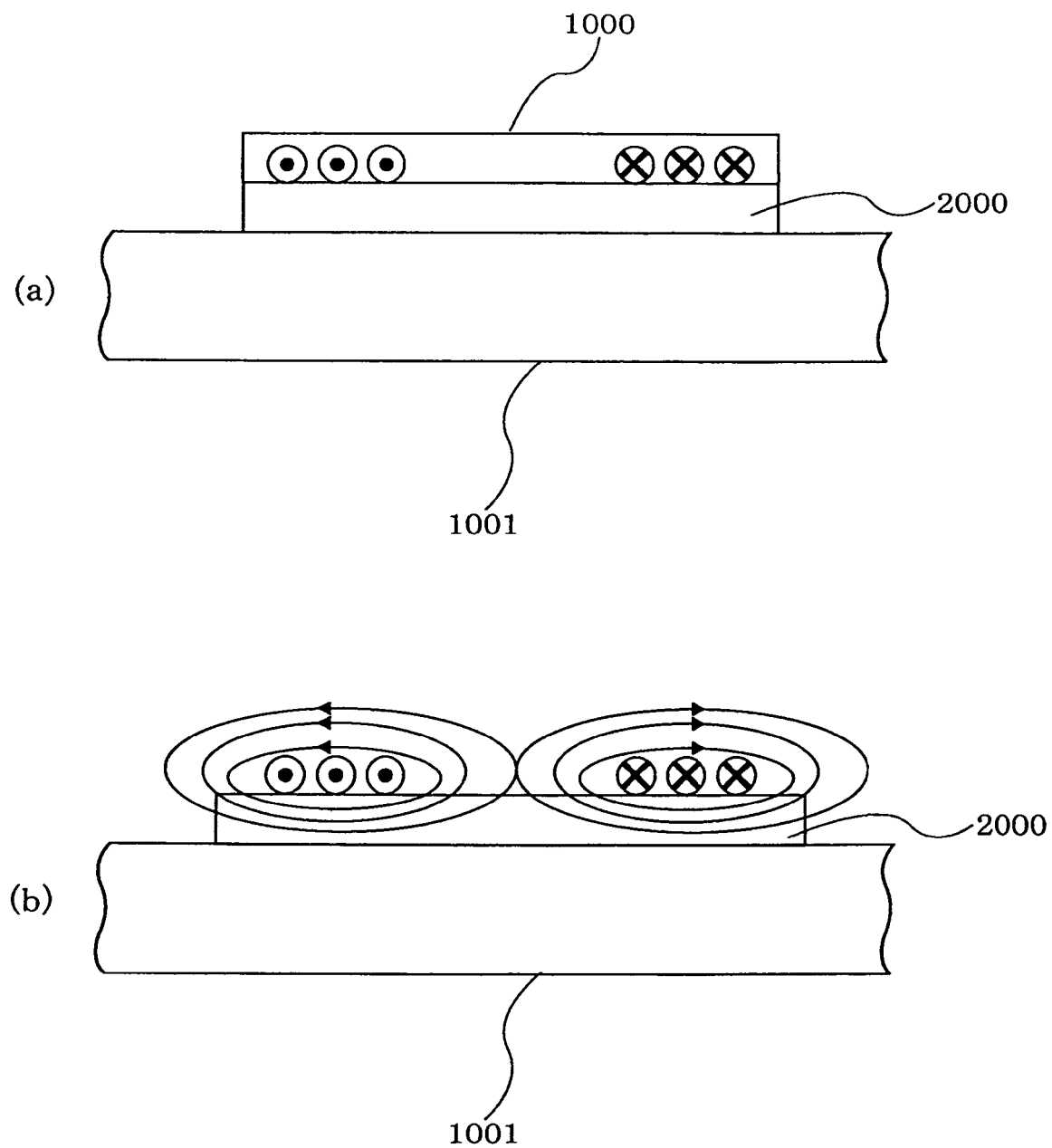
FIG. 33 are explanatory views schematically showing states of communication characteristics when a conventional RFID tag dedicated to a metal is mounted on a metal container, wherein (a) shows a state of the RFID tag dedicated to a metal that is mounted on the metal container and (b) shows a state of each magnetic flux generated by the RFID tag dedicated to a metal depicted in (a).

As the performance of the RFID tag, IC impedance conditions that enable acquiring sufficient characteristics and satisfy the above conditions when the return loss is smaller than −10 db were verified. FIGS. 30 and 31 show its results.

These drawings are called smith charts used to judge whether consistency is achieved.

Specifically, each IC impedance calculated in accordance with each frequency is plotted on the chart. If a line is drawn at the center of a circle, this means that consistency is achieved with this frequency. A circle of a dotted line drawn at the center of the chart means that a return loss is −10 db or below if a line is drawn inside this circle.

The smith charts of FIGS. 30 and 31 show results when the real number part and the imaginary number part of Zic are changed. Based on these results, it was confirmed that the RFID tag functions if the following expressions are attained as ranges of the IC impedance (Zic) when the metal lid is used as an antenna:

The real number part Re(Zic): 12.5 to 150Ω

An imaginary number part Im(Zic): −110 to −125Ω

As explained above, according to the metal article with an RFID tag of this embodiment, when the metal lid 130 of the metal container 100B serving as the metal article and the IC chip 21 are electrically connected with each other through the contact members 25, the metal lid 130 can function as the RFID tag antenna, and the metal lid 130 and the IC chip 21 integrally constitute the RFID tag 20B.

As a result, just mounting the IC chip 21 on the lid portion of the metal container 100B enables constituting the metal container with an RFID tag, the antenna formed of the metal lid 130 can assure a sufficient antenna length that is required in communication while reducing the RFID tag main body in size, and the problem, e.g., deterioration in communication characteristics due to a metal can be solved.

Furthermore, when a part of the metal container 100B is formed as an antenna, the antenna on the tag side can be omitted to decrease an antenna cost, and the tag size can be reduced as much as possible, thereby realizing the small metal RFID tag at a low cost.

In particular, according to this embodiment, when the resin coated can container is used as the metal container 100B, the metal lid 130 insulated from the container main body 120B can function as the RFID tag antenna, and hence the IC chip 21 can perform good wireless communication with a reader/writer without deteriorating communication characteristics due to an influence of the container main body 120B.

Moreover, since just mounting the IC chip 21 on the metal lid 130 serving as a dead space in appearance of the container can constitute the RFID tag 20B, the appearance of the container is not deteriorated, and the antenna formed of the metal lid 130 can assure a sufficient antenna length that is required in communication, thereby enabling good wireless communication with the reader/writer.

Additionally, the RFID tag 20B constituted with the metal lid 30 being used as the antenna is arranged on the top surface of the metal container 100B, it is not hidden by other containers or commodities even when the metal container 100B is stored/displayed, and communication with the reader/writer can be performed in any state, thereby sufficiently demonstrating functions/characteristics as the RFID tag like the second embodiment.

Further, as the IC chip 21 mounted on the metal lid 30, an existing general-purpose IC chip can be used, and the small IC chip can be inexpensively constituted, thus realizing the RFID tag for a metal component that can obtain good communication characteristics at a low cost.

Furthermore, in this embodiment, when the RFID tag 20B is constituted of the lid portion of the metal container 100B, the RFID tag 20B becomes indistinctive in appearance of the container, and the essential appearance/design of the container can be maintained without deteriorating the appearance of the container due to attachment of the RFID tag. Moreover, when the RFID tag 20B becomes indistinctive in appearance, it is hardly perceived, and the RFID tag can be suppressed from being artificially detached/damaged.

Additionally, the metal lid 130 placed on the top surface of the container hardly comes into contact with other containers or instruments or other commodities at the time of storage, shipment, or display of the container, thereby effectively preventing the IC chip 21 attached to the metal lid 130 from coming into contact with other containers or commodities to be damaged or from falling off.

Examples

An example of the metal article with an RFID tag according to the present invention will now be explained.

Although the present invention will be further explained based on the example, the present invention is not limited by the following example.

Example 1

An RFID tag was manufactured by using an IC chip, each contact member (made of Cu, a wire of ϕ0.25 mm), and an encapsulating member (an epoxy resin). The IC used in this example has a frequency of 2.45 GHz, and only one contact member was electrically conductive with respect to the IC whilst the other three contact members were not electrically conductive with respect to the same. This RFID tag was attached to a pull-tab of a commercially available aluminum can (350 ml, a can lid diameter: ϕ60 mm) to allow the contact members to become electrically conductive, and a communication characteristic test was conducted.

An output of a reader/writer used in this example was approximately 30 dBm, and an antenna connected with the reader/writer had a linearly polarized wave of approximately 6 dBi. A communication distance in this example was approximately 10 cm, and good communication characteristics were assured irrespective of a metal surface.

Although the preferred embodiments of the RFID tag substrate for a metal component, the RFID tag including this RFID tag substrate, the metal lid with the RFID tag, the metal container including this metal lid, and the metal article with the RFID tag according to the present invention have been explained, the present invention is not restricted to the foregoing embodiments, and it is needless to say that the present invention can be modified in many ways without departing from the scope of the invention.

For example, in the first embodiment, the container to which the RFID tag including the RFID tag substrate according to the present invention has been explained while taking the PET bottle, the can container, or the pouch container used as the container for a drink or a food as examples. However, applications, contents, or constituent components of the container to which the RFID tag including the RFID tag substrate according to the present invention can be applied are not restricted in particular. That is, a container with any size, any shape, or any material can be adopted as long as it is a resin or metal container, and any contents may be accommodated in the container.

Furthermore, in the first embodiment, the RFID tag suitable for the RFID tag substrate according to the present invention has been explained as the microwave type RFID tag using a UHF band or a 2.45 GHz band, but the RFID tag substrate according to the present invention can be of course preferably utilized for an RFID tag using any other frequency band or an RFID tag adopting a mode other than the electric wave mode.

Moreover, the metal lid, the metal container, or the metal container to which the metal article is applied has been explained while taking the metal can container filled with, e.g., a drink in the third embodiment as an example. However, applications, contents to be accommodated, or constituent components of the metal container to which the present invention can be applied are not restricted in particular.

That is, the metal lid according to the present invention may be a container with an any size, any shape, or any material as long as it is a container including the metal lid to which the RFID tag is attached through the insulating member, and any contents may be accommodated in the container.

Additionally, the metal article according to the present invention in which a part of the metal container is used as an antenna may be, e.g., a container with any size, any shape, or any material as long as it is a container/article including, e.g., the metal lid that is electrically conductive with respect to the IC chip and can function as an antenna, and any contents may be accommodated in the container.

Further, although the metal article according to the present invention has been explained while taking the metal container as an example in the third embodiment, the metal article according to the present invention is not restricted to the metal container. That is, the present invention can be applied to any object as long as it is a metal article including a metal member that is electrically connected with the IC chip of the RFID tag and can function as the antenna of the RFID tag.

The RFID tag substrate for a metal component according to the present invention can be preferably utilized as a substrate of an RFID tag that is attached to, e.g., a PET bottle container, a metal can (a label can) like an aluminum can or a steel can, an arbitrary resin container like a pouch container, or a metal container.

Furthermore, the metal lid with an RFID tag, a metal container including this metal lid, and the metal article with an RFID tag according to the present invention can be utilized as a metal lid, a metal container, or a metal article that is preferable as a metal container that is sealed/hermetically closed by a metal lid, especially a metal container, e.g., an aluminum can or a steel can serving as a container for a drink and others.

What is claimed is:

1. A metal lid that seals a container, comprising:
   an opening tab for the container, having a ring hole;
   an RFID tag including an IC chip with a memory containing data, and an antenna electrically connected to the IC chip; and
   an insulating member completely covering the RFID tag including the IC chip and the antenna,
   wherein the antenna comprises elongated strips arranged adjacent to each other and connected together,
   the IC chip is connected to one end of one of the elongated strips, and
   the RFID tag is disposed in the ring hole through the insulating member.

2. A metal container, comprising:
   a container main body; and
   a metal lid that seals the metal container,
   wherein the metal lid is formed of the metal lid with the RFID tag according to claim 1.

3. The metal lid according to claim 1, wherein the antenna has a rectangular shape slit to have elongated sections.

4. The metal lid according to claim 1, wherein the container is a metal container, and the opening tab is a pull-tab configured to open the metal container.

5. The metal lid according to claim 4, wherein the metal container is a can.

6. The metal lid according to claim 1, wherein the insulating member is press-fitted in the ring hole.

7. A metal article with an RFID tag, comprising:
   a metal container;
   a metal lid sealingly fixed to the metal container, and including an opening tab having a ring hole therein;
   an RFID tag with an IC chip including a memory containing data and a contact member protruding outwards; and
   an insulating member completely covering the IC chip while the contact member protrudes outwards through the insulating member without being covered by the insulating member,
   wherein the RFID tag covered with the insulating member is disposed in the ring hole of the opening tag and the contact member is electrically connected to the opening tab so that the metal lid functions as an RFID tag antenna through the opening tab.

8. The metal article with an RFID tag according to claim 7, wherein the metal lid is insulated from a base portion of the container.

9. The metal article with an RFID tag according to claim 8, wherein the base portion of the container is formed of a resin coated metal component whose surface is coated with a resin.

10. The metal article with an RFID tag according to claim 7, wherein the IC chip is disposed in the ring hole.

11. The metal article with an RFID tag according to claim 7, wherein the opening tab includes a catching groove in which the contact member is disposed to electrically connect the IC chip with the opening tab.

12. The metal article with an RFID tag according to claim 7, wherein the metal lid and the IC chip are electrically connected with each other when the IC chip is disposed in the ring hole of the opening tab and the contact member comes into contact with the opening tab.

13. The metal article with an RFID tag according to claim 12, wherein the metal container is a can, and the opening tab is a pull-tab configured to open the can.

14. The metal lid according to claim 7, wherein the insulating member is press-fitted in the ring hole.

* * * * *